US008726247B2

(12) United States Patent
Wilkinson et al.

(10) Patent No.: US 8,726,247 B2
(45) **Date of Patent: *May 13, 2014**

(54) COMPUTER PROGRAM PRODUCT CONTAINING INSTRUCTIONS FOR PROVIDING A PROCESSOR THE CAPABILITY OF EXECUTING AN APPLICATION DERIVED FROM A COMPILED FORM

(75) Inventors: Timothy J. Wilkinson, London (GB); Scott B. Guthery, Belmont, MA (US); Ksheerabdhi Krishna, Cedar Park, TX (US); Michael A. Montgomery, Cedar Park, TX (US)

(73) Assignee: Gemalto SA, Meudon (FR)

( * ) Notice: Subject to any disclaimer, the term of this patent is extended or adjusted under 35 U.S.C. 154(b) by 95 days.

This patent is subject to a terminal disclaimer.

(21) Appl. No.: 12/907,949

(22) Filed: Oct. 19, 2010

(65) Prior Publication Data

US 2011/0126178 A1 May 26, 2011

Related U.S. Application Data

(63) Continuation of application No. 11/537,156, filed on Sep. 29, 2006, now Pat. No. 7,818,727, which is a continuation of application No. 10/037,390, filed on Oct. 23, 2001, now Pat. No. 7,117,485, which is a continuation of application No. 08/957,512, filed on Oct. 24, 1997, now Pat. No. 6,308,317.

(60) Provisional application No. 60/029,057, filed on Oct. 25, 1996.

(51) Int. Cl.
*G06F 9/45* (2006.01)

(52) U.S. Cl.
USPC .......... 717/139

(58) Field of Classification Search
USPC .......... 717/139
See application file for complete search history.

(56) References Cited

U.S. PATENT DOCUMENTS

| | | | |
|---|---|---|---|
| 4,256,955 | A | 3/1981 | Giraud et al. |
| 4,650,975 | A | 3/1987 | Kitchener |
| 4,667,290 | A | 5/1987 | Goss et al. |

(Continued)

FOREIGN PATENT DOCUMENTS

| | | | |
|---|---|---|---|
| EP | 0427465 | A2 | 5/1991 |
| EP | 0718760 | A2 | 6/1996 |

(Continued)

OTHER PUBLICATIONS

Defendant Google Inc.'s Answer to Plaintiff's Complaint for Patent Infringement and Counterclaims, *Gemalto* V. *HTC*, Civil Action No. 6:10-cv-561(LED) (E.D.Tex. Feb. 25, 2011).

(Continued)

*Primary Examiner* — John Chavis
(74) *Attorney, Agent, or Firm* — The Jansson Firm; Pehr B. Jansson

(57) ABSTRACT

An integrated circuit card is used with a terminal. The integrated circuit card includes a memory that stores an interpreter and an application that has a high level programming language format. A processor of the card is configured to use the interpreter to interpret the application for execution and to use a communicator of the card to communicate with the terminal.

16 Claims, 23 Drawing Sheets

(56) References Cited

U.S. PATENT DOCUMENTS

| | | | | |
|---|---|---|---|---|
| 4,777,355 | A | 10/1988 | Takahira | |
| 4,791,558 | A * | 12/1988 | Chaitin et al. | 717/140 |
| 4,797,543 | A | 1/1989 | Watanabe | |
| 4,874,935 | A | 10/1989 | Younger | |
| 4,877,947 | A | 10/1989 | Mori | |
| 4,905,138 | A | 2/1990 | Bourne | |
| 4,928,001 | A | 5/1990 | Masada | |
| 5,014,312 | A | 5/1991 | Lisimaque et al. | |
| 5,064,999 | A | 11/1991 | Okamoto et al. | |
| 5,133,072 | A | 7/1992 | Buzbee | |
| 5,195,130 | A | 3/1993 | Weiss et al. | |
| 5,210,876 | A | 5/1993 | Uchida | |
| 5,307,492 | A | 4/1994 | Benson | |
| 5,367,685 | A | 11/1994 | Gosling | |
| 5,406,380 | A | 4/1995 | Teter | |
| 5,450,575 | A | 9/1995 | Sites | |
| 5,457,799 | A | 10/1995 | Srivastava | |
| 5,469,572 | A | 11/1995 | Taylor | |
| 5,500,517 | A | 3/1996 | Cagliostro | |
| 5,519,866 | A | 5/1996 | Lawrence et al. | |
| 5,537,474 | A | 7/1996 | Brown et al. | |
| 5,544,086 | A | 8/1996 | Davis et al. | |
| 5,550,919 | A | 8/1996 | Kowalski | |
| 5,551,015 | A | 8/1996 | Goettelmann et al. | |
| 5,590,197 | A | 12/1996 | Chen et al. | |
| 5,590,331 | A | 12/1996 | Lewis et al. | |
| 5,604,802 | A | 2/1997 | Holloway | |
| 5,613,012 | A | 3/1997 | Hoffman et al. | |
| 5,613,120 | A | 3/1997 | Palay et al. | |
| 5,650,761 | A | 7/1997 | Gomm et al. | |
| 5,663,553 | A | 9/1997 | Aucsmith | |
| 5,668,999 | A | 9/1997 | Gosling | |
| 5,675,804 | A | 10/1997 | Sidik et al. | |
| 5,679,945 | A | 10/1997 | Renner et al. | |
| 5,689,565 | A | 11/1997 | Spies et al. | |
| 5,692,132 | A | 11/1997 | Hogan | |
| 5,734,150 | A | 3/1998 | Brown et al. | |
| 5,742,756 | A | 4/1998 | Dillaway et al. | |
| 5,748,964 | A | 5/1998 | Gosling | |
| 5,761,306 | A | 6/1998 | Lewis | |
| 5,764,989 | A | 6/1998 | Gustafsson et al. | |
| 5,768,419 | A | 6/1998 | Gundlach et al. | |
| 5,794,049 | A | 8/1998 | Lindholm | |
| 5,799,138 | A | 8/1998 | Yoshida | |
| 5,811,771 | A | 9/1998 | Dethloff | |
| 5,815,657 | A | 9/1998 | Williams et al. | |
| 5,826,088 | A | 10/1998 | Sitbon et al. | |
| 5,835,772 | A | 11/1998 | Thurlo | |
| 5,841,866 | A | 11/1998 | Bruwer et al. | |
| 5,844,218 | A | 12/1998 | Kawan et al. | |
| 5,848,274 | A | 12/1998 | Hamby et al. | |
| 5,860,008 | A | 1/1999 | Bradley | |
| 5,889,941 | A | 3/1999 | Tushie et al. | |
| 5,896,530 | A | 4/1999 | White | |
| 5,905,895 | A | 5/1999 | Halter | |
| 5,912,453 | A | 6/1999 | Gungl | |
| 5,915,226 | A | 6/1999 | Martineau | |
| 5,923,884 | A | 7/1999 | Peyret et al. | |
| 5,940,516 | A | 8/1999 | Mason et al. | |
| 5,946,487 | A | 8/1999 | Dangelo | |
| 5,956,716 | A | 9/1999 | Kenner et al. | |
| 5,963,980 | A | 10/1999 | Coulier et al. | |
| 5,966,536 | A | 10/1999 | Ravichandran | |
| 5,987,256 | A | 11/1999 | Wu et al. | |
| 6,061,520 | A | 5/2000 | Yellin et al. | |
| 6,075,863 | A | 6/2000 | Krishnan et al. | |
| 6,078,744 | A | 6/2000 | Wolczko et al. | |
| 6,094,528 | A | 7/2000 | Jordan | |
| 6,151,703 | A | 11/2000 | Crelier | |
| 6,223,984 | B1 | 5/2001 | Renner et al. | |
| 6,226,789 | B1 | 5/2001 | Tye et al. | |
| 6,233,733 | B1 | 5/2001 | Ghosh | |
| 6,438,573 | B1 | 8/2002 | Nilsen | |
| 6,526,565 | B1 | 2/2003 | Nally | |
| 6,535,903 | B2 | 3/2003 | Yates et al. | |
| 2005/0097550 | A1 | 5/2005 | Schwab et al. | |
| 2008/0282238 | A1 | 11/2008 | Meijer et al. | |

FOREIGN PATENT DOCUMENTS

| | | | |
|---|---|---|---|
| EP | 0829828 | A1 | 3/1998 |
| EP | 0889393 | A2 | 1/1999 |
| FR | 2667171 | A1 | 3/1992 |
| GB | 2191029 | A | 12/1987 |
| GB | 2261973 | A | 6/1993 |
| JP | 204741 | A1 | 9/1986 |
| JP | 63156254 | A | 6/1988 |
| JP | 63156255 | A | 6/1988 |
| WO | WO95/04328 | A1 | 2/1995 |
| WO | WO9504328 | A1 | 2/1995 |
| WO | WO96/25724 | A1 | 8/1996 |
| WO | WO9720281 | A1 | 6/1997 |
| WO | WO9750063 | A2 | 12/1997 |
| WO | 9819237 | A1 | 5/1998 |

OTHER PUBLICATIONS

HTC Defendants' Answer to Plaintiff's Complaint for Patent Infringement and Counterclaims, *Gemalto* V. *HTC*, Civil Action No. 6:10-cv-561(LED) (E.D.Tex. Feb. 25, 2011).

Amended Complaint for Patent Infringement, *Gemalto* V. *HTC*, Civil Action No. 6:10-cv-561(LED) (E.D.Tex. Jan. 26, 2011).

Samsung Electronics Co., Ltd and Samsung Telecommunications America LLC's Answer to Plaintiff's Amended Complaint for Patent Infringement, *Gemalto* V. *HTC*, Civil Action No. 6:10-cv-561(LED) (E.D.Tex. Feb. 25, 2011).

Motorola Mobility's Answer to Plaintiff's Amended Complaint for Patent Infringement and Counterclaims, *Gemalto* V. *HTC*, Civil Action No. 6:10-cv-561(LED) (E.D.Tex. Feb. 25, 2011).

Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Exhibit A of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-1 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-2 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-3 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-4 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-5 of: Invalidity Contentions filed with the US District Court for the Eastern District of Texas, Tyler Division, by a Defendant on Oct. 31, 2011 in which arguments are presented that claims in US

(56) References Cited

OTHER PUBLICATIONS 6,308,317, US 7,117,485 and US 7,818,727 are invalid or unenforceable in *Gemalto S.A.* v. *HTC Corporation*, Civil Action No. 6:10-CV-561-LED.
Chart A-6 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-7 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-8 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-9 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-10 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-11 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-12 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-13 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-14 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-15 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-16 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-17 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-18 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-19 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-20 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-21 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-22 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-23 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-24 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-25 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-26 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-27 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-28 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

(56) References Cited

OTHER PUBLICATIONS

Chart A-29 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-30 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-31 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-32 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-33 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-34 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-35 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-36 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Exhibit B of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Michal Cierniak, et al., Briki: a Fexible Java Compiler, Technical Report 621, May 1996, Department of Computer Science, University of Rochester, Rochester, NY.
Michal Cierniak, et al., Briki: an Optimizing Java Compiler, 1997, IEEE, p. 179-184.
Adl-Tabatabai, Ali-Reza, et al., Efficient and Language-Independent Mobile Programs, Extended Abstract, School of Computer Science, Carnegie Mellon University, Pittsburgh, PA., Oct. 22, 1995.
Lucco, et al., Colusa Software White Paper, Omniware: A Universal Substrate for Mobile Code, 1995.
Steven Lucco, et al., Omniware: A Universal Substrate for Web Programming, 1995.
Walter R. Smith, The Newton Application Architecture, Proceedings of the 39th IEEE Computer Society International Conference, pp. 156-161, San Francisco, 1994.
Jonathan C. Hardwick, et al., Java as an Intermediate Language, Aug. 12, 1996, School of Computer Science, Carnegie Mellon University, Pittsburgh, PA.
Pierre Paradinas, et al., A Personal and Portable Database Server: the CQL Card, Lecture Notes in Computer Science (Applications of Databases), 1994, vol. 819, pp. 444-457.
Pieter H. Hartel, et al., Towards testability in smart card operating system design, CARDIS 94, Lille, France, 1994, p. 1-16.
Olivier Caron, et al., New architectures for smart cards: the OCEAN approach, IEEE, 1994, p. 148-155.
Brian T. Lewis, et al., Clarity MCode: A Retargetable Intermediate Representation for Compilation, ACM, May 1995, p. 119-128.
Jack W. Davidson, et al., Cint: A RISC Interpreter for the C Programming Language, 1987, p. 189-198, Association for Computing Machinery.
Richard P. Gabriel, Performance and Evaluation of Lisp Systems, The MIT Press in their Computer System Series. (ISBN 0-262-07093-6), Aug. 14, 1985, whole document, The Massachusetts Institute of Technology, Cambridge, Massachusetts.
David Gries, Compiler Construction for Digital Computers, 1971, John Wiley & Sons, Inc., Toronto, Canada.
General Magic, Inc., Telescript Language Reference, Oct. 1995., Sunnyvale, CA.
General Magic, Inc., Telescript Programming Guide V0.5, Oct. 19, 1995, Sunnyvale, CA.
Gregory John Michaelson, Interpreter prototypers from formal language definitions, Apr. 1993, Thesis submitted for the degree of Doctor of Philosophy, Heriot-Watt University, Edinburgh, Scotland.
J. Bradley Chen, et al., Morph: A Framework for Platform-Specific Optimization, Technical Report 04-96, Center for Research in Computing Technology, Harvard University, Cambridge, MA, Mar. 12, 1996.
Scott Draves, Compiler Generation for Interactive Graphics using Intermediate Code, Lecture Notes in Computer Science, vol. 1110/1996, 1996.
Frederick Colville Knabe, Language Support for Mobile Agents, CMU-CS-95-223, School of Computer Science Carnegie Mellon University, Pittsburgh, PA 15213, Submitted in partial fulfillment of the requirements for the degree of Doctor of Philosophy, Dec. 1995.
Henry M. Wu, Scheme86 An Architecture for Microcoding a Scheme Interpreter, Aug. 1988, Artificial Intelligence Laboratory and Department of Electrical Engineering and Computer Science, Massachusetts Institute of Technology, Cambridge, MA.
Christopher W. Fraser, et al., Custom Instruction Sets for Code Compression, Oct. 19, 1995.
David F. Bacon, et al., Compiler Transformations for High-Performance Computing, ACM Computing Surveys, vol. 26, No. 4, Dec. 1994.
David S. Blickstein, et al., The GEM Optimizing Compiler System, Digital Technical Journal, vol. 4, No. 4, Special Issue 1992.
CASL Programmers Reference, publication date unknown, possibly before 1997.
Enrico Ballarin, et al., Making a Compiler Easily Portable, May 1988, IEEE Software, IEEE, pp. 30-38.
James Gosling, Java Intermediate Bytecodes, ACM SIGPLAN Workshop on Intermediate Representations, ACM, 1995.
Greg Hewgill, Jump User's Manual Version 1.0 Beta 4, Oct. 1997 (earlier version 1996).
David G. Messerschmitt, Important future technologies—Java,—CORBA, Department of Electrical Engineering and Computer Sciences, Lecture Mar. 30, 1997.
Daniel P. Miranker, et al., The Organization and Performance of a TREAT-Based Production System Compiler, IEEE Transactions on Knowledge and Data Engineering, vol. 3, No. 1, Mar. 1991, IEEE, p. 3-10.
Dave Birch, et al., Multi-Application Smartcard Platforms The third way, Hyperion Systems Limited, Nov. 14, 1998, p. 1-5.
Kin-Man Chung, et al., A "Tiny" Pascal Compiler, Part 1: The P-Code Interpreter, Sep. 1978, BYTE Publications Inc.
Thomas Gustafsson, Control, et al, Regsim: A Software Tool for Real Time Control and Simulation, 1995 Proceedings of the 4th IEEE Conference on Control Applications, Piscataway, NJ, IEEE, 1995, p. 168-173.

(56) References Cited

OTHER PUBLICATIONS

William Rowan, A LISP Compiler Producing Compact Code, LPF '80 Proceedings of the 1980 ACM Conference on LISP and Functional Languages, ACM, pp. 216-222.
Stefano Crespi-Reghizzi, et al., A Survey of Microprocessor Languages, Computer, Jan. 1980, p. 48-66, IEEE Computer Society Press, Los Alamitos, CA.
Kemal Ebcioglu, et al., VLIW Compilation Techniques in a Superscalar Environment, ACM SIG Plan Notices, vol. 29, No. 6, Proceedings of the ACM SIGLAN '94 Conference on Programming Language Design and Implementation (PLDI) Jun. 20-24, 1994, pp. 36-48.
John Banning, The XDOS Binary Code Conversion System, IEEE, 1989, p. 282-287.
Cheng-Hsueh A. Hsieh, et al., Java Bytecode to Native Code Translation: The Caffeine Prototype and Preliminary Results, Published in the Proceedings of the 29th Annual International Symposium on Microarchitecture, p. 1-8, Dec. 2-4, 1996, Paris, France, IEEE, 1996.
Paul Tarau, et al., The Power of Partial Translation: An Experiment With the C-Ification of Binary Prolog, ACM, p. 152-156, 1995.
Frank Yellin, The JIT Compiler API, Sun Microsystems Inc., Oct. 4, 1996, p. 1-23.
James Gosling, et al., The JavaTM Language Environment, A White Paper, JAVASOFT, Sun Microsystems Inc., Mountain View, CA, May 1996.
Olin Shivers, Supporting dynamic languages on the Java virtual machine, A.I. Memo No. 1576, Apr. 1996, Massachusetts Institute of Technology Artificial Intelligence Laboratory, Cambridge, MA.
Craig Chambers, et al., Whole-Program Optimization of Object-Oriented Languages, Department of Computer Science and Engineering, University of Washington, Seattle, Washington, Technical Report Jun. 2, 1996, Jun. 6, 1996.
Bjarne Steensgaard, et al., Object and Native Code Thread Mobility Among Heterogeneous Computers, ACM, 1995.
T.L. Harris, A just-in-time Java byte-code compiler, Oct. 22, 1996, Churchill College, p. 1-6, Churchill College.
BASIC stamp user manual, Parallax, Inc., 1993.
BASIC stamp I—Instruction List, Parallax, Inc., 1993.
BASIC stamp—Syntax Description, Parallax, Inc., 1993.
Chuck McManis, Decoding The BASIC Stamp, 1994 (http://www.mcmanis.com/chuck/robotics/stamp-decode.html, accessed on Mar. 6, 2012).
Clark Lindsey, et al., Javelin Stamp, JAVATECH: An Introduction to Scientific and Technical Computing with JAVA, chapter 24, Dec. 14, 2004 (web version at http://www.particle.kth.se/~lindsey/JavaCourse/Book/Part3/Chapter24/Javelin.html accessed on Mar. 6, 2012).
Al Williams, Scaling Java, Embedded Systems Programming Magazine, Jun. 2001, http://www.eetimes.com/design/embedded/4023339/Scaling-Java (accessed on Mar. 6, 2012).
Manuel E. Benitez, et al., A Portable Global Optimizer and Linker, Proceedings of the SIGPLAN '88 Conference on Programming Language Design and Implementation, Atlanta, Georgia, Jun. 22-24, ACM, 1988, p. 329-338.
Parallax Inc: Origins, http://www.parallax.com/tabid/791/Default.aspx (accessed on Mar. 6, 2012).
p-System: Description, Background, Utilities, Education Technology Center, Dept. of Information and Computer Science, University of California, Irvine, CA, http://www.ics.uci.edu/~archive/documentation/p-system/p-system.html (accessed on Mar. 6, 2012).
Stephen Pelc, The Evolution of SENDIT Into EPIC, Proceedings of the 1996 Rochester Conference on Open Systems, Jun. 19-22, 1996, Ryerson Polytechnic University, Toronto, Ontario, Canada, Jun. 19-22, 1996, p. 63-67.
Peter Johannes, et al., A Platform-Independent Token System for Payment rerminals, Forth Dimensions, vol. XIX, No. 2, Jul.-Aug. 1997, pp. 7-11.
Open Terminal Architecture System Overview, Europay International SA, Waterloo, Belgium, Version 2.1, May 19, 1997.
Europay International, Open Terminal Architecture (OTA) for Multi-application Smart Card Terminals, Waterloo, Belgium, p. 1-6, whole document, 1996.
E. D. Rather and D.A. Ruffer, A Platform-independent Token System for Payment Terminals (V1), Forth, Inc., pp. 1-7, 1996.
E. D. Rather, S.F. Pelc, and P. Johannes, A Platform-independent Token System for Payment Terminals (V2), pp. 1-6, 1996.
E. D. Rather, et al., A Platform-independent Token System for Payment Terminals, Forth Dimensions XIX/2, No. 2, Jul.-Aug. 1997, Forth Interest Group, Carmel, CA, p. 7-11.
E. D. Rather, et al., The Europay Open Terminal Architecture, A Forth-based Token System for Payment Terminals, Proceedings of the 1996 Rochester Conference on Open Systems, Jun. 1996.
Peter Wayner, State of the Art Sun Gambles on Java Chips, BYTE, Nov. 1996, p. 79, 80, 82, 84, 86 and 88.
Claus M. Muller, Java—mehr als eine programmiersprache, Heidelberg, Germany, 1996 (in German, Translation not available).
Europay Announces OTA, Smart Card News, ISSN: 0967-196X, Brighton, England, Jul. 1996, p. 125.
E. D. Rather, et al., The Europay Open Terminal Archetecture A Forth-based Token System for Payment Terminals (2nd of 3 papers on OTA), Proceedings of the 1996 Rochester Conference on Open Systems, Jun. 1996, pp. 73-77.
Europay International S.A., Open Terminal Architecture (OTA) Specification, vol. 1: Virtual Machine Specification, Waterloo, Belgium, Version 3.3, Dec. 15, 1998.
Europay International S.A., Open Terminal Architecture (OTA) Specification, vol. 2: Forth Language Programming Interface, Waterloo, Belgium, Version 3.0, Feb. 11, 1999.
Europay International S.A., Open Terminal Architecture (OTA) Specification, vol. 3: C Language Programming Interface, Waterloo, Belgium, Version 3.2, Dec. 9, 1998.
Europay International S.A., Open Terminal Architecture (OTA) Specification, vol. 4: Mixed Language Programming, Waterloo, Belgium, Version 1.1, Jul. 1, 1997.
Europay International S.A., TKTP Reference Manual, Version 4.4, Mar. 10, 1999.
E. D. Rather, et al., The Europay Open Terminal Archetecture A Forth-based Token System for Payment Terminals 1st of 3 papers on OTA), Proceedings of the 1996 Rochester Conference on Open Systems, Jun. 1996, pp. 27-29.
Pierre Paradinas, et al., New Directions for Integrated Circuit Cards Operating Systems, Operating Systems Review, 29(1):56-61, 1995 (Accessed from http://cedric.cnam.fr/%7Eparadinas/presentation/OSR.pdf on Mar. 6, 2012).
Defendants 3-3 and 3-6 Invalidity Contentions: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Exhibit A of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-1 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-2 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-3 of: Amended Invalidity Contentions filed with the US District Court for the Eastern District of Texas, Tyler Division, by a Defendant on Oct. 23, 2012 in which arguments are presented that

(56) References Cited

OTHER PUBLICATIONS claims in US 6,308,317, US 7,117,485 and US 7,818,727 are invalid or unenforceable in *Gemalto S.A.* v. *HTC Corporation*, Civil Action No. 6:10-CV-561-LED.

Chart A-4 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-5 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-6 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-7 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-8 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-9 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-10 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-11 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-12 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-13 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-14 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-15 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-16 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-17 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-18 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-19 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-30 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-32 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-33 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-34 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-35 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-36 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-37 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

(56) References Cited

OTHER PUBLICATIONS

Chart A-38 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Exhibit B: List of Prior Art: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
*Gemalto S.A.* vs. *HTC Corporation, et al.*, Case No. 6:10-CV-561 LED-JDL, Report and Recommendation of United States Magistrate Judge, Jun. 28, 2012, United States District Court for the Eastern District of Texas, Tyler Division, whole Document.
*Gemalto S.A.* vs. *HTC Corporation, et al.*, Case No. 6:10-CV-561 LED-JDL, Memorandum Opinion and Order, Jun. 28, 2012, United States District Court for the Eastern District of Texas, Tyler Division, whole Document and Appendix A.
Palsberg Expert Report on Invalidity filed with the US District Court for the Eastern District of Texas, Tyler Division, on Dec. 5, 2012. *Gemalto S.A.* v. *HTC Corporation* Case 6:10-CV-561-LED relating to claims in U.S. Patent 6,308,317, 7,117,485, and 7,818,727.
Exhibit A—to the Expert Report of Jens Palsberg, Ph.D.: List of Materials Considered, filed with the US District Court for the Eastern District of Texas, Tyler Division, on Dec. 5, 2012. *Gemalto S.A.* v. *HTC Corporation* Case 6:10-CV-561-LED relating to claims in U.S. Patent 6,308,317, 7,117,485, and 7,818,727.
Exhibit B—Curriculum Vitae of Jens Palsberg, Ph.D.: List of Materials Considered, filed with the US District Court for the Eastern District of Texas, Tyler Division, on Dec. 6, 2012. *Gemalto S.A.* v. *HTC Corporation* Case 6:10-CV-561-LED relating to claims in U.S. Patent 6,308,317, 7,117,485, and 7,818,727.
Exhibit C—filed with the US District Court for the Eastern District of Texas, Tyler Division, on Dec. 5, 2012. *Gemalto S.A.* v. *HTC Corporation* Case 6:10-CV-561-LED relating to claims in U.S. Patent 6,308,317, 7,117,485, and 7,818,727.
Supplimental Expert Report of Dr. Jens Palsberg, Ph.D. filed with the US District Court for the Eastern District of Texas, Tyler Division, on Dec. 7, 2012. *Gemalto S.A.* v. *HTC Corporation* Case 6:10-CV-561-LED relating to claims in U.S. Patent 6,308,317, 7,117,485, and 7,818,727.
Chart C-1 filed with the US District Court for the Eastern District of Texas, Tyler Division, on Dec. 5, 2012. *Gemalto S.A.* v. *HTC Corporation* Case 6:10-CV-561-LED relating to claims in U.S. Patent 6,308,317, 7,117,485, and 7,818,727.
Chart C-2 filed with the US District Court for the Eastern District of Texas, Tyler Division, on Dec. 5, 2012. *Gemalto S.A.* v. *HTC Corporation* Case 6:10-CV-561-LED relating to claims in U.S. Patent 6,308,317, 7,117,485, and 7,818,727.
Chart C-3 filed with the US District Court for the Eastern District of Texas, Tyler Division, on Dec. 5, 2012. *Gemalto S.A.* v. *HTC Corporation* Case 6:10-CV-561-LED relating to claims in U.S. Patent 6,308,317, 7,117,485, and 7,818,727.
Chart C-4 filed with the US District Court for the Eastern District of Texas, Tyler Division, on Dec. 5, 2012. *Gemalto S.A.* v. *HTC Corporation* Case 6:10-CV-561-LED relating to claims in U.S. Patent 6,308,317, 7,117,485, and 7,818,727.
Chart C-5 filed with the US District Court for the Eastern District of Texas, Tyler Division, on Dec. 5, 2012. *Gemalto S.A.* v. *HTC Corporation* Case 6:10-CV-561-LED relating to claims in U.S. Patent 6,308,317, 7,117,485, and 7,818,727.
Chart C-6 filed with the US District Court for the Eastern District of Texas, Tyler Division, on Dec. 5, 2012. *Gemalto S.A* v. *HTC Corporation* Case 6:10-CV-561-LED relating to claims in U.S. Patent 6,308,317, 7,117,485, and 7,818,727.

* cited by examiner

COMPUTER PROGRAM PRODUCT CONTAINING INSTRUCTIONS FOR PROVIDING A PROCESSOR THE CAPABILITY OF EXECUTING AN APPLICATION DERIVED FROM A COMPILED FORM

CROSS REFERENCE TO RELATED APPLICATIONS

This application is a continuation application, under 35 U.S.C. §120, of application Ser. No. 11/537,156, filed Sep. 29, 2006, now U.S. Pat. No. 7,818,727, which is a continuation application of application Ser. No. 10/037,390, filed Oct. 23, 2001, now U.S. Pat. No. 7,117,485, which is a continuation of application Ser. No. 08/957,512, filed Oct. 24, 1997, now U.S. Pat. No. 6,308,317, and which, under 35 U.S.C. §119(e), claims benefit of prior U.S. provisional application Ser. No. 60/029,057, filed Oct. 25, 1996. The entire disclosures of these prior applications are incorporated herein in their entireties by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates in general to the field of programming, and more particularly to using a high level programming language with a smart card or a microcontroller.

Software applications written in the Java high-level programming language have been so designed that an application written in Java can be run on many different computer brands or computer platforms without change. This is accomplished by the following procedure. When a Java application is written, it is compiled into "Class" files containing byte codes that are instructions for a hypothetical computer called a Java Virtual Machine. An implementation of this virtual machine is written for each platform that is supported. When a user wishes to run a particular Java application on a selected platform, the class files compiled from the desired application is loaded onto the selected platform. The Java virtual machine for the selected platform is run, and interprets the byte codes in the class file, thus effectively running the Java application.

Java is described in the following references which are hereby incorporated by reference: (1) Arnold, Ken, and James Gosling, "The Java Programming Language," Addison-Wesley, 1996; (2) James Gosling, Bill Joy, and Guy Steele, "The Java Language Specification," Sun Microsystems, 1996, (web site: http://java.sun.com/doc/language_specification); (3) James Gosling and Henry McGilton, "The Java Language Environment: A White Paper," Sun Microsystems, 1995 (web site: http://java.sun.com/doc/language_environment/); and (4) Tim Lindholm and Frank Yellin, "The Java Virtual Machine Specification," Addison-Wesley, 1997. These texts among many others describe how to program using Java.

In order for a Java application to run on a specific platform, a Java virtual machine implementation must be written that will run within the constraints of the platform, and a mechanism must be provided for loading the desired Java application on the platform, again keeping within the constraints of this platform.

Conventional platforms that support Java are typically microprocessor-based computers, with access to relatively large amounts of memory and hard disk storage space. Such microprocessor implementations frequently are used in desktop and personal computers. However, there are no conventional Java implementations on microcontrollers, as would typically be used in a smart card.

Microcontrollers differ from microprocessors in many ways. For example, a microprocessor typically has a central processing unit that requires certain external components (e.g., memory, input controls and output controls) to function properly. A typical microprocessor can access from a megabyte to a gigabyte of memory, and is capable of processing 16, 32, or 64 bits of information or more with a single instruction. In contrast to the microprocessor, a microcontroller includes a central processing unit, memory and other functional elements, all on a single semiconductor substrate, or integrated circuit (e.g., a "chip"). As compared to the relatively large external memory accessed by the microprocessor, the typical microcontroller accesses a much smaller memory. A typical microcontroller can access one to sixty-four kilobytes of built-in memory, with sixteen kilobytes being very common.

There are generally three different types of memory used: random access memory (RAM), read only memory (ROM), and electrically erasable programmable read only memory (EEPROM). In a microcontroller, the amount of each kind of memory available is constrained by the amount of space on the integrated circuit used for each kind of memory. Typically, RAM takes the most space, and is in shortest supply. ROM takes the least space, and is abundant. EEPROM is more abundant than RAM, but less than ROM.

Each kind of memory is suitable for different purposes. Although ROM is the least expensive, it is suitable only for data that is unchanging, such as operating system code. EEPROM is useful for storing data that must be retained when power is removed, but is extremely slow to write. RAM can be written and read at high speed, but is expensive and data in RAM is lost when power is removed. A microprocessor system typically has relatively little ROM and EEPROM, and has 1 to 128 megabytes of RAM, since it is not constrained by what will fit on a single integrated circuit device, and often has access to an external disk memory system that serves as a large writable, non-volatile storage area at a lower cost than EEPROM. However, a microcontroller typically has a small RAM of 0.1 to 2.0 K, 2K to 8K of EEPROM, and 8K-56K of ROM.

Due to the small number of external components required and their small size, microcontrollers frequently are used in integrated circuit cards, such as smart cards. Such smart cards come in a variety of forms, including contact-based cards, which must be inserted into a reader to be used, and contactless cards, which need not be inserted. In fact, microcontrollers with contactless communication are often embedded into specialized forms, such as watches and rings, effectively integrating the functionality of a smart card in an ergonomically attractive manner.

Because of the constrained environment, applications for smart cards are typically written in a low level programming language (e.g., assembly language) to conserve memory.

The integrated circuit card is a secure, robust, tamper-resistant and portable device for storing data. The integrated circuit card is the most personal of personal computers because of its small size and because of the hardware and software data security features unique to the integrated circuit card.

The primary task of the integrated circuit card and the microcontroller on the card is to protect the data stored on the card. Consequently, since its invention in 1974, integrated circuit card technology has been closely guarded on these same security grounds. The cards were first used by French banks as debit cards. In this application, before a financial transaction based on the card is authorized, the card user must demonstrate knowledge of a 4-digit personal identification number (PIN) stored in the card in addition to being in possession of the card. Any information that might contribute to discovering the PIN number on a lost or stolen card was blocked from public distribution. In fact, since nobody could tell what information might be useful in this regard, virtually all information about integrated circuit cards was withheld.

Due to the concern for security, applications written for integrated circuit cards have unique properties. For example, each application typically is identified with a particular owner or identity. Because applications typically are written in a low-level programming language, such as assembly language, the applications are written for a particular type of microcontroller. Due to the nature of low level programming languages, unauthorized applications may access data on the integrated circuit card. Programs written for an integrated circuit card are identified with a particular identity so that if two identities want to perform the same programming function there must be two copies of some portions of the application on the microcontroller of the integrated circuit card.

Integrated circuit card systems have historically been closed systems. An integrated circuit card contained a dedicated application that was handcrafted to work with a specific terminal application. Security checking when an integrated circuit card was used consisted primarily of making sure that the card application and the terminal application were a matched pair and that the data on the card was valid.

As the popularity of integrated circuit cards grew, it became clear that integrated circuit card users would be averse to carrying a different integrated circuit card for each integrated circuit card application. Therefore, multiple cooperating applications began to be provided on single provider integrated circuit cards. Thus, for example, an automated teller machine (ATM) access card and a debit card may coexist on a single integrated circuit card platform. Nevertheless, this was still a closed system since all the applications in the terminal and the card were built by one provider having explicit knowledge of the other providers.

The paucity of information about integrated circuit cards—particularly information about how to communicate with them and how to program them—has impeded the general application of the integrated circuit card. However, the advent of public digital networking (e.g., the Internet and the World Wide Web) has opened new domains of application for integrated circuit cards. In particular, this has lead to a need to load new applications on the card that do not have explicit knowledge of the other providers, but without the possibility of compromising the security of the card. However, typically, this is not practical with conventional cards that are programmed using low level languages.

SUMMARY OF THE INVENTION

In general, in one aspect, the invention features an integrated circuit card for use with a terminal. The integrated circuit card includes a memory that stores an interpreter and an application that has a high level programming language format. A processor of the card is configured to use the interpreter to interpret the application for execution and to use a communicator of the card to communicate with the terminal.

Among the advantages of the invention are one or more of the following. New applications may be downloaded to a smart card without compromising the security of the smart card. These applications may be provided by different companies loaded at different times using different terminals. Security is not compromised since the applications are protected against unauthorized access of any application code or data by the security features provided by the Java virtual machine. Smart card applications can be created in high level languages such as Java and Eiffel, using powerful mainstream program development tools. New applications can be quickly prototyped and downloaded to a smart card in a matter of hours without resorting to soft masks. Embedded systems using microcontrollers can also gain many of these advantages for downloading new applications, high level program development, and rapid prototyping by making use of this invention.

Implementations of the invention may include one or more of the following. The high level programming language format of the application may have a class file format and may have a Java programming language format. The processor may be a microcontroller. At least a portion of the memory may be located in the processor.

The application may have been processed from a second application that has a string of characters, and the string of characters may be represented in the first application by an identifier (e.g., an integer).

The processor may be also configured to receive a request from a requester (e.g., a processor or a terminal) to access an element (e.g., an application stored in the memory, data stored in the memory or the communicator) of the card, after receipt of the request, interact with the requester to authenticate an identity of the requester, and based on the identity, selectively grant access to the element.

The memory may also store an access control list for the element. The access control list furnishes an indication of types of access to be granted to the identity, and based on the access control list, the processor selectively grants specific types of access (e.g., reading data, writing data, appending data, creating data, deleting data or executing an application) to the requester.

The application may be one of a several applications stored in the memory. The processor may be further configured to receive a request from a requester to access one of the plurality of applications; after receipt of the request, determine whether said one of the plurality of applications complies with a predetermined set of rules; and based on the determination, selectively grant access to the requester to said one of the plurality of applications. The predetermined rules provide a guide for determining whether said one of the plurality of applications accesses a predetermined region of the memory. The processor may be further configured to authenticate an identity of the requester and grant access to said one of the plurality of applications based on the identity.

The processor may be also configured to interact with the terminal via the communicator to authenticate an identity; determine if the identity has been authenticated; and based on the determination, selectively allow communication between the terminal and the integrated circuit card.

The communicator and the terminal may communicate via communication channels. The processor may also be configured to assign one of the communication channels to the identity when the processor allows the communication between the terminal and the integrated circuit card. The processor may also be configured to assign a session key to the assigned communication channel and use the session key when the processor and the terminal communicate via the assigned communication channel.

The terminal may have a card reader, and the communicator may include a contact for communicating with the card reader. The terminal may have a wireless communication device, and the communicator may include a wireless transceiver for communicating with the wireless communication device. The terminal may have a wireless communication device, and the communicator may include a wireless transmitter for communicating with the wireless communication device.

In general, in another aspect, the invention features a method for use with an integrated circuit card and a terminal. The method includes storing an interpreter and at least one application having a high level programming language format in a memory of the integrated circuit card. A processor of the integrated circuit card uses the interpreter to interpret the at least one application for execution, and the processor uses a communicator of the card when communicating between the processor and the terminal.

In general, in another aspect, the invention features a smart card. The smart card includes a memory that stores a Java interpreter and a processor that is configured to use the interpreter to interpret a Java application for execution.

In general, in another aspect, the invention features a microcontroller that has a semiconductor substrate and a memory located in the substrate. A programming language interpreter is stored in the memory and is configured to implement security checks. A central processing unit is located in the substrate and is coupled to the memory.

Implementations of the invention may include one or more of the following. The interpreter may be a Java byte code interpreter. The security checks may include establishing firewalls and may include enforcing a sandbox security model.

In general, in another aspect, the invention features a smart card that has a programming language interpreter stored in a memory of the card. The interpreter is configured to implement security check. A central processing unit of the card is coupled to the memory.

In general, in another aspect, the invention features an integrated circuit card that is used with a terminal. The card includes a communicator and a memory that stores an interpreter and first instructions of a first application. The first instructions have been converted from second instructions of a second application. The integrated circuit card includes a processor that is coupled to the memory and is configured to use the interpreter to execute the first instructions and to communicate with the terminal via the communicator.

Implementations of the invention may include one or more of the following. The first and/or second applications may have class file format(s). The first and/or second applications may include byte codes, such as Java byte codes. The first instructions may be generalized or renumbered versions of the second instructions. The second instructions may include constant references, and the first instructions may include constants that replace the constant references of the second instructions. The second instructions may include references, and the references may shift location during the conversion of the second instructions to the first instructions. The first instructions may be relinked to the references after the shifting. The first instructions may include byte codes for a first type of virtual machine, and the second instructions may include byte codes for a second type of virtual machine. The first type is different from the second type.

In general, in another aspect, the invention features a method for use with an integrated circuit card. The method includes converting second instructions of a second application to first instructions of a first application; storing the first instructions in a memory of the integrated circuit card; and using an interpreter of the integrated circuit card to execute the first instructions.

In general, in another aspect, the invention features an integrated circuit for use with a terminal. The integrated circuit card has a communicator that is configured to communicate with the terminal and a memory that stores a first application that has been processed from a second application having a string of characters. The string of characters are represented in the first application by an identifier. The integrated circuit card includes a processor that is coupled to the memory. The processor is configured to use the interpreter to interpret the first application for execution and to use the communicator to communicate with the terminal.

In general, in another aspect, the invention features a method for use with an integrated circuit card and a terminal. The method includes processing a second application to create a first application. The second application has a string of characters. The string of characters is represented by an identifier in the second application. An interpreter and the first application are stored in a memory of the integrated circuit card. A processor uses an interpreter to interpret the first application for execution.

In general, in another aspect, the invention features a microcontroller that includes a memory which stores an application and an interpreter. The application has a class file format. A processor of the microcontroller is coupled to the memory and is configured to use the interpreter to interpret the application for execution.

In implementations of the invention, the microcontroller may also include a communicator that is configured to communicate with a terminal.

In general, in another aspect, the invention features a method for use with an integrated circuit card. The method includes storing a first application in a memory of the integrated circuit card, storing a second application in the memory of the integrated circuit card, and creating a firewall that isolates the first and second applications so that the second application cannot access either the first application or data associated with the first application.

In general, in another aspect, the invention features an integrated circuit card for use with a terminal. The integrated circuit card includes a communicator that is configured to communicate with the terminal, a memory and a processor. The memory stores applications, and each application has a high level programming language format. The memory also stores an interpreter. The processor is coupled to the memory and is configured to: a.) use the interpreter to interpret the applications for execution, b.) use the interpreter to create a firewall to isolate the applications from each other, and c.) use the communicator to communicate with the terminal.

Other advantages and features will become apparent from the following description and from the claims.

DETAILED DESCRIPTION OF THE PREFERRED EMBODIMENTS

Figure 1:
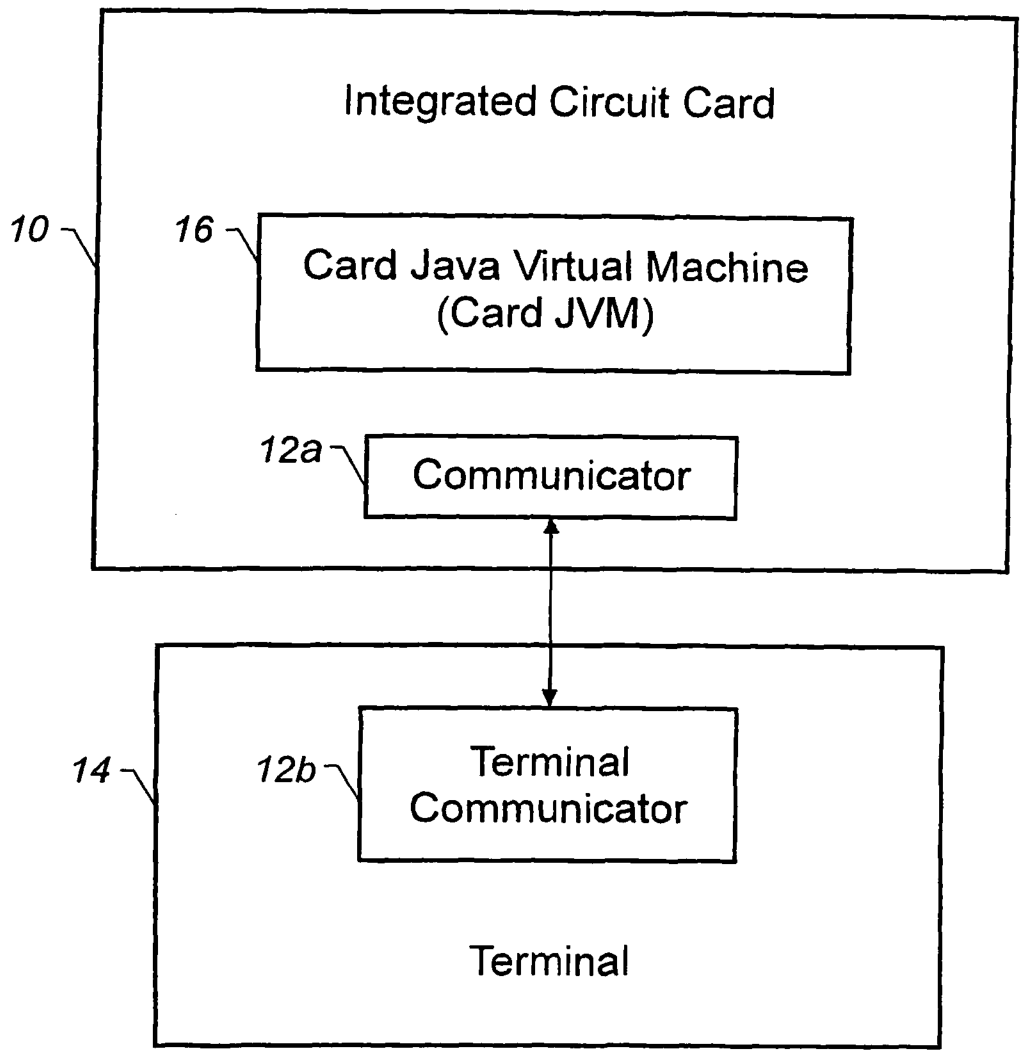
FIG. 1 is a block diagram of an integrated card system.

Referring to FIG. 1, an integrated circuit card 10 (e.g., a smart card) is constructed to provide a high level, Java-based, multiple application programming and execution environment. The integrated circuit card 10 has a communicator 12*a* that is configured to communicate with a terminal communicator 12*b* of a terminal 14. In some embodiments, the integrated circuit card 10 is a smart card with an 8 bit microcontroller, 512 bytes of RAM, 4K bytes of EEPROM, and 20K of ROM; the terminal communicator 12*b* is a conventional contact smart card reader; and the terminal 14 is a conventional personal computer running the Windows NT operating system supporting the personal computer smart card (PC/SC) standard and providing Java development support.

In some embodiments, the microcontroller, memory and communicator are embedded in a plastic card that has substantially the same dimensions as a typical credit card. In other embodiments, the microcontroller, memory and communicator are mounted within bases other than a plastic card, such as jewelry (e.g., watches, rings or bracelets), automotive equipment, telecommunication equipment (e.g., subscriber identity module (SIM) cards), security devices (e.g., cryptographic modules) and appliances.

The terminal 14 prepares and downloads Java applications to the integrated circuit card 10 using the terminal communicator 12*b*. The terminal communicator 12*b* is a communications device capable of establishing a communications channel between the integrated circuit card 10 and the terminal 14. Some communication options include contact card readers, wireless communications via radio frequency or infrared techniques, serial communication protocols, packet communication protocols, ISO 7816 communication protocol, to name a few.

The terminal 14 can also interact with applications running in the integrated circuit card 10. In some cases, different terminals may be used for these purposes. For example, one kind of terminal may be used to prepare applications, different terminals could be used to download the applications, and yet other terminals could be used to run the various applications. Terminals can be automated teller machines (ATMs), point-of-sale terminals, door security systems, toll payment systems, access control systems, or any other system that communicates with an integrated circuit card or microcontroller.

The integrated circuit card 10 contains a card Java virtual machine (Card JVM) 16, which is used to interpret applications which are contained on the card 10.

Figure 2:
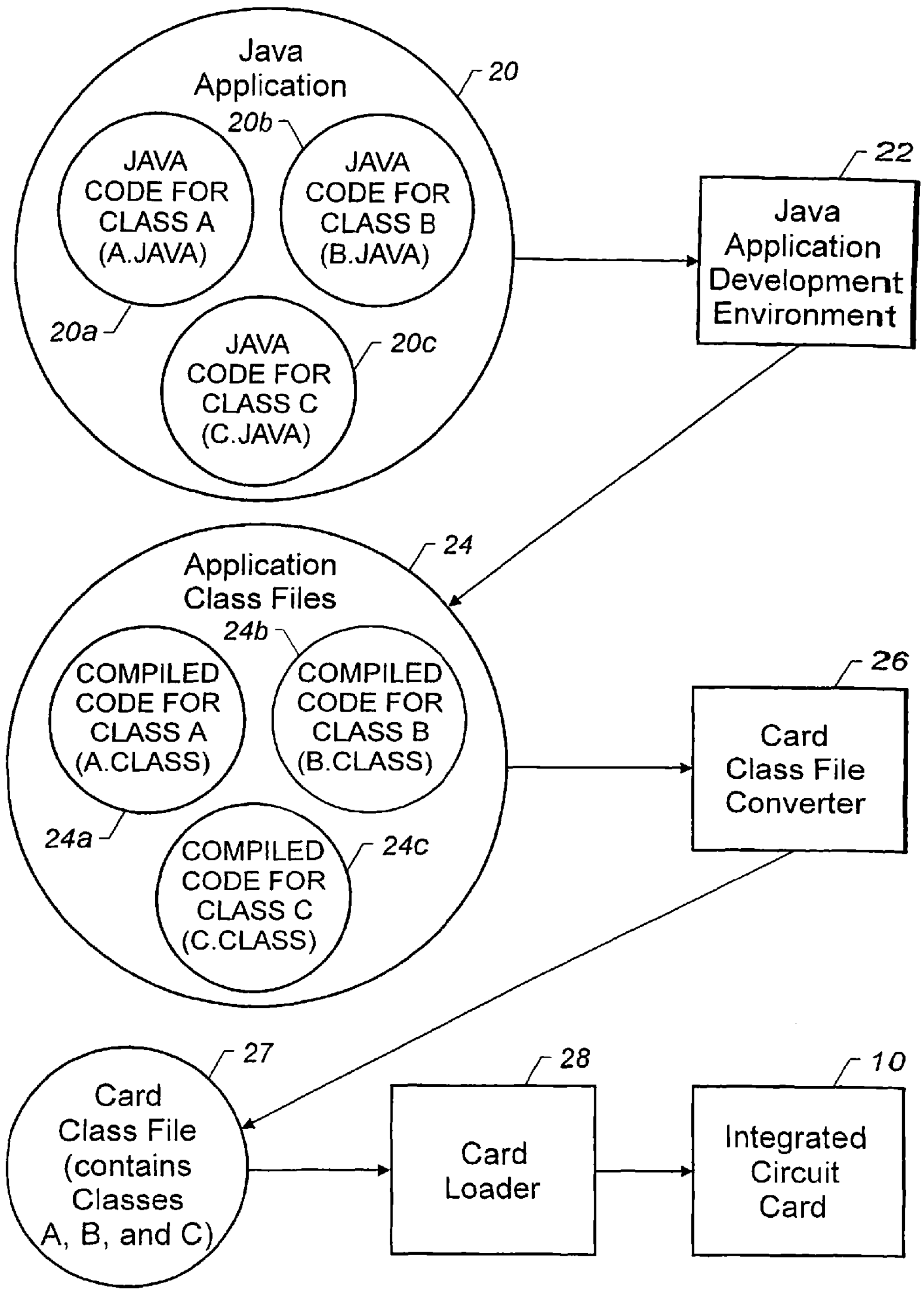
FIG. 2 is a flow diagram illustrating the preparation of Java applications to be downloaded to an integrated circuit card.

Referring to FIG. 2, the Java application 20 includes three Java source code files A.java 20*a*, B.java 20*b*, and C.java 20*c*. These source code files are prepared and compiled in a Java application development environment 22. When the Java application 20 is compiled by the development environment 22, application class files 24 are produced, with these class files A.class 24*a*, B.class 24*b*, and C.class 24*c* corresponding to their respective class Java source code 20*a*, 20*b*, and 20*c*. The application class files 24 follow the standard class file format as documented in chapter 4 of the Java virtual machine specification by Tim Lindholm and Frank Yellin, "The Java Virtual Machine Specification," Addison-Wesley, 1996. These application class files 24 are fed into the card class file converter 26, which consolidates and compresses the files, producing a single card class file 27. The card class file 27 is loaded to the integrated circuit card 10 using a conventional card loader 28.

Figure 3:
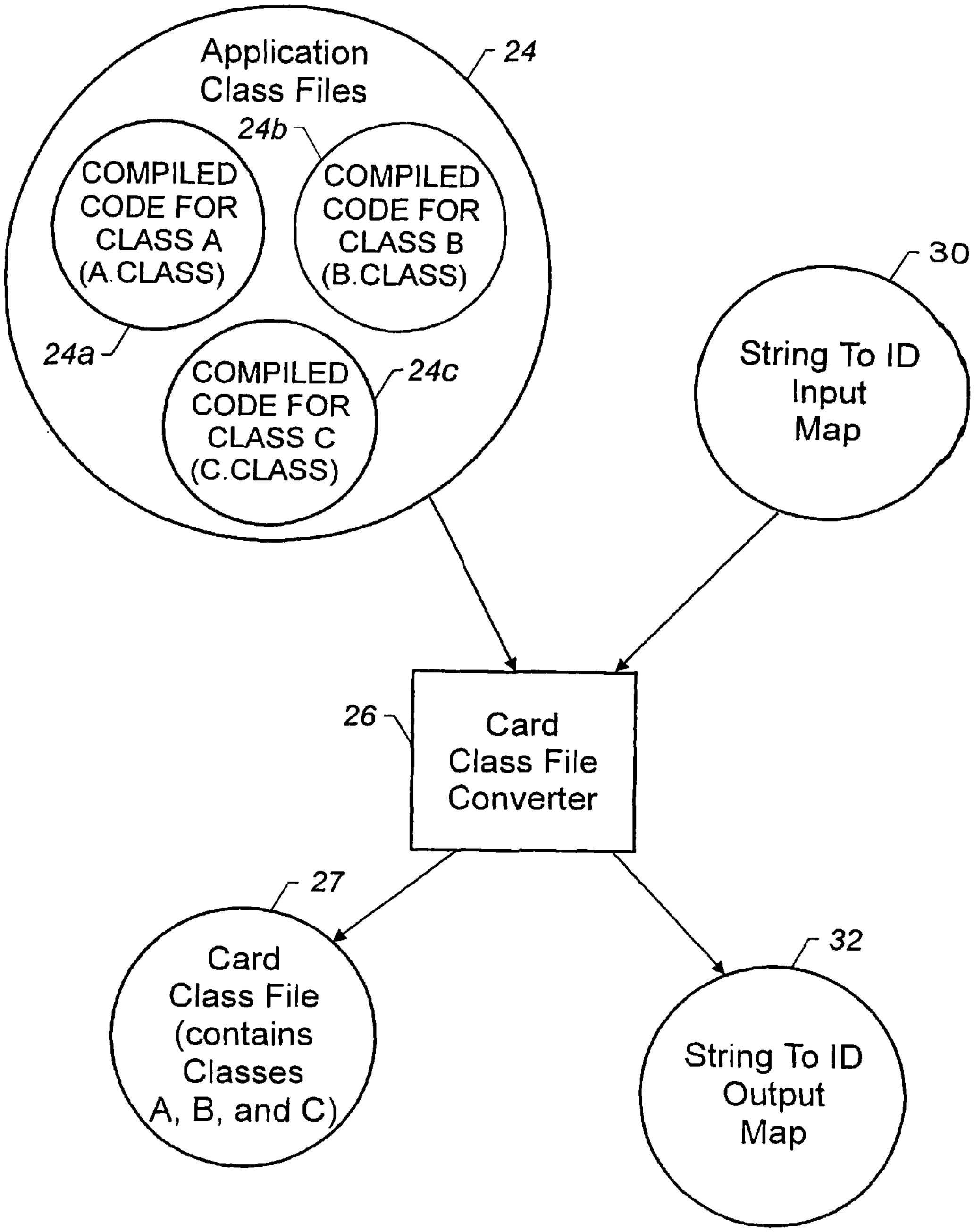
FIG. 3 is a block diagram of the files used and generated by the card class file converter.

Referring to FIG. 3, the card class file converter 26 is a class file postprocessor that processes a set of class files 24 that are encoded in the standard Java class file format, optionally using a string to ID input map file 30 to produce a Java card class file 27 in a card class file format. One such card class file format is described in Appendix A which is hereby incorporated by reference. In addition, in some embodiments, the card class file converter 26 produces a string to ID output map file 32 that is used as input for a subsequent execution of the card class file converter.

In some embodiments, in order for the string to ID mapping to be consistent with a previously generated card class file (in the case where multiple class files reference the same strings), the card class file converter 26 can accept previously defined string to ID mappings from a string to ID input map file 30. In the absence of such a file, the IDs are generated by the card class file converter 26. Appendix B, which is hereby incorporated by reference, describes one possible way of implementing and producing the string to ID input map file 30 and string to ID output map file 32 and illustrates this mapping via an example.

Figure 4:
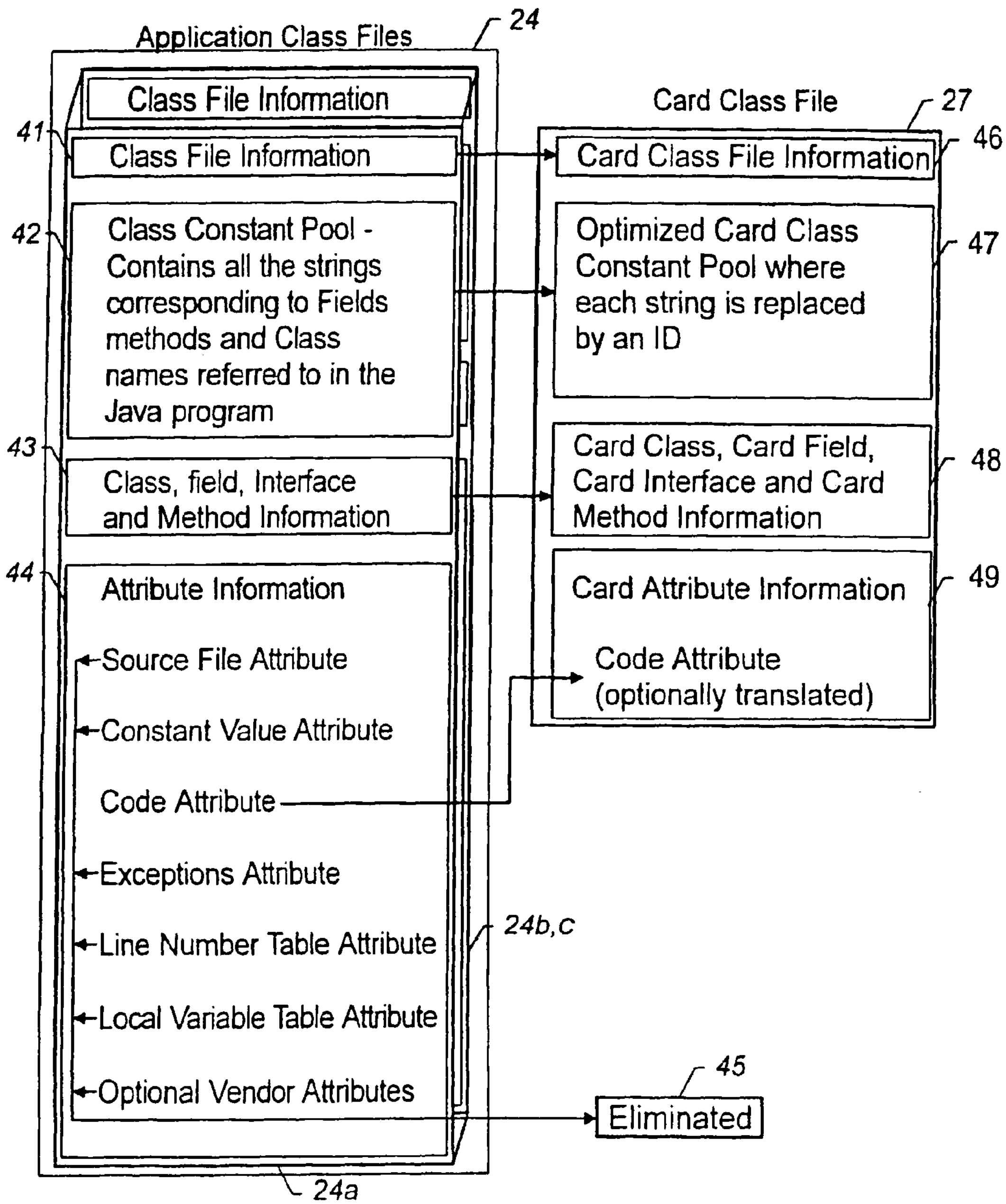
FIG. 4 is a block diagram illustrating the transformation of application class file(s) into a card class file.

Referring to FIG. 4, a typical application class file 24*a* includes class file information 41; a class constant pool 42; class, fields created, interfaces referenced, and method information 43; and various attribute information 44, as detailed in aforementioned Java Virtual Machine Specification. Note that much of the attribute information 44 is not needed for this embodiment and is eliminated 45 by the card class file converter 26. Eliminated attributes include SourceFile, ConstantValue, Exceptions, LineNumberTable, LocalVariable- Table, and any optional vendor attributes. The typical card class file 27 as described in Appendix A is derived from the application class files 24 in the following manner. The card class file information 46 is derived from the aggregate class file information 41 of all application class files 24*a*, 24*b*, and 24*c*. The card class file constant pool 47 is derived from the aggregate class constant pool 42 of all application class files 24*a*, 24*b*, and 24*c*. The card class, fields created, interfaces referenced, and method information 48 is derived from the aggregate class, fields created, interfaces referenced, and method information 43 of all application class files 24*a*, 24*b*, and 24*c*. The card attribute information 49 in this embodiment is derived from only the code attribute of the aggregate attribute information 44 of all application class files 24*a*, 24*b*, and 24*c*.

Figure 5:
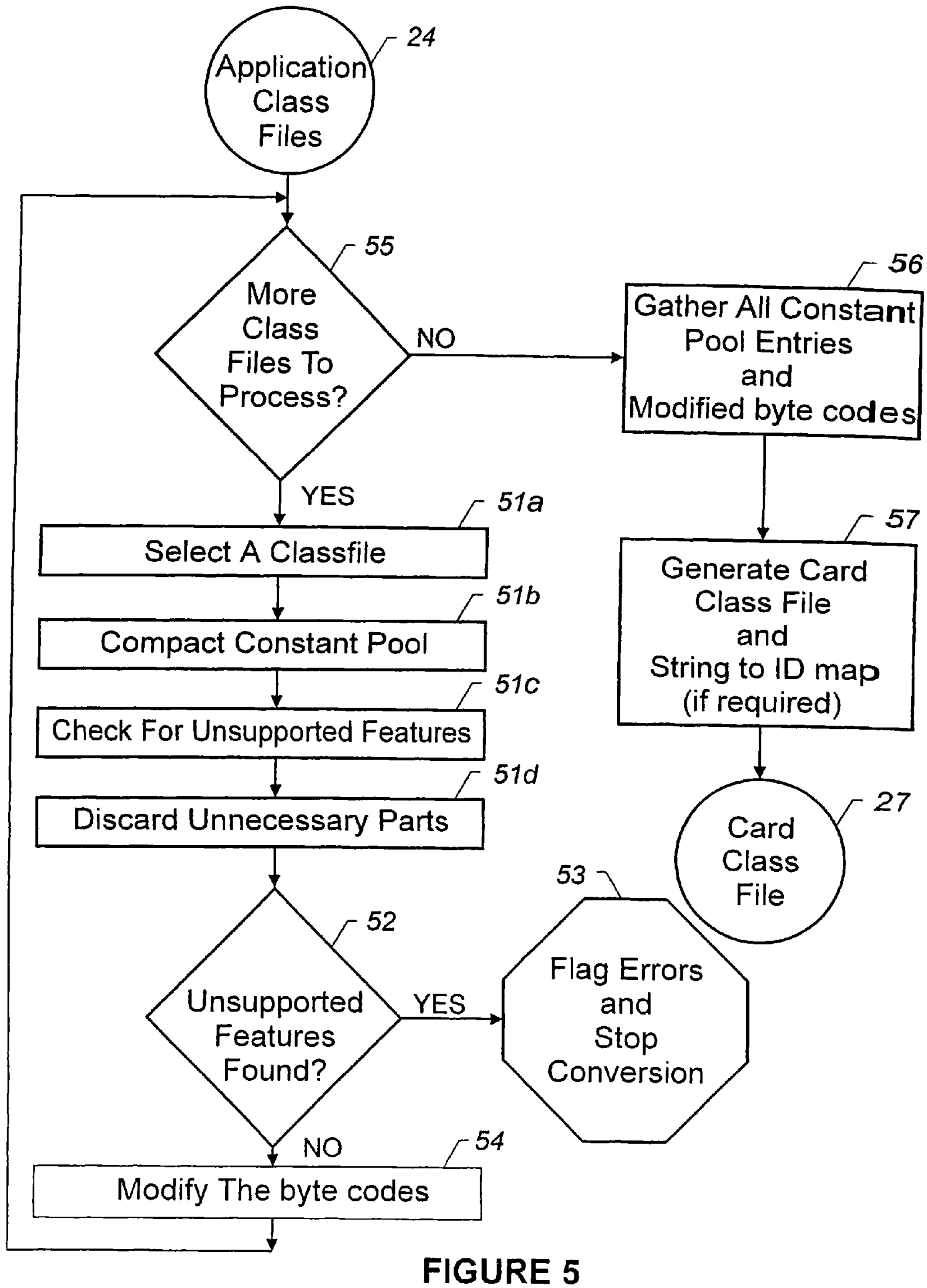
FIG. 5 is a flow diagram illustrating the working of the class file converter.

To avoid dynamic linking in the card, all the information that is distributed across several Java class files 24*a*, 24*b*, and 24*c* that form the application 24, are coalesced into one card class file 27 by the process shown in the flowchart in FIG. 5. The first class file to be processed is selected 51*a*. The constant pool 42 is compacted 51*b* in the following manner. All objects, classes, fields, methods referenced in a Java class file 24*a* are identified by using strings in the constant pool 42 of the class file 24*a*. The card class file converter 26 compacts the constant pool 42 found in the Java class file 24*a* into an optimized version. This compaction is achieved by mapping all the strings found in the class file constant pool 42 into integers (the size of which is microcontroller architecture dependent). These integers are also referred to as IDs. Each ID uniquely identifies a particular object, class, field or method in the application 20. Therefore, the card class file converter 26 replaces the strings in the Java class file constant pool 42 with its corresponding unique ID. Appendix B shows an example application HelloSmartCard.java, with a table below illustrating the IDs corresponding to the strings found in the constant pool of the class file for this application. The IDs used for this example are 16-bit unsigned integers.

Next, the card class file converter 26 checks for unsupported features 51*c* in the Code attribute of the input Java class file 24*a*. The Card JVM 16 only supports a subset of the full Java byte codes as described in Appendix C, which is hereby incorporated by reference. Hence, the card class file converter 26 checks for unsupported byte codes in the Code attribute of the Java class file 24*a*. If any unsupported byte codes are found 52, the card class file converter flags an error and stops conversion 53. The program code fragment marked "A" in APPENDIX D shows how these spurious byte codes are apprehended. Another level of checking can be performed by requiring the standard Java development environment 22 to compile the application 20 with a '-g' flag. Based on the aforementioned Java virtual machine specification, this option requires the Java compiler to place information about the variables used in a Java application 20 in the LocalVariableTable attribute of the class file 24*a*. The card class file converter 26 uses this information to check if the Java class file 24*a* references data types not supported by the Java card.

Next, the card class file converter 26 discards all the unnecessary parts 51*c* of the Java class file 24*a* not required for interpretation. A Java class file 24*a* stores information pertaining to the byte codes in the class file in the Attributes section 44 of the Java class file. Attributes that are not required for interpretation by the card JVM 16, such as SourceFile, ConstantValue, Exceptions, LineNumberTable, and LocalvariableTable may be safely discarded 45. The only attribute that is retained is the Code attribute. The Code attribute contains the byte codes that correspond to the methods in the Java class file 24*a*.

Modifying the byte codes 54 involves examining the Code attribute information 44 for each method in the class file, and modifying the operands of byte codes that refer to entries in the Java class file constant pool 42 to reflect the entries in the card class file constant pool 47. In some embodiments, the byte codes are also modified, as described below.

Figure 6:
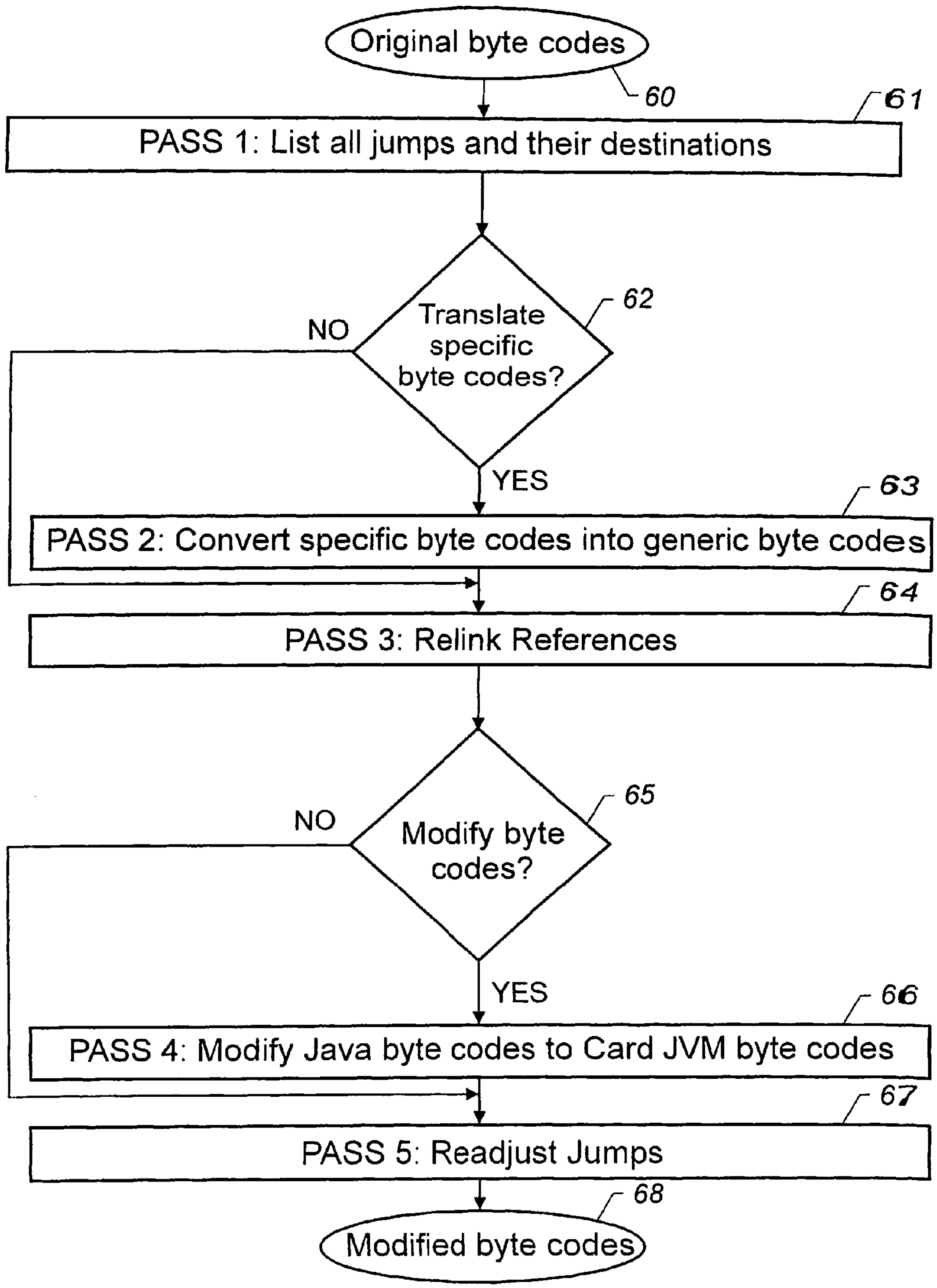
FIG. 6 is a flow diagram illustrating the modification of the byte codes.
Figure 7:
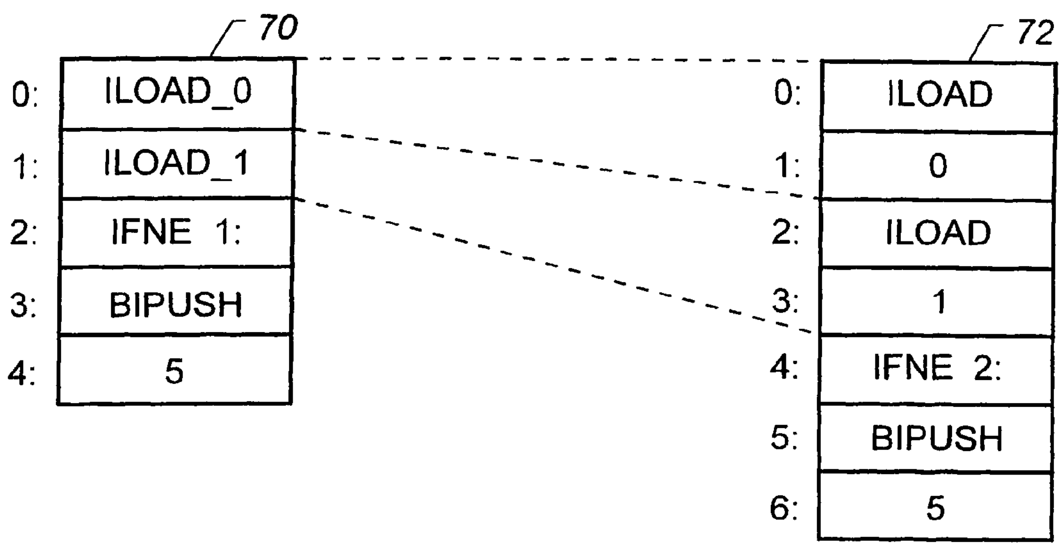
FIG. 7 is a block diagram illustrating the transformation of specific byte codes into general byte codes.

Modifying the byte codes 54 involves five passes (with two optional passes) as described by the flowchart in FIG. 6. The original byte codes 60 are found in the Code attribute 44 of the Java class file 24*a* being processed. The first pass 61 records all the jumps and their destinations in the original byte codes. During later byte code translation, some single byte code may be translated to dual or triple bytes. FIG. 7 illustrates an example wherein byte code ILOAD_0 is replaced with two bytes, byte code ILOAD and argument 0. When this is done, the code size changes, requiring adjustment of any jump destinations which are affected. Therefore, before these transformations are made, the original byte codes 60 are analyzed for any jump byte codes and a note made of their position and current destination. The program code fragment marked "B" in Appendix D shows how these jumps are recorded. Appendix D is hereby incorporated by reference.

Once the jumps are recorded, if the optional byte code translation is not being performed 62, the card class file converter 26 may proceed to the third pass 64.

Otherwise, the card class file converter converts specific byte codes into generic byte codes. Typically, the translated byte codes are not interpreted in the Card JVM 16 but are supported by converting the byte codes into equivalent byte codes that can be interpreted by the Card JVM 16 (see FIG. 7). The byte codes 70 may be replaced with another semantically equivalent but different byte codes 72. This generally entails the translation of short single specific byte codes such as ILOAD_0 into their more general versions. For example, ILOAD_0 may be replaced by byte code ILOAD with an argument 0. This translation is done to reduce the number of byte codes translated by the Card JVM 16, consequently reducing the complexity and code space requirements for the Card JVM 16. The program code fragment marked "C" in Appendix D shows how these translations are made. Note that such translations increase the size of the resulting byte code and force the re-computation of any jumps which are affected.

Figure 8:
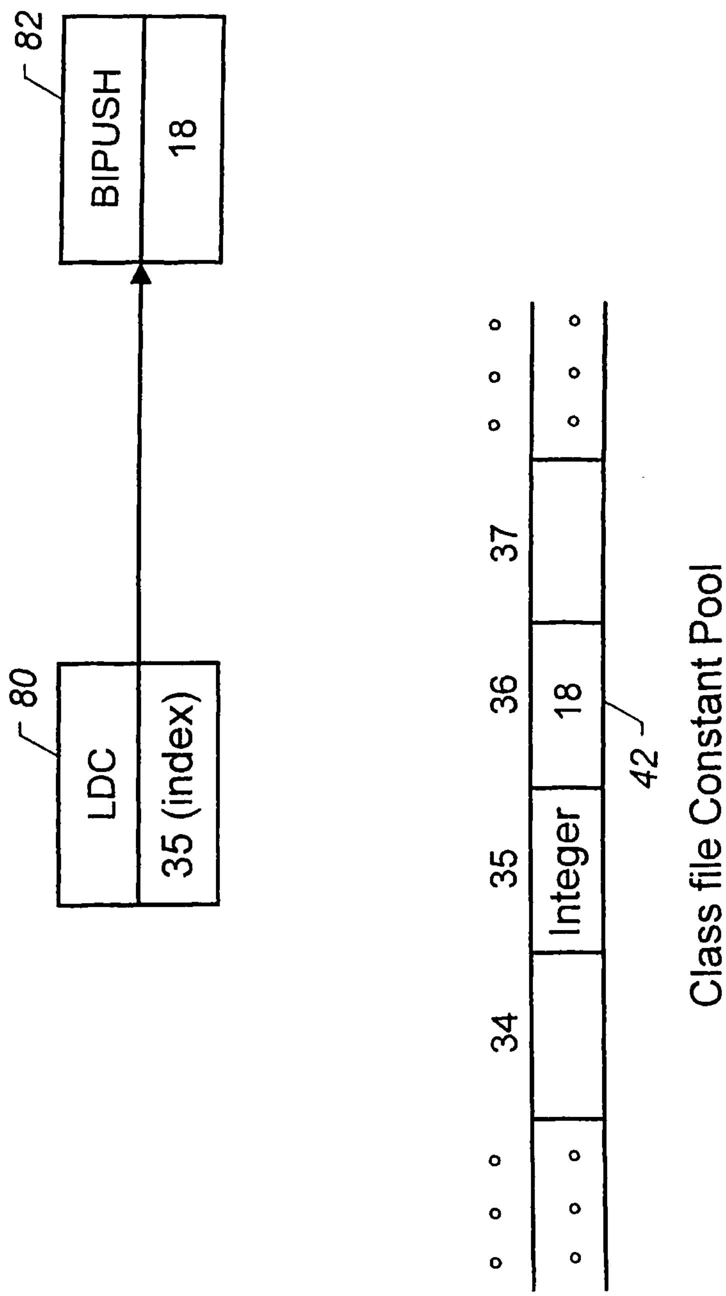
FIG. 8 is a block diagram illustrating the replacement of constant references with constants.
Figure 9:
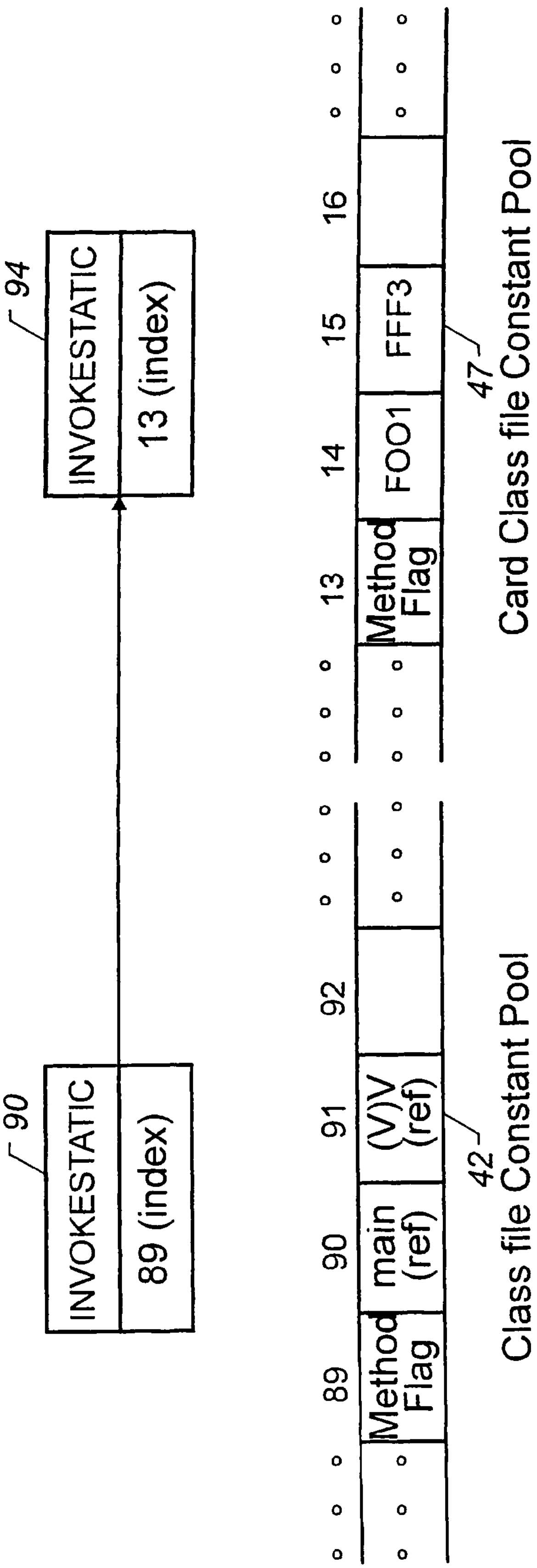
FIG. 9 is a block diagram illustrating the replacement of references with their updated values.

In the third pass 64, the card class file converter rebuilds constant references via elimination of the strings used to denote these constants. FIG. 8 shows an example wherein the byte code LDC 80 referring to constant "18" found via an index in the Java class file 24*a* constant pool 42 may be translated into BIPUSH byte code 82. In this pass the card class file converter 26 modifies the operands to all the byte codes that refer to entries in the Java class file constant pool 42 to reflect their new location in the card class file constant pool 47. FIG. 9 shows an example wherein the argument to a byte code, INVOKESTATIC 90, refers to an entry in the Java class file constant pool 42 that is modified to reflect the new location of that entry in the card class file constant pool 47. The modified operand 94 shows this transformation. The program code fragment marked "D" in Appendix D shows how these modifications are made.

Once the constant references are relinked, if the optional byte code modification is not being performed, the card class file converter may proceed to the fifth and final pass 67.

Otherwise, the card class file converter modifies the original byte codes into a different set of byte codes supported by the particular Card JVM 16 being used. One potential modification renumbers the original byte codes 60 into Card JVM 16 byte codes (see FIG. 10). This renumbering causes the byte codes 100 in the original byte codes 60 to be modified into a renumbered byte codes 102. Byte code ILOAD recognized by value 21 may be renumbered to be recognized by value 50. This modification may be done for optimizing the type tests (also known in prior art as Pass 3 checks) in the Card JVM 16. The program code fragment marked "E" in Appendix D shows an implementation of this embodiment. This modification may be done in order to reduce the program space required by the Card JVM 16 to interpret the byte code. Essentially this modification regroups the byte codes into Card JVM 16 byte codes so that byte codes with similar operands, results are grouped together, and there are no gaps between Card JVM 16 byte codes. This allows the Card JVM 16 to efficiently check Card JVM 16 byte codes and validate types as it executes.

Figure 11:
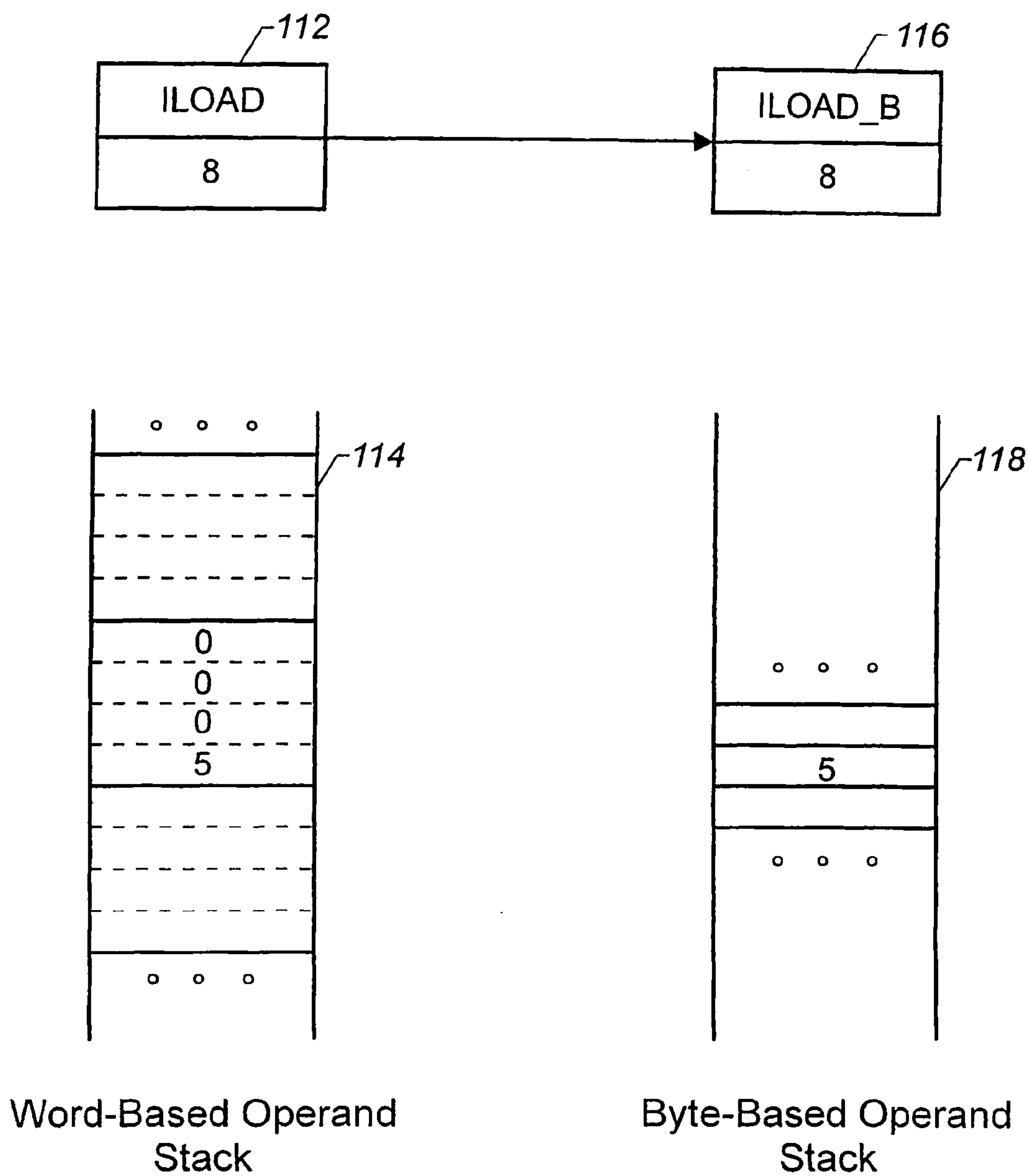
FIG. 11 is a block diagram illustrating translation of original byte codes for a different virtual machine architecture.

In some embodiments, the card class file converter modifies the original byte codes 60 into a different set of byte codes designed for a different virtual machine architecture, as shown in FIG. 11. The Java byte code ILOAD 112 intended for use on a word stack 114 may be replaced by Card JVM 16 byte code ILOAD_B 116 to be used on a byte stack 118. An element in a word stack 114 requires allocating 4 bytes of stack space, whereas an element in the byte stack 118 requires only one byte of stack space. Although this option may provide an increase in execution speed, it risks losing the security features available in the original byte codes.

Since the previous steps 63, 64 or 66 may have changed the size of the byte codes 60 the card class file converter 26 has to relink 67 any jumps which have been effected.

Since the jumps were recorded in the first step 61 of the card class file converter 26, this adjustment is carried out by fixing the jump destinations to their appropriate values. The program code fragment marked "F" in Appendix D shows how these jumps are fixed.

The card class file converter now has modified byte codes 68 that is equivalent to the original byte codes 60 ready for loading. The translation from the Java class file 24*a* to the card class file 27 is now complete.

Referring back to FIG. 5, if more class files 24 remain to be processed 55 the previous steps 51*a*, 51*b*, 51*c*, 52 and 54 are repeated for each remaining class file. The card class file converter 26 gathers 56 the maps and modified byte codes for the classes 24 that have been processed, places them as an aggregate and generates 57 a card class file 27. If required, the card class file converter 26 generates a string to ID output map file 32, that contains a list of all the new IDs allocated for the strings encountered in the constant pool 42 of the Java class files 24 during the translation.

Figure 12:
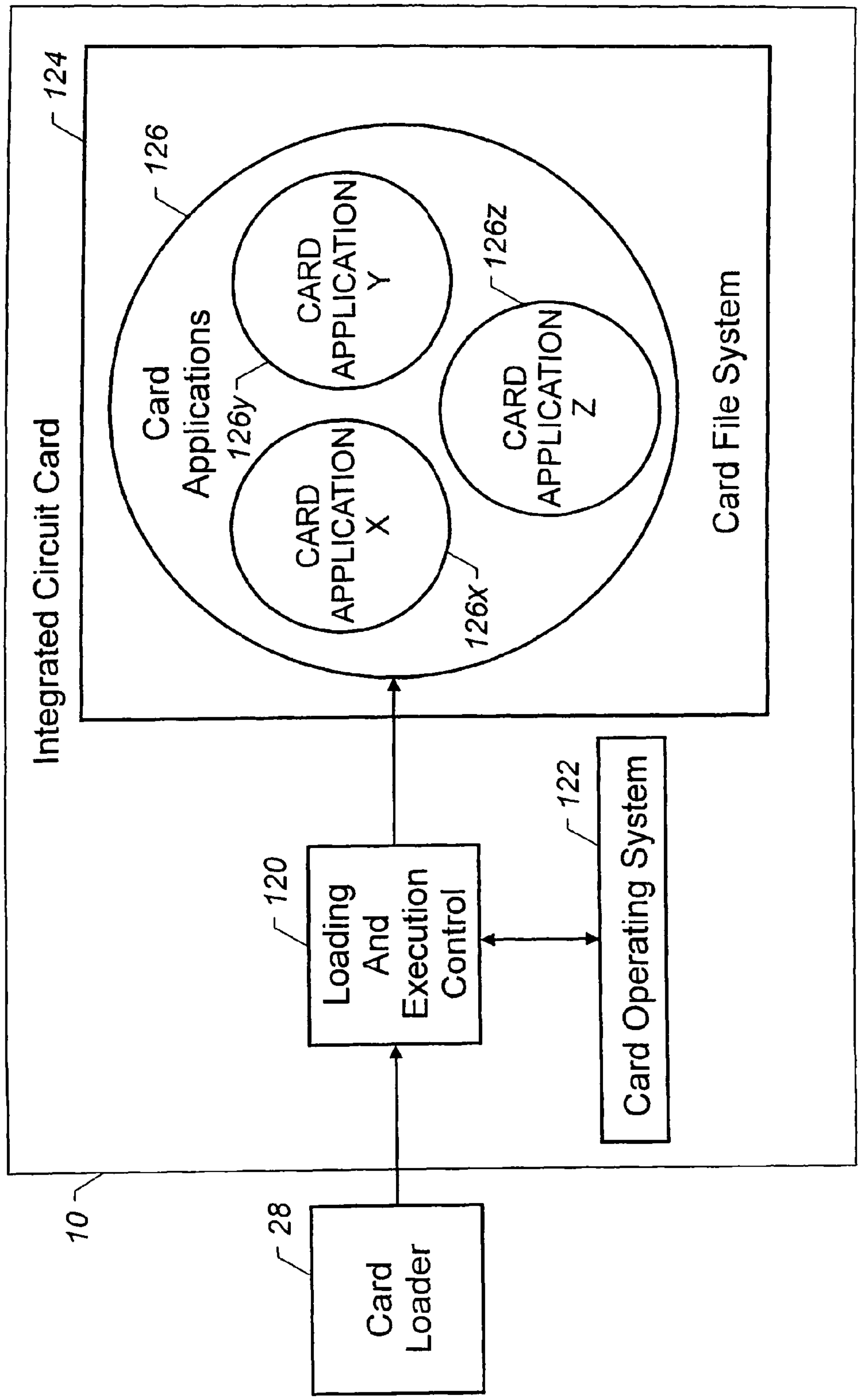
FIG. 12 is a block diagram illustrating loading applications into an integrated circuit card.

Referring to FIG. 12, the card loader 28 within the terminal 14 sends a card class file to the loading and execution control 120 within the integrated circuit card 10 using standard ISO 7816 commands. The loading and execution control 120 with a card operating system 122, which provides the necessary system resources, including support for a card file system 124, which can be used to store several card applications 126. Many conventional card loaders are written in low level languages, supported by the card operating system 122. In the preferred embodiment, the bootstrap loader is written in Java, and the integrated circuit card 10 includes a Java virtual machine to run this application. A Java implementation of the loading and execution control 120 is illustrated in Appendix E which is hereby incorporated by reference. The loading and execution control 120 receives the card class file 26 and produces a Java card application 126*x* stored in the card file system 126 in the EEPROM of the integrated circuit card 10. Multiple Java card applications 126*x*, 126*y*, and 126*z* can be stored in a single card in this manner. The loading and execution control 120 supports commands whereby the terminal 14 can select which Java card application to run immediately, or upon the next card reset.

Figure 13:
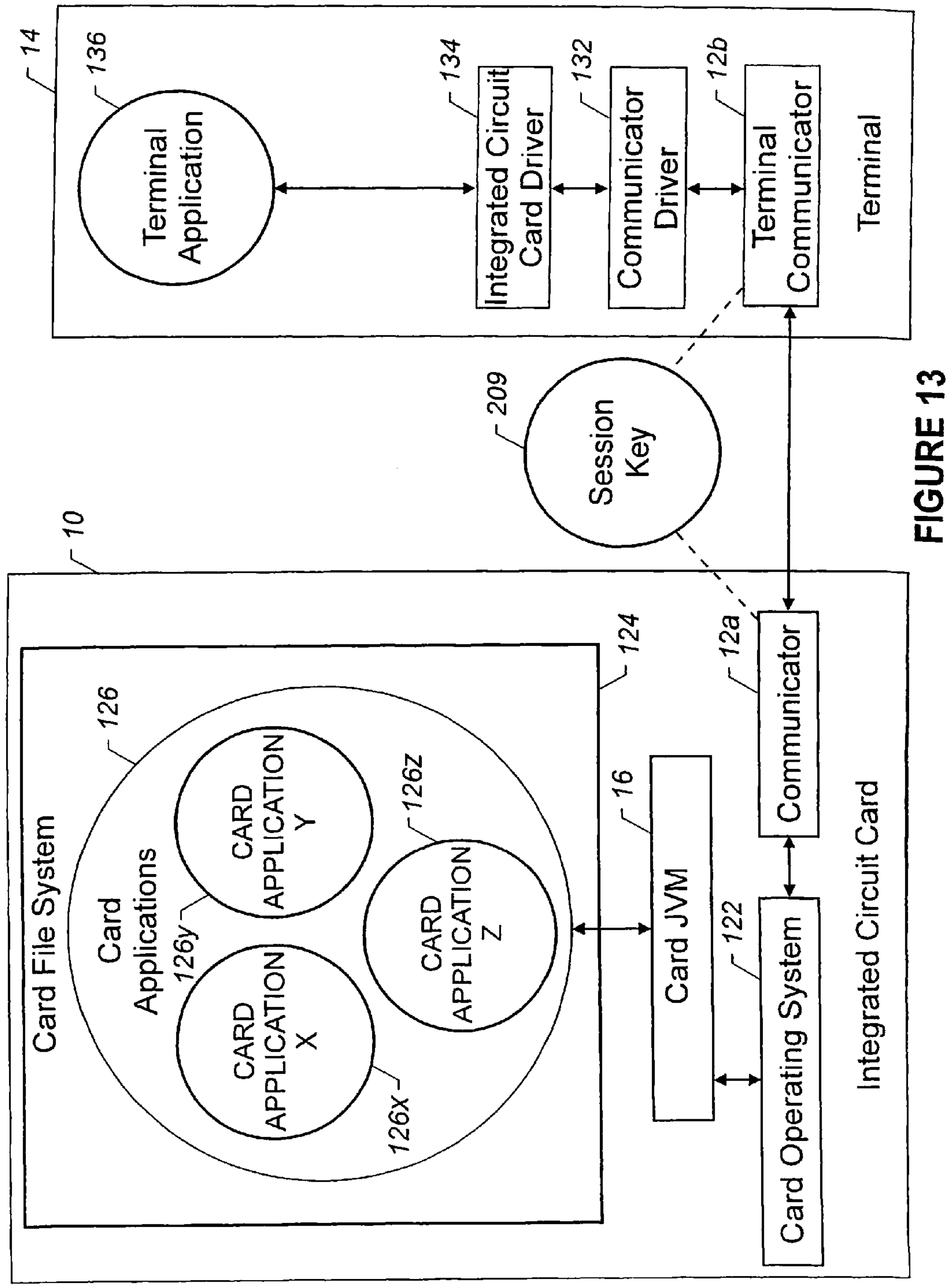
FIG. 13 is a block diagram illustrating executing applications in an integrated circuit card.

Referring to FIG. 13, upon receiving a reset or an execution command from the loading and execution control 120, the Card Java Virtual Machine (Card JVM) 16 begins execution at a predetermined method (for example, main) of the selected class in the selected Java Card application 126*z*. The Card JVM 16 provides the Java card application 126*z* access to the underlying card operating system 122, which provides capabilities such as I/O, EEPROM support, file systems, access control, and other system functions using native Java methods as illustrated in Appendix F which is hereby incorporated by reference.

The selected Java card application 126*z* communicates with an appropriate application in the terminal 14 using the communicator 12*a* to establish a communication channel to the terminal 14. Data from the communicator 12*a* to the terminal 14 passes through a communicator driver 132 in the terminal, which is specifically written to handle the communications protocol used by the communicator 12*a*. The data then passes to an integrated circuit card driver 134, which is specifically written to address the capabilities of the particular integrated circuit card 10 being used, and provides high level software services to the terminal application 136. In the preferred embodiment, this driver would be appropriate PC/SC Smartcard Service Provider (SSP) software. The data then passes to the terminal application 136, which must handle the capabilities provided by the particular card application 126*z* being run. In this manner, commands and responses pass back and forth between the terminal application 136 and the selected card application 126*z*. The terminal application interacts with the user, receiving commands from the user, some of which are passed to the selected Java card application 126*z*, and receiving responses from the Java card application 126*z*, which are processed and passed back to the user.

Figure 14:
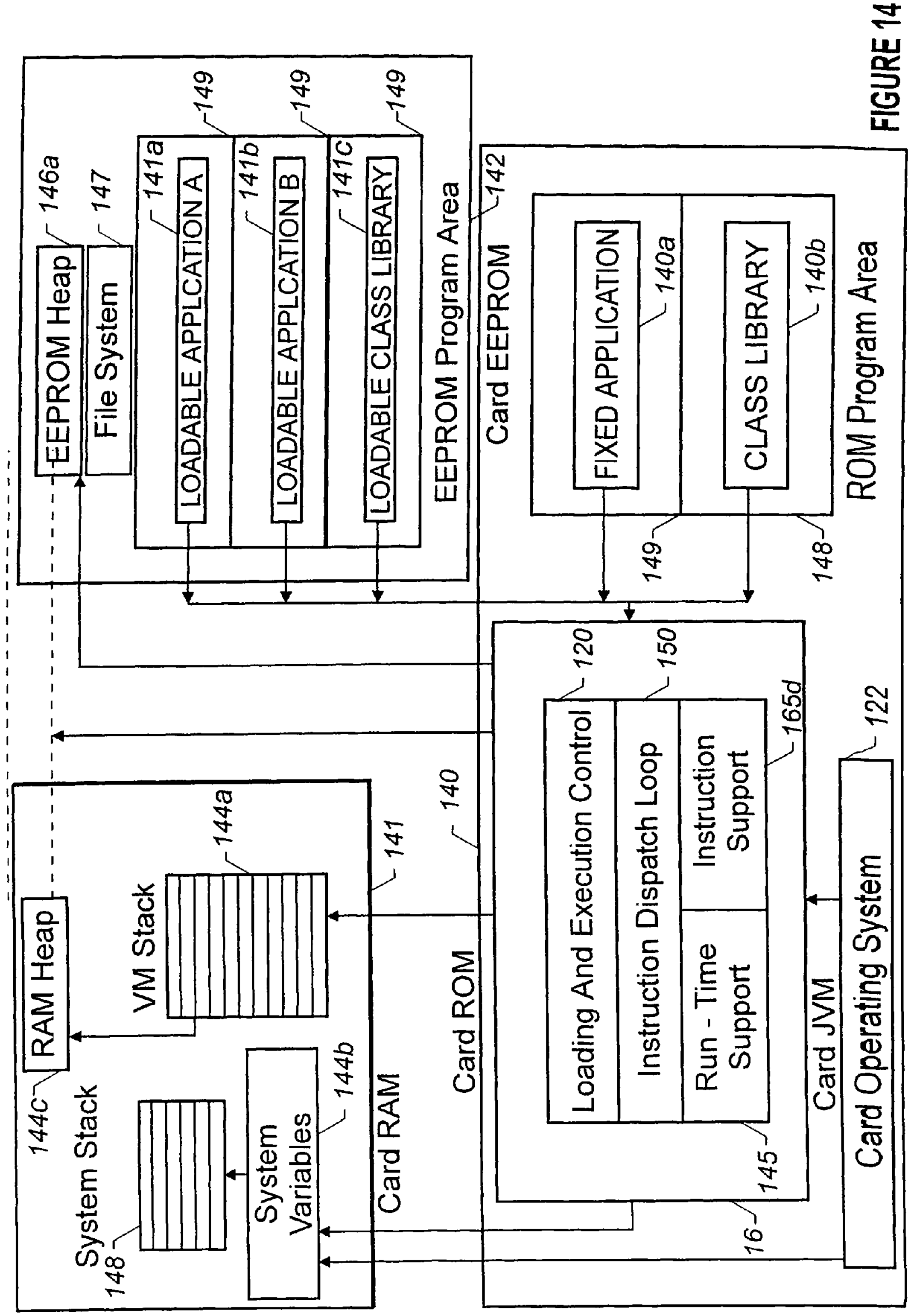
FIG. 14 is a schematic diagram illustrating memory organization for ROM, RAM and EEPROM.

Referring to FIG. 14, the Card JVM 16 is an interpreter that interprets a card application 126*x*. The memory resources in the microcontroller that impact the Card JVM 16 are the Card ROM 140, Card RAM 141 and the Card EEPROM 142. The Card ROM 140 is used to store the Card JVM 16 and the card operating system 122. Card ROM 140 may also be used to store fixed card applications 140*a* and class libraries 140*b*. Loadable applications 141*a*, 141*b* and libraries 141*c* may also be stored in Card RAM 141. The Card JVM 16 interprets a card application 141*a*, 141*b*, or 140*a*. The Card JVM 16 uses the Card RAM to store the VM stack 144*a* and system state variables 144*b*. The Card JVM 16 keeps track of the operations performed via the VM stack 144*a*. The objects created by the Card JVM 16 are either on the RAM heap 144*c*, in the EEPROM heap 146*a*, or in the file system 147.

All of the heap manipulated by the Card JVM 16 may be stored in the Card RAM 141 as a RAM Heap 144*c*, or it may be distributed across to the Card EEPROM 142 as a EEPROM Heap 146*a*. Card RAM 141 is also used for recording the state of the system stack 148 that is used by routines written in the native code of the microcontroller. The Card JVM 16 uses the Card EEPROM 142 to store application data either in the EEPROM heap 146*a* or in the file system 147. Application data stored in a file may be manipulated via an interface to the card operating system 122. This interface is provided by a class library 140*b* stored in Card ROM 140, by a loadable class library 141*c* stored in Card EEPROM 142. One such interface is described in Appendix F. Applications and data in the card are isolated by a firewall mechanism 149.

To cope with the limited resources available on microcontrollers, the Card JVM 16 implements a strict subset of the Java programming language. Consequently, a Java application 20 compiles into a class file that contains a strict subset of Java byte codes. This enables application programmers to program in this strict subset of Java and still maintain compatibility with existing Java Virtual Machines. The semantics of the Java byte codes interpreted by the Card JVM 16 are described in the aforementioned Java Virtual Machine Specification. The subset of byte codes interpreted by the Card JVM 16 can be found in Appendix C. The card class file converter 26 checks the Java application 20 to ensure use of only the features available in this subset and converts into a form that is understood and interpreted by the Card JVM 16.

In other embodiments, the Card JVM 16 is designed to interpret a different set or augmented set of byte codes 116. Although a different byte code set might lead to some performance improvements, departing from a strict Java subset may not be desirable from the point of view of security that is present in the original Java byte codes or compatibility with mainstream Java development tools.

All Card JVM 16 applications 126 have a defined entry point denoted by a class and a method in the class. This entry point is mapped in the string to ID input map 30 and assigned by the card class file converter 26. Classes, methods and fields within a Java application 20 are assigned IDs by the card class file converter 26. For example, the ID corresponding to the main application class may be defined as F001 and the ID corresponding to its main method, such as "main( )V" could be defined as F002.

Figure 15:
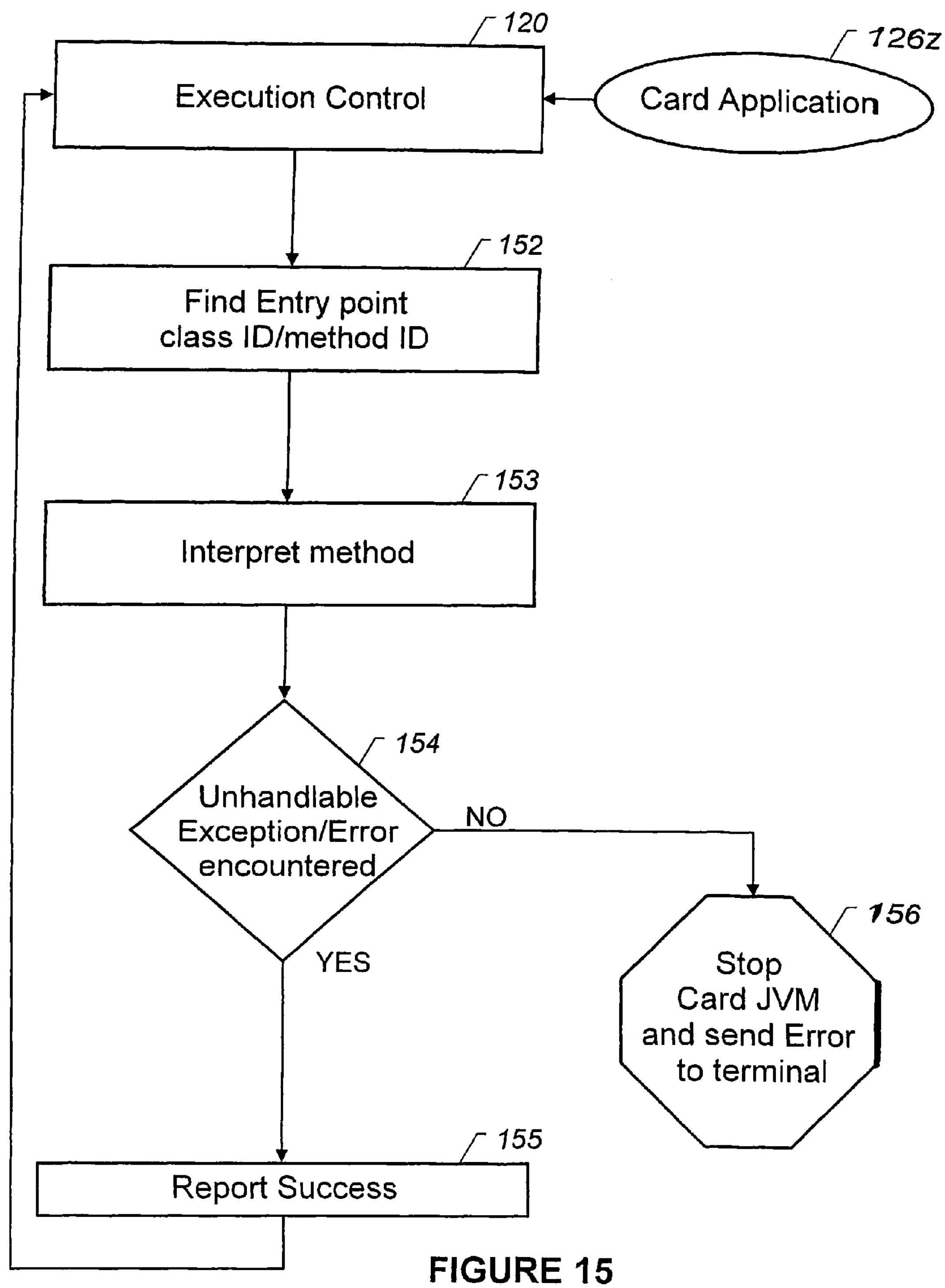
FIG. 15 is a flow diagram illustrating the overall architecture of the Card Java virtual machine.

The overall execution architecture of the Card JVM is described by the flowchart in FIG. 15. Execution of the Card JVM 16 begins at the execution control 120, which chooses a card application 126*z* to execute. It proceeds by finding and assigning an entry point 152 (a method) in this card application for the Card JVM 16 to interpret. The Card JVM 16 interprets the method 153. If the interpretation proceeds successfully 154, the Card JVM 16 reports success 155 returning control back to the execution control 120. If in the course of interpretation 153 the Card JVM 16 encounters an unhandled error or exception (typically a resource limitation or a security violation), the Card JVM 16 stops 156 and reports the appropriate error to the terminal 14.

An essential part of the Card JVM 16 is a subroutine that handles the execution of the byte codes. This subroutine is described by the flowchart in FIG. 16. Given a method 160 it executes the byte codes in this method. The subroutine starts by preparing for the parameters of this method 161. This involves setting the VM stack 144*a* pointer, VM stack 144*a* frame limits, and setting the program counter to the first byte code of the method.

Next, the method flags are checked 162. If the method is flagged native, then the method is actually a call to native method code (subroutine written in the microcontroller's native processor code). In this case, the Card JVM 16 prepares for an efficient call 163 and return to the native code subroutine. The parameters to the native method may be passed on the VM stack 144*a* or via the System stack 148. The appropriate security checks are made and the native method subroutine is called. On return, the result (if any) of the native method subroutine is placed on the VM stack 144*a* so that it may be accessed by the next byte code to be executed.

The dispatch loop 164 of the Card JVM 16 is then entered. The byte code dispatch loop is responsible for preparing, executing, and retiring each byte code. The loop terminates when it finishes interpreting the byte codes in the method 160, or when the Card JVM 16 encounters a resource limitation or a security violation.

If a previous byte code caused a branch to be taken 165 the Card JVM prepares for the branch 165*a*. The next byte code is retrieved 165*b*. In order to keep the cost of processing each byte code down, as many common elements such as the byte code arguments, length, type are extracted and stored.

To provide the security offered by the security model of the programming language, byte codes in the class file must be verified and determined conformant to this model. These checks are typically carried out in prior art by a program referred to as the byte code verifier, which operates in four passes as described in the Java Virtual Machine Specification. To offer the run-time security that is guaranteed by the byte code verifier, the Card JVM 16 must perform the checks that pertain to the Pass 3 and Pass 4 of the verifier. This checking can be bypassed by the Card JVM 16 if it can be guaranteed (which is almost impossible to do) that the byte codes 60 interpreted by the Card JVM 16 are secure. At the minimum, code security can be maintained as long as object references cannot be faked and the VM stack 144*a* and local variable bounds are observed. This requires checking the state of the VM stack 144*a* with respect to the byte code being executed.

To enforce the security model of the programming language, a 256-byte table is created as shown in Appendix G which is hereby incorporated by reference. This table is indexed by the byte code number. This table contains the type and length information associated with the indexing byte code. It is encoded with the first 5 bits representing type, and the last 3 bits representing length. The type and length of the byte code is indexed directly from the table by the byte code number. This type and length is then used for checking as shown in Appendix H which is hereby incorporated by reference. In Appendix H, the checking process begins by decoding the length and type from the table in Appendix G which is hereby incorporated by reference. The length is used to increment the program counter. The type is used first for pre-execution checking, to insure that the data types on the VM stack 144*a* are correct for the byte code that is about to be executed. The 256 bytes of ROM for table storage allows the original Java byte codes to be run in the Card JVM 16 and minimizes the changes required to the Java class file to be loaded in the card. Additional Java byte codes can be easily supported since it is relatively easy to update the appropriate table entries.

Figure 10:
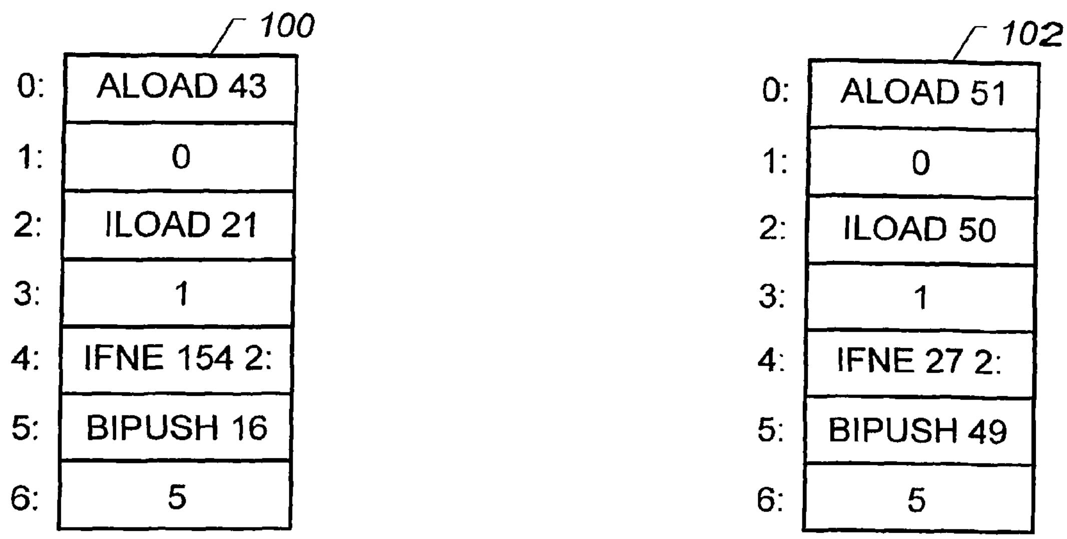
FIG. 10 is a block diagram illustrating renumbering of original byte codes.

In other embodiments, as shown in FIG. 10, the Java byte codes in the method are renumbered in such a manner that the byte code type and length information stored in the table in Appendix H is implicit in the reordering. Appendix H is hereby incorporated by reference. Consequently, the checks that must be performed on the state of the VM stack 144*a* and the byte code being processed does not have to involve a table look up. The checks can be performed by set of simple comparisons as shown in Appendix I which is hereby incorporated by reference. This embodiment is preferable when ROM space is at a premium, since it eliminates a 256-byte table. However adding new byte codes to the set of supported byte codes has to be carefully thought out since the new byte codes have to fit in the implicit numbering scheme of the supported byte codes.

Figure 18:
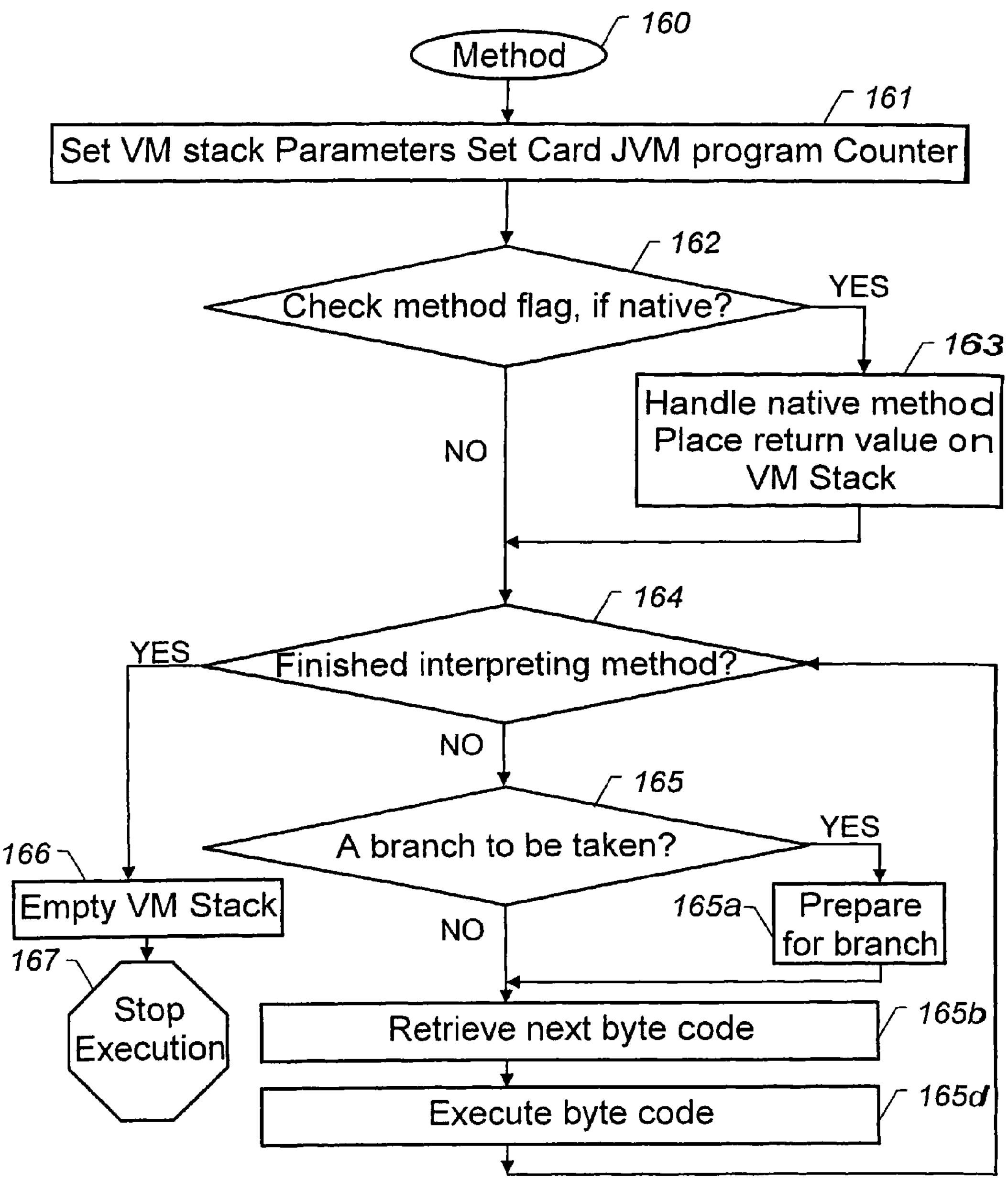
FIG. 18 is a flow diagram illustrating method execution in the Card Java virtual machine without the security checks.

In another embodiment, the Card JVM 16 chooses not to perform any security checks in favor of Card JVM 16 execution speed. This is illustrated in the flowchart in FIG. 18. The flow chart in FIG. 18 is the same as that of FIG. 16 with the security checks removed. This option is not desirable from the point of view of security, unless it can be guaranteed that the byte codes are secure.

The Card JVM 16 may enforce other security checks as well. If the byte code may reference a local variable, the Card JVM 16 checks if this reference is valid, throwing an error if it is not. If the reference is valid, the Card JVM 16 stores the type of the local variable for future checking. The VM stack 144_a_ pointer is checked to see if it is still in a valid range. If not an exception is thrown. The byte code number is checked. If it is not supported, an exception is thrown.

Figure 17:
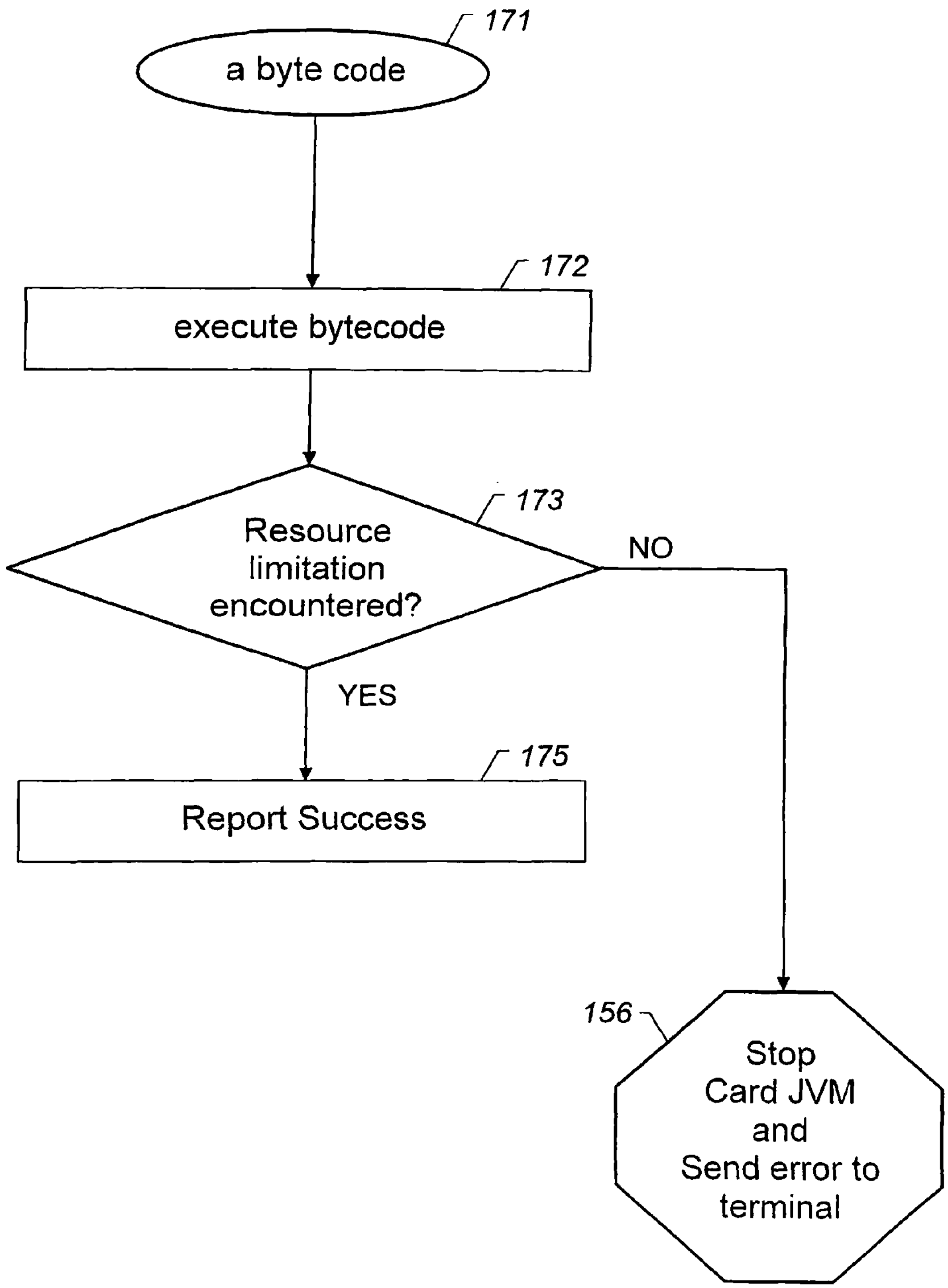
FIG. 17 is a flow diagram illustrating byte code execution in the Card Java virtual machine.

Finally, the byte code itself is dispatched 165_d_. The byte codes translated by the Card JVM 16 are listed in Appendix C. The semantics of the byte codes are described in the aforementioned Java Virtual Machine Specification with regard to the state of the VM stack 144_a_ before and after the dispatch of the byte code. Note also that some byte codes (the byte codes, INVOKESTATIC, INVOKESPECIAL, INVOKENONVIRTUAL and INVOKEVIRTUAL) may cause reentry into the Card JVM 16, requiring processing to begin at the entry of the subroutine 161. FIG. 17 shows the flowchart of the byte code execution routine. The routine is given a byte code 171 to execute. The Card JVM 16 executes 172 the instructions required for the byte code. If in the course of executing the Card JVM 16 encounters a resource limitation 173, it returns an error 156. This error is returned to the terminal 16 by the Card JVM 16. If the byte code executes successfully, it returns a success 175.

After execution, the type of the result is used to set the VM stack 144_a_ state correctly 165_e_, properly flagging the data types on the VM stack 144_a_. The byte code information gathered previously 165_b_ from the byte code info table is used to set the state of the VM stack 144_a_ in accordance with the byte code that just executed.

In other embodiments, setting the output state of the VM stack 144_a_ with respect to the byte code executed is simplified if the byte code is renumbered. This is shown in Appendix I which is hereby incorporated by reference.

In yet another embodiment, the Card JVM 16 may bypass setting the output state of the VM stack 144_a_ in favor of Card JVM 16 execution speed. This option is not desirable from the point of view of security, unless it can be guaranteed that the byte codes are secure.

After the byte code has been executed, the byte code is retired 165_f_. This involves popping arguments off the VM stack 144_a_. Once byte code processing is completed, the loop 164 is repeated for the next byte code for the method.

Once the dispatch loop 164 terminates, the VM stack 144_a_ is emptied 166. This prevents any object references filtering down to other Card JVM 16 invocations and breaking the Card JVM's 16 security. Termination 167 of the byte code dispatch loop 164 indicates that the Card JVM 16 has completed executing the requested method.

To isolate data and applications in the integrated circuit card 10 from each other, the integrated circuit card 10 relies on the firewall mechanism 149 provided by the Card JVM 16. Because the Card JVM implements the standard pass 3 and pass 4 verifier checks, it detects any attempt by an application to reference the data or code space used by another application, and flag a security error 156. For example, conventional low level applications can cast non-reference data types into references, thereby enabling access to unauthorized memory space, and violating security. With this invention, such an attempt by a card application 126_z_ to use a non-reference data type as a reference will trigger a security violation 156. In conventional Java, this protected application environment is referred to as the sandbox application-interpretation environment.

However, these firewall facilities do not work independently. In fact, the facilities are overlapping and mutually reinforcing with conventional access control lists and encryption mechanisms shown in the following table:

| | Access Control Lists | Virtual Machine | Encryption |
|---|---|---|---|
| Data Protection | access control before operation | access only to own namespace | data to another program encrypted |
| Program Protection | access control before execution | execution only on correct types | data encrypted in program's namespace |
| Communication Protection | access control on channels | channel controls in own namespace | only mutually authenticated parties can communicate |

Taken together, these facilities isolate both data and applications on the integrated circuit card 10 and ensure that each card application 126 can access only the authorized resources of the integrated circuit card 10.

Figure 19:
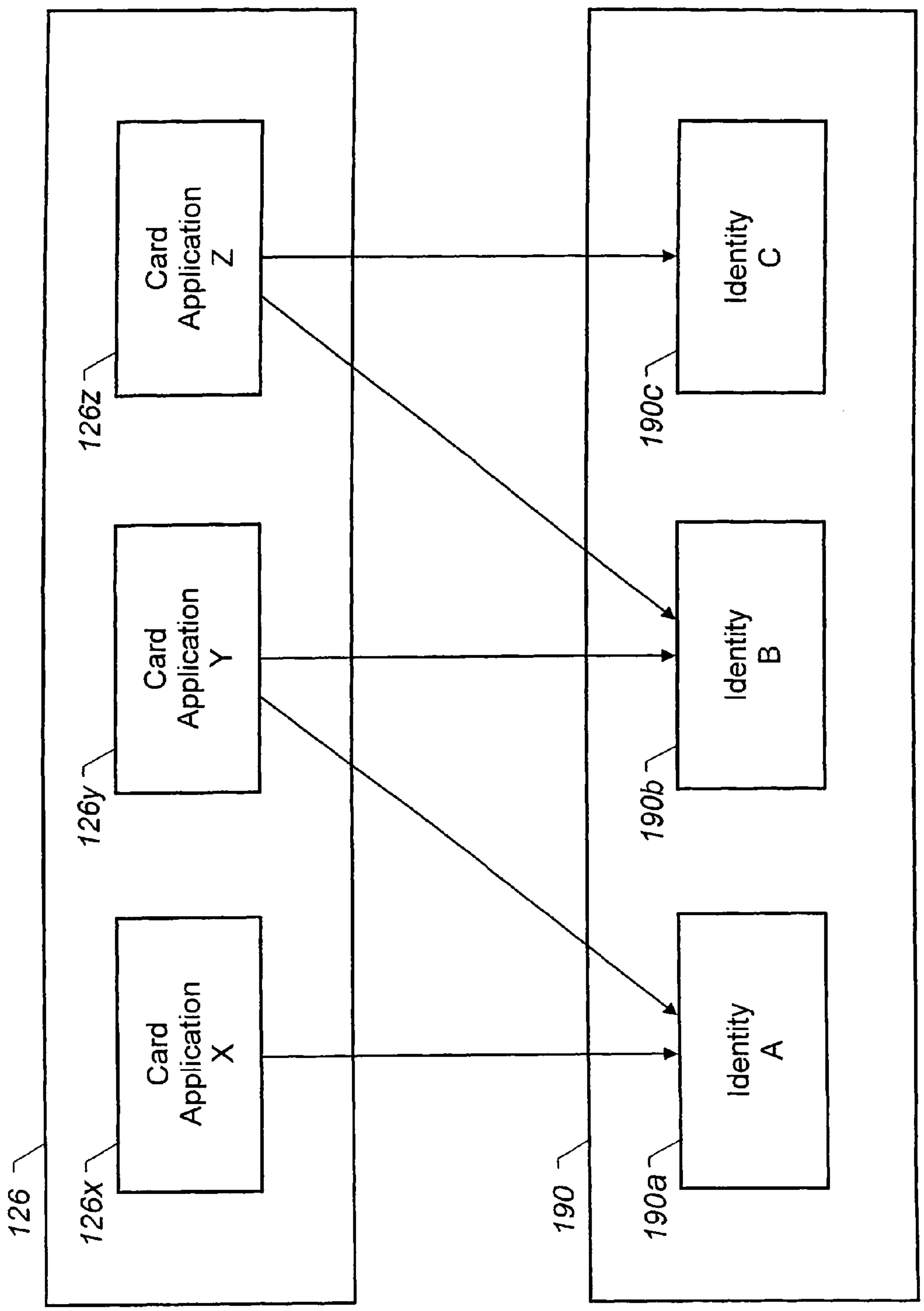
FIG. 19 is a block diagram illustrating the association between card applications and identities.

Referring to FIG. 19, card applications 126_x_, 126_y_, 126_z_ can be endowed with specific privileges when the card applications 126 execute. These privileges determine, for example, which data files the card applications 126 can access and what operations the card applications 126 can perform on the file system 147. The privileges granted to the card applications 126 are normally set at the time that a particular card application 126_z_ is started by the user, typically from the terminal 14.

Figure 20:
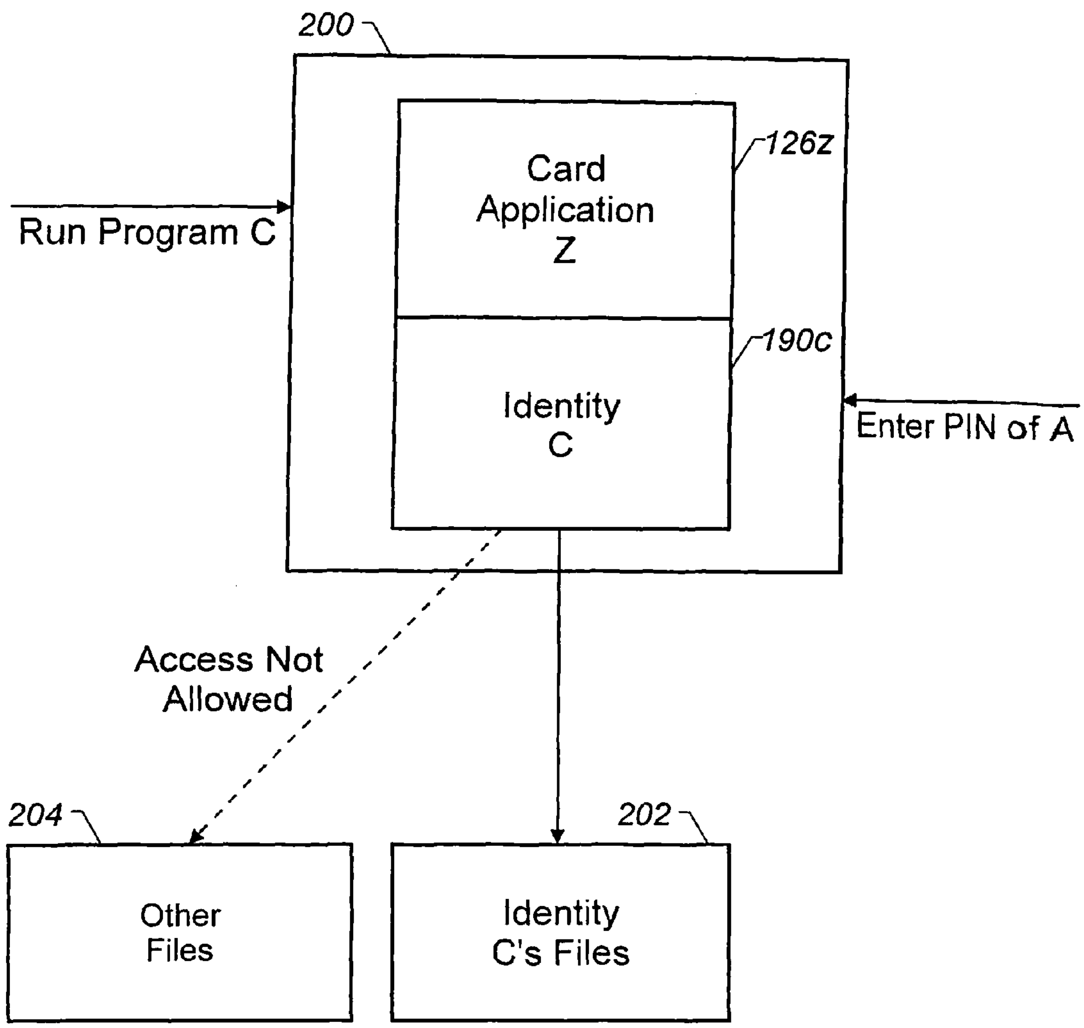
FIG. 20 is a block diagram illustrating the access rights of a specific running application.

The integrated circuit card 10 uses cryptographic identification verification methods to associate an identity 190 (e.g., identities 190_a_, 190_b_ and 190_c_) and hence, a set of privileges to the execution of the card application 126. The association of the specific identity 190_c_ to the card application 126_z_ is made when the card application 126_z_ begins execution, thus creating a specific running application 200, as shown in FIG. 20. The identity 190 is a unique legible text string reliably associated with an identity token. The identity token (e.g., a personal identification number (PIN) or a RSA private key) is an encryption key.

Referring to FIG. 20, in order to run a specific card application 126_z_, the identity 190_c_ of the card application 126_z_ must be authenticated. The identity 190_c_ is authenticated by demonstrating knowledge of the identity token associated with the identity 190_c_. Therefore, in order to run the card application 126_z_, an agent (e.g., a card holder or another application wishing to run the application) must show that it possesses or knows the application's identity-defining encryption key.

One way to demonstrate possession of an encryption key is simply to expose the key itself. PIN verification is an example of this form of authentication. Another way to demonstrate the possession of an encryption key without actually exposing the key itself is to show the ability to encrypt or decrypt plain text with the key.

Thus, a specific running application 200 on the integrated circuit card 10 includes a card application 126_z_ plus an authenticated identity 190_c_. No card application 126 can be run without both of these elements being in place. The card application 126*z* defines data processing operations to be performed, and the authenticated identity 190*c* determines on what computational objects those operations may be performed. For example, a specific application 126*z* can only access identity C's files 202 in the file system 147 associated with the specific identity 190*c*, and the specific card application 126*z* cannot access other files 204 that are associated with identities other than the specific identity 190*c*.

The integrated circuit card 10 may take additional steps to ensure application and data isolation. The integrated circuit card 10 furnishes three software features sets: authenticated-identity access control lists; a Java-based virtual machine; and one-time session encryption keys to protect data files, application execution, and communication channels, respectively. Collectively, for one embodiment, these features sets provide the application data firewalls 149 for one embodiment. The following discusses each software feature set and then shows how the three sets work together to insure application and data isolation on the integrated circuit card 10.

An access control list (ACL) is associated with every computational object (e.g., a data file or a communication channel) on the integrated circuit card 10 that is be protected, i.e., to which access is to be controlled. An entry on an ACL (for a particular computational object) is in a data format referred to as an e-tuple:

type:identity:permissions

The type field indicates the type of the following identity (in the identity field), e.g., a user (e.g., "John Smith"), or a group. The permissions field indicates a list of operations (e.g., read, append and update) that can be performed by the identity on the computational object.

As an example, for a data file that has the ACL entry:

USER:AcmeAirlines:RAU, any application whose identity is "AcmeAirlines" can read ("R"), append ("A") and update ("U") the data file. In addition, the ACL may be used selectively to permit the creation and deletion of data files. Furthermore, the ACL may be used selectively to permit execution of an application.

Whenever a computational object is accessed by a running application 200, the access is intercepted by the Card JVM 16 and passed to the card operating system 122, which determines if there is an ACL associated with the object. If there is an associated ACL, then the identity 190*c* associated with the running application 200 is matched on the ACL. If the identity is not found or if the identity is not permitted for the type of access that is being requested, then the access is denied. Otherwise, the access is allowed to proceed.

Referring to FIG. 13, to prevent the potential problems due to the single data path between the integrated circuit card 10 and the terminal 14, communication channel isolation is accomplished by including in the identity authentication process the exchange of a one-time session key 209 between the a card application 126*z* and the terminal application 136. The key 209 is then used to encrypt subsequent traffic between the authenticating terminal application 136 and the authenticated card application 126*z*. Given the one-time session key 209, a rogue terminal application can neither "listen in" on an authenticated communication between the terminal 14 and the integrated circuit card 10, nor can the rogue terminal application "spoof" the card application into performing unauthorized operations on its behalf.

Encryption and decryption of card/terminal traffic can be handled either by the card operating system 122 or by the card application itself 126*z*. In the former case, the communication with the terminal 14 is being encrypted transparently to the application, and message traffic arrives decrypted in the data space of the application. In the latter case, the card application 126*z* elects to perform encryption and decryption to provide an extra layer of security since the application could encrypt data as soon as it was created and would decrypt data only when it was about to be used. Otherwise, the data would remain encrypted with the session key 209.

Thus, the application firewall includes three mutually reinforcing software sets. Data files are protected by authenticated-identity access control lists. Application execution spaces are protected by the Card JVM 16. Communication channels are protected with one-time session encryption keys 209.

In other embodiments, the above-described techniques are used with a microcontroller (such as the processor 12) may control devices (e.g., part of an automobile engine) other than an integrated circuit card. In these applications, the microcontroller provides a small platform (i.e., a central processing unit, and a memory, both of which are located on a semiconductor substrate) for storing and executing high level programming languages. Most existing devices and new designs that utilize a microcontroller could use this invention to provide the ability to program the microcontroller using a high level language, and application of this invention to such devices is specifically included.

The term application includes any program, such as Java applications, Java applets, Java aglets, Java servlets, Java commlets, Java components, and other non-Java programs that can result in class files as described below.

Class files may have a source other than Java program files. Several programming languages other than Java also have compilers or assemblers for generating class files from their respective source files. For example, the programming language Eiffel can be used to generate class files using Pirmin Kalberer's "J-Eiffel", an Eiffel compiler with JVM byte code generation (web site: http://www.spin.ch/.about.kalberer/jive/index.htm). An Ada 95 to Java byte code translator is described in the following reference (incorporated herein by reference): Taft, S. Tucker, "Programming the Internet in Ada 95", proceedings of Ada Europe '96, 1996. Jasmin is a Java byte code assembler that can be used to generate class files, as described in the following reference (incorporated herein by reference): Meyer, Jon and Troy Downing, "Java Virtual Machine", O'Reilly, 1997. Regardless of the source of the class files, the above description applies to languages other than Java to generate codes to be interpreted.

Figure 21:
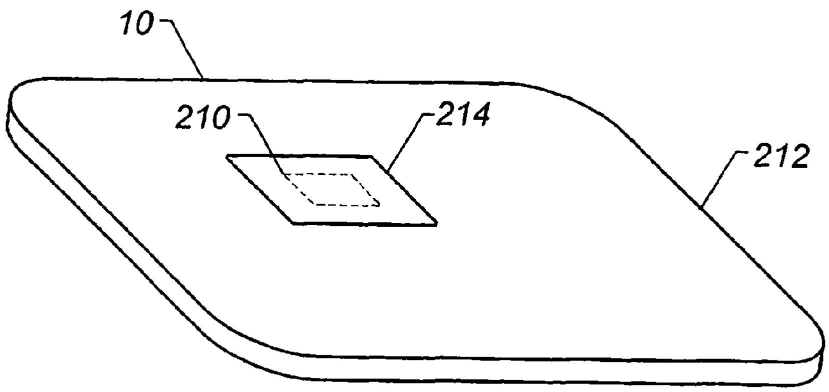
FIG. 21 is a perspective view of a microcontroller on a smart card.

FIG. 21 shows an integrated circuit card, or smart card, which includes a microcontroller 210 that is mounted to a plastic card 212. The plastic card 212 has approximately the same form factor as a typical credit card. The communicator 12*a* can use a contact pad 214 to establish a communication channel, or the communicator 12*a* can use a wireless communication system.

Figure 22:
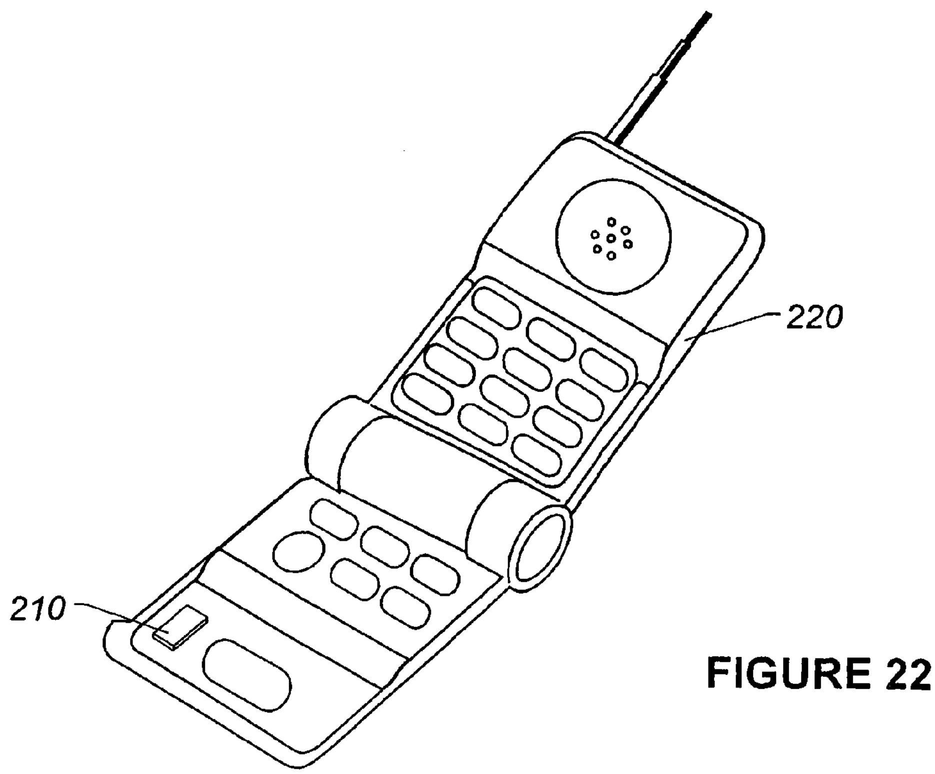
FIG. 22 is a perspective view of a microcontroller on a telephone.

In other embodiments, a microcontroller 210 is mounted into a mobile or fixed telephone 220, effectively adding smart card capabilities to the telephone, as shown in FIG. 22. In these embodiments, the microcontroller 210 is mounted on a module (such as a Subscriber Identity Module (SIM)), for insertion and removal from the telephone 220.

Figure 23:
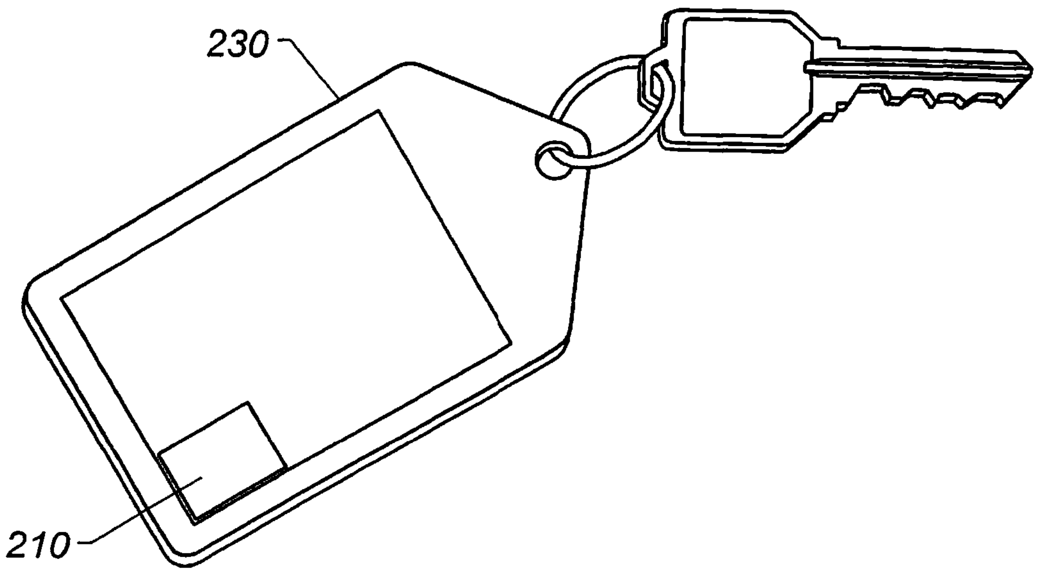
FIG. 23 is a perspective view of a microcontroller on a key ring.

In other embodiments, a microcontroller 210 is added to a key ring 230 as shown in FIG. 23. This can be used to secure access to an automobile that is equipped to recognize the identity associated with the microcontroller 210 on the key ring 230.

Figure 24:
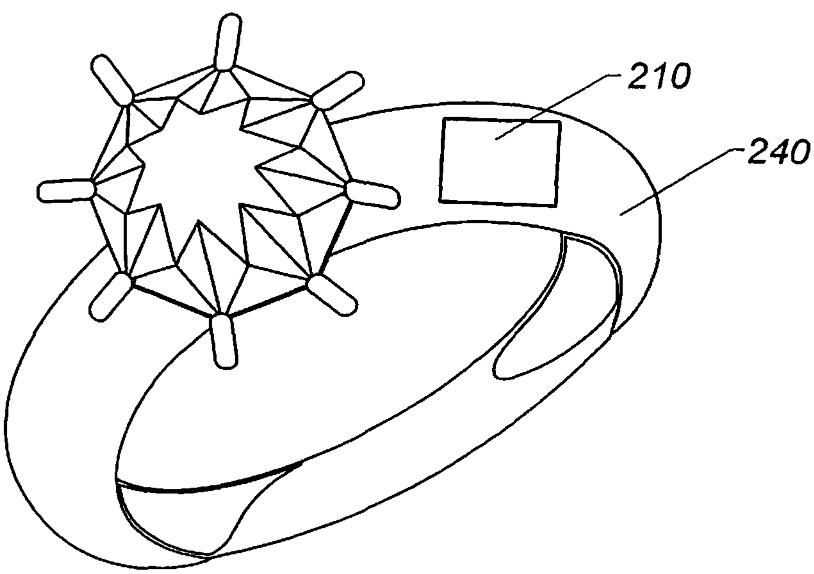
FIG. 24 is a perspective view of a microcontroller on a ring.

Jewelry such as a watch or ring 240 can also house a microcontroller 210 in an ergonomic manner, as shown in FIG. 24. Such embodiments typically use a wireless communication system for establishing a communication channel, and are a convenient way to implement access control with a minimum of hassle to the user.

Figure 25:
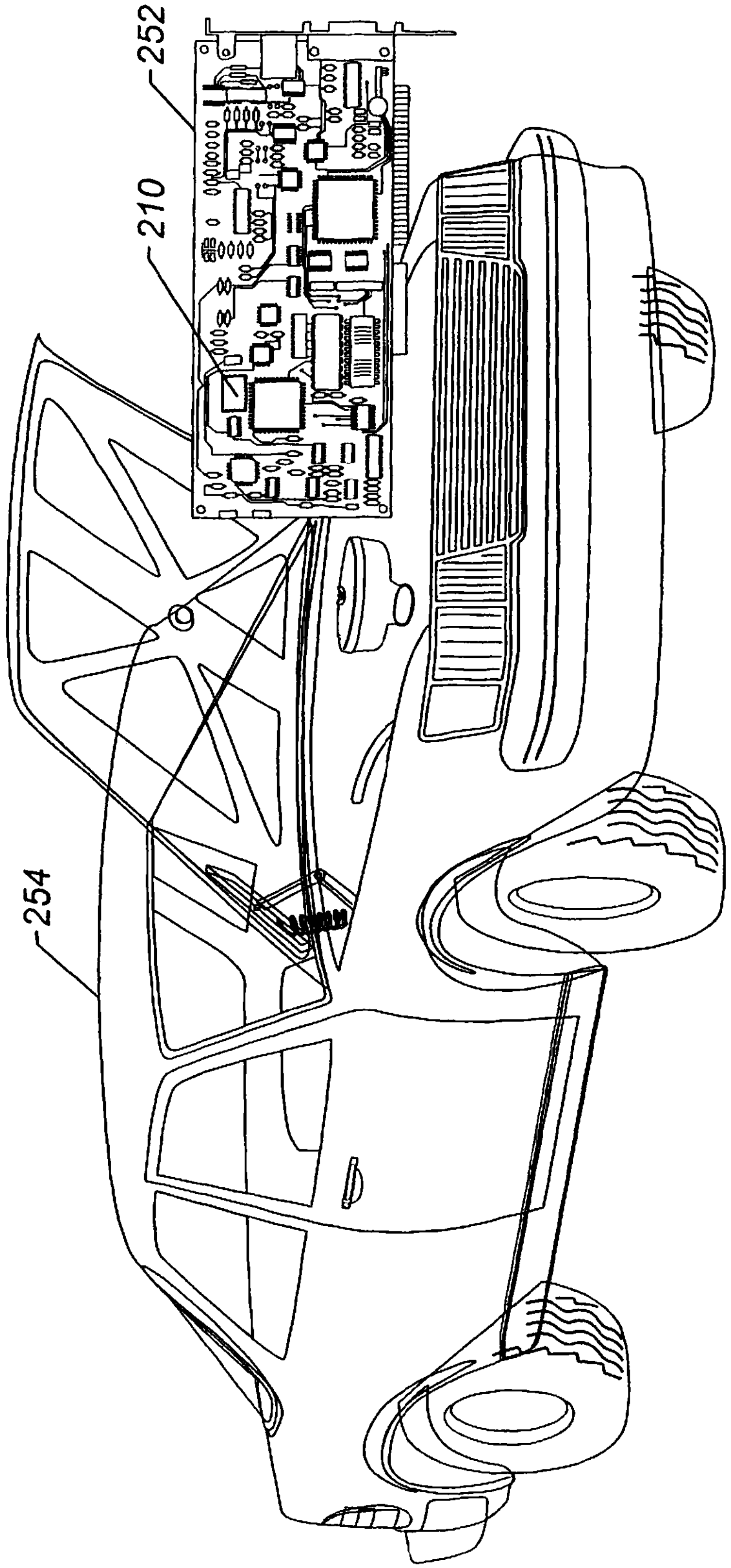
FIG. 25 is a perspective view of a microcontroller on a circuit card of an automobile.
Figure 1:
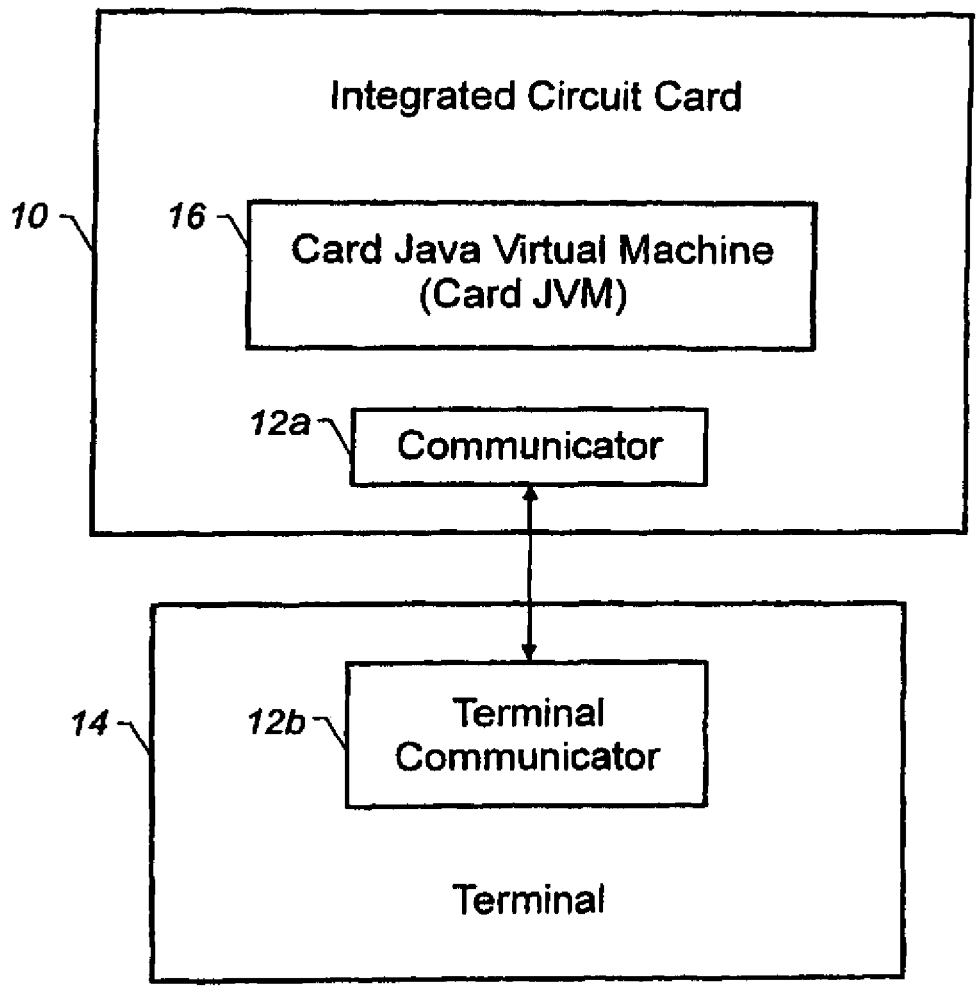
Figure 2:
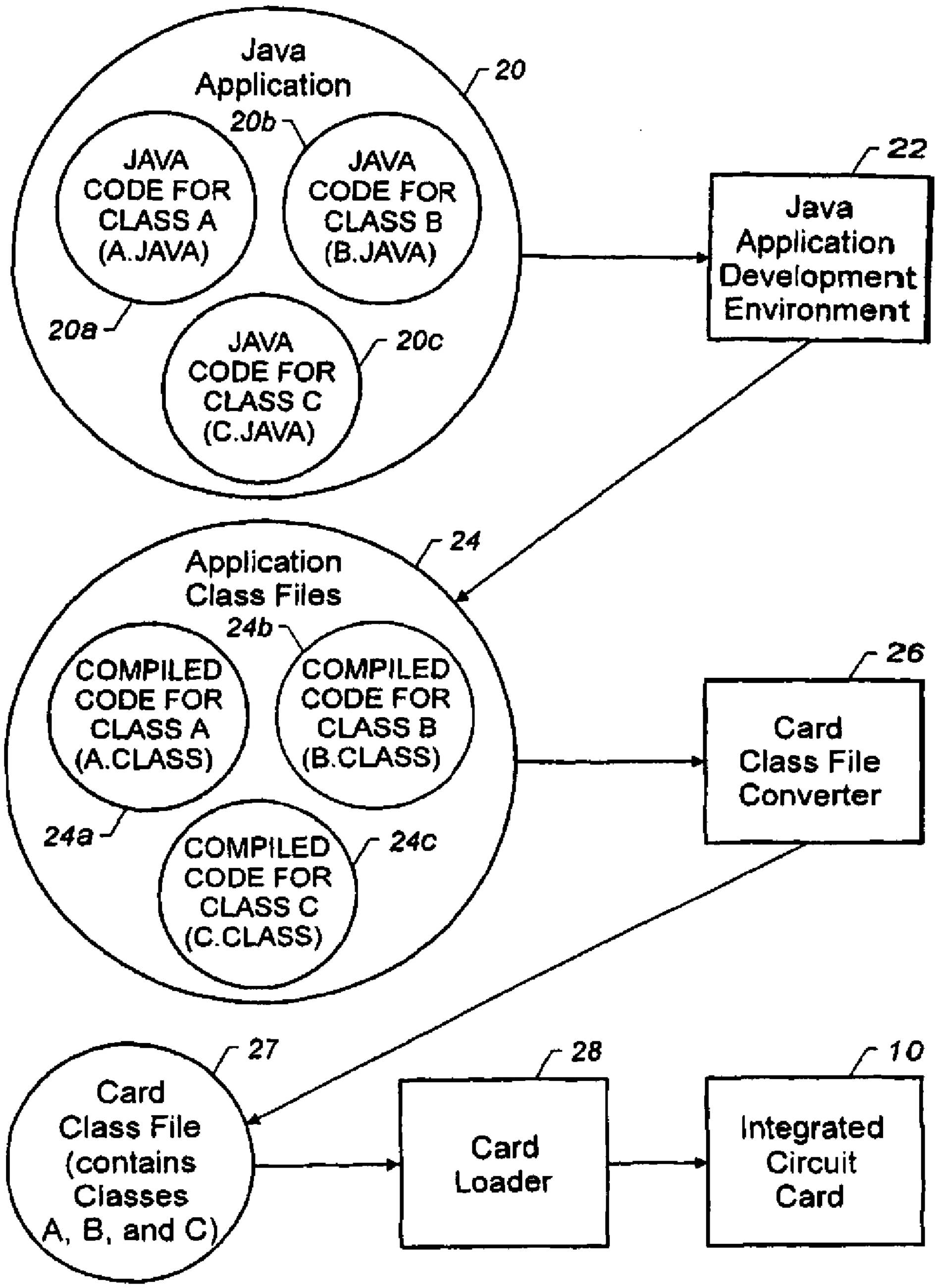
Figure 3:
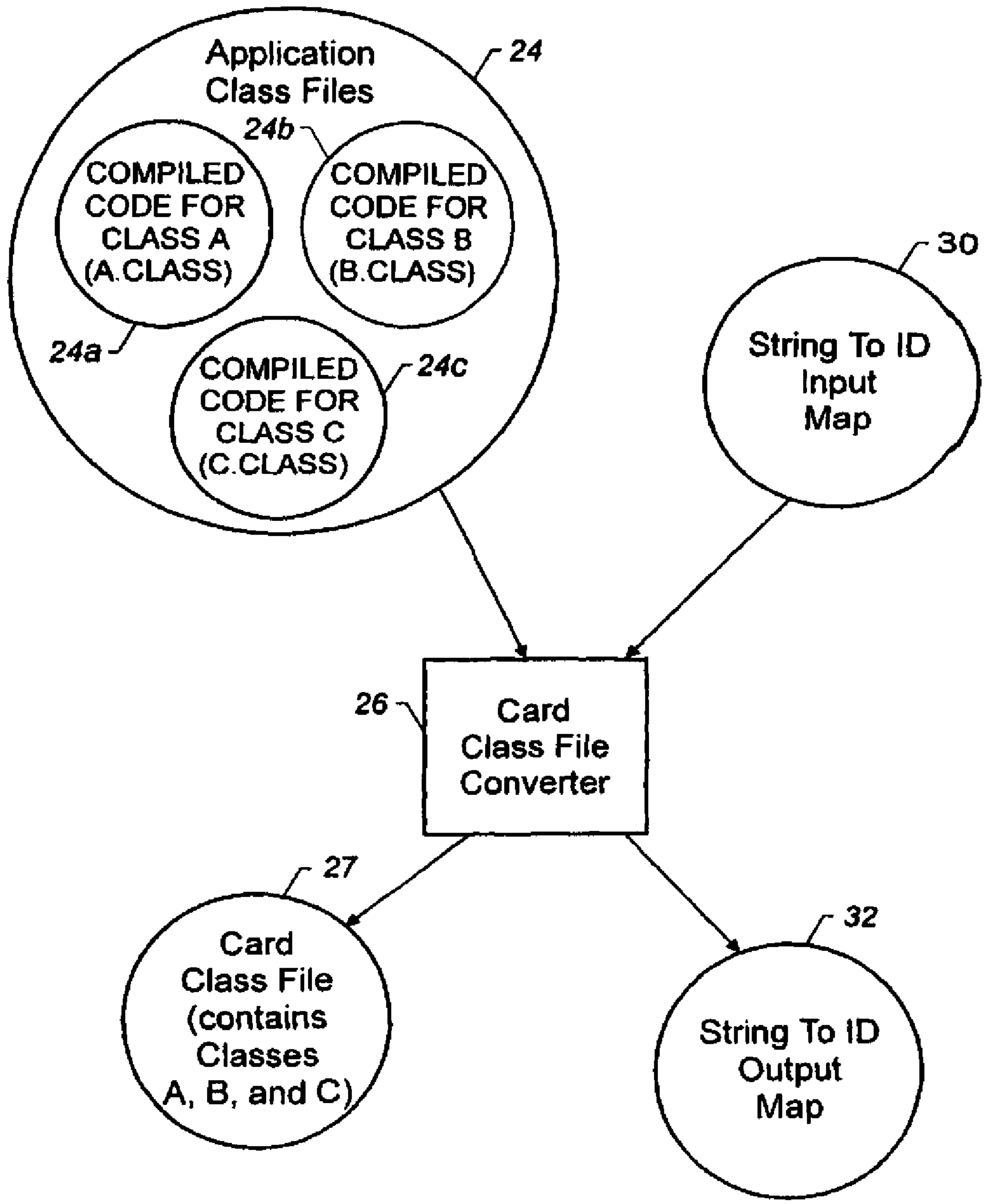
Figure 4:
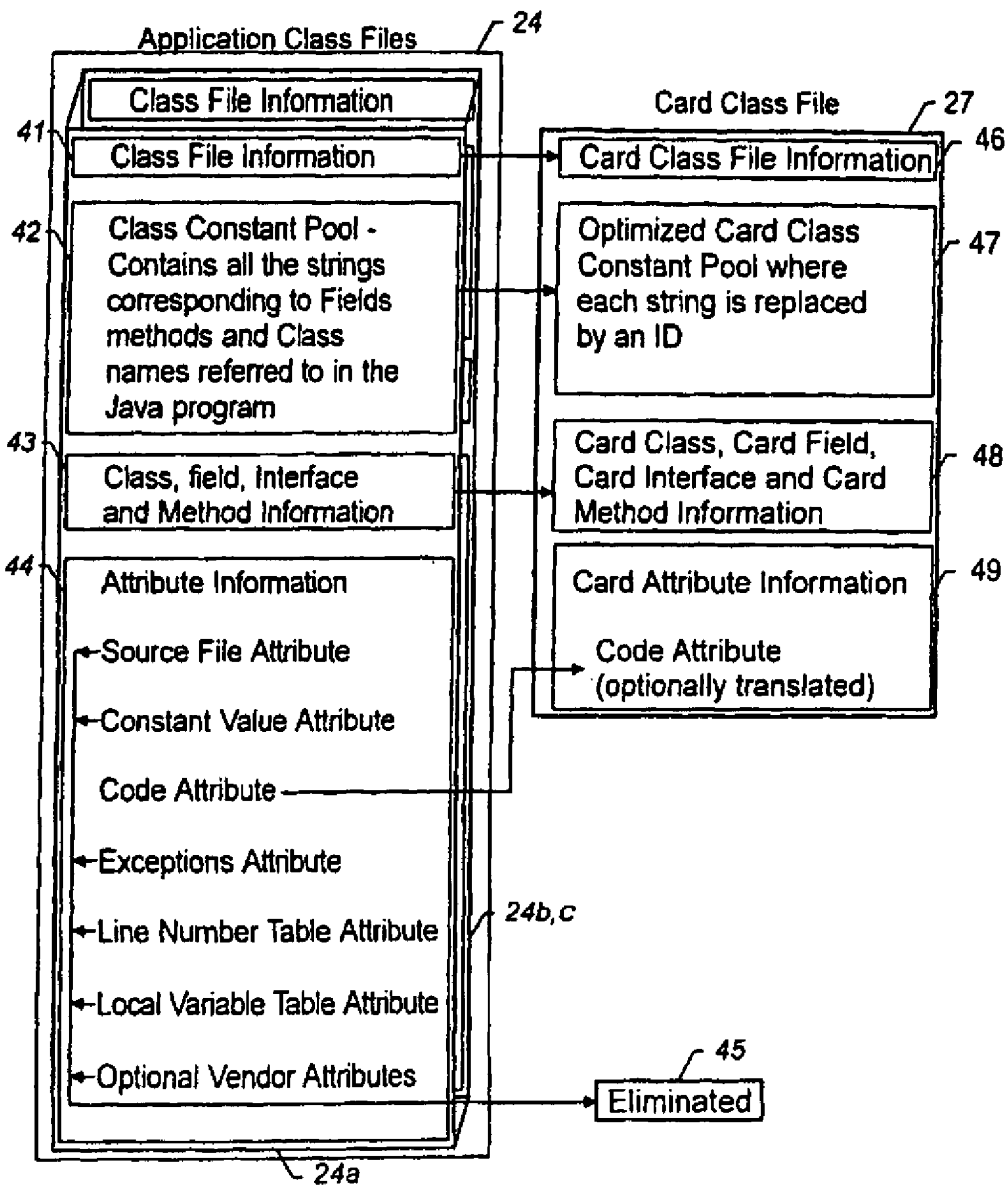
Figure 5:
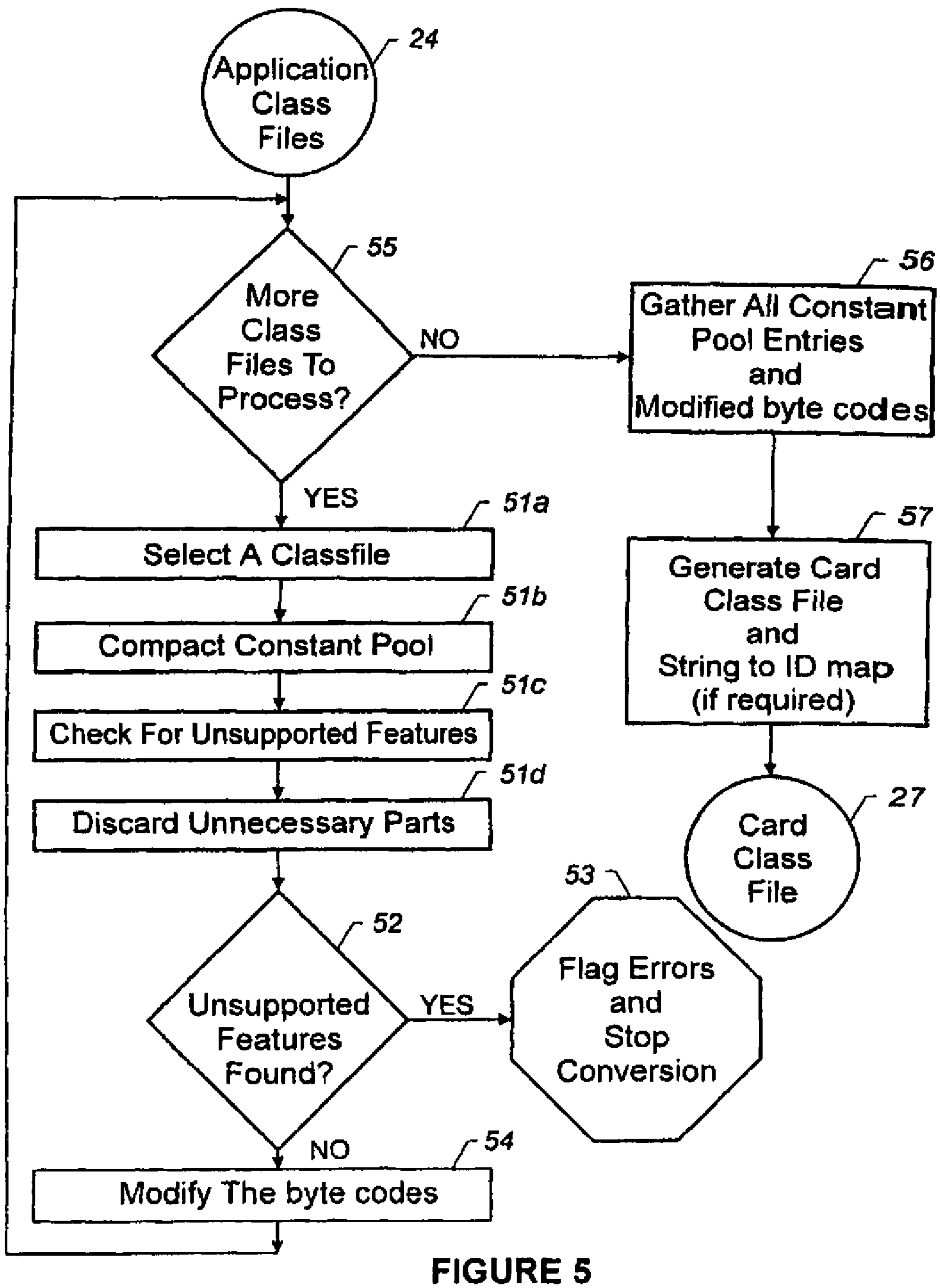
Figure 6:
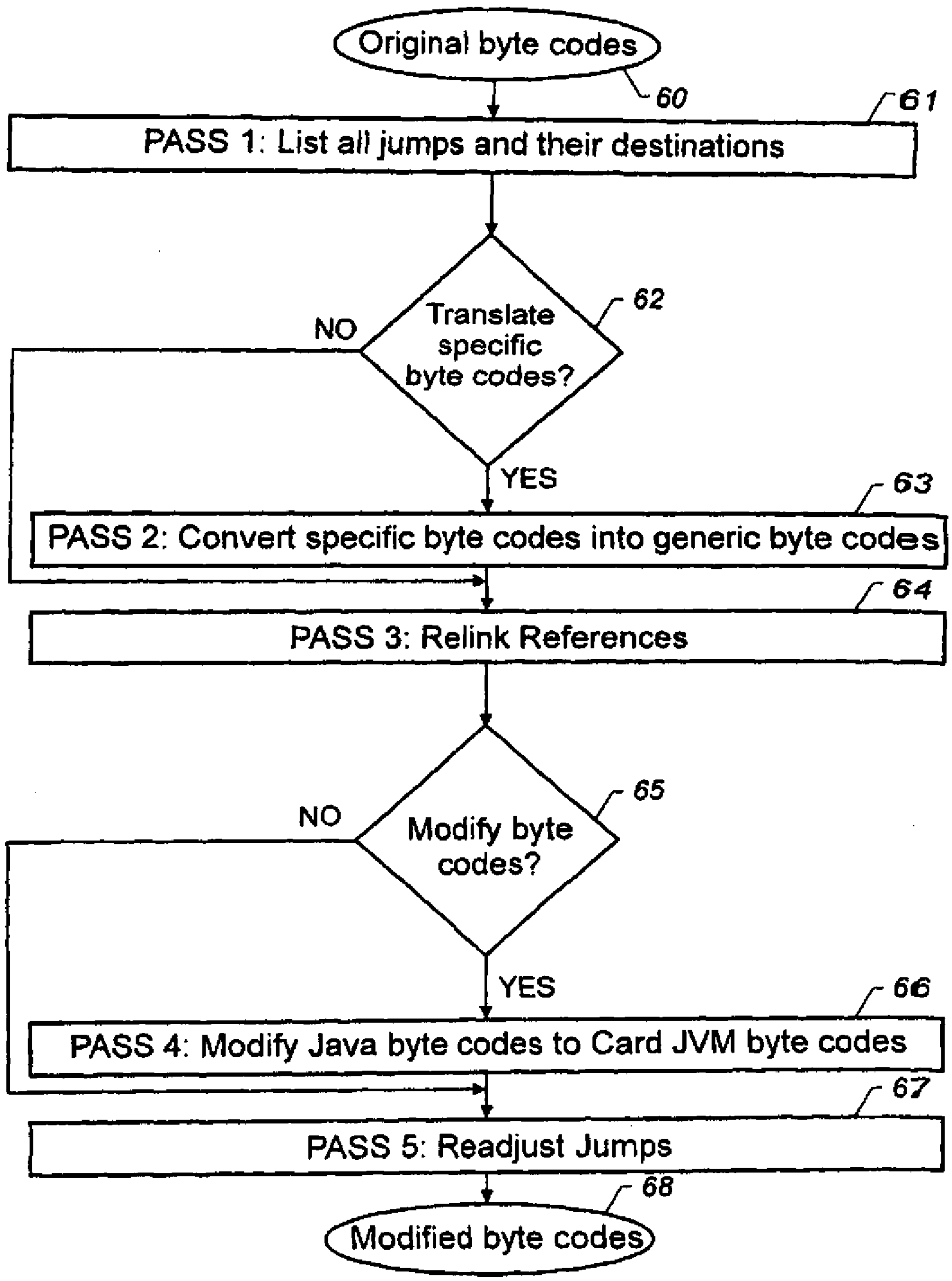
Figure 7:
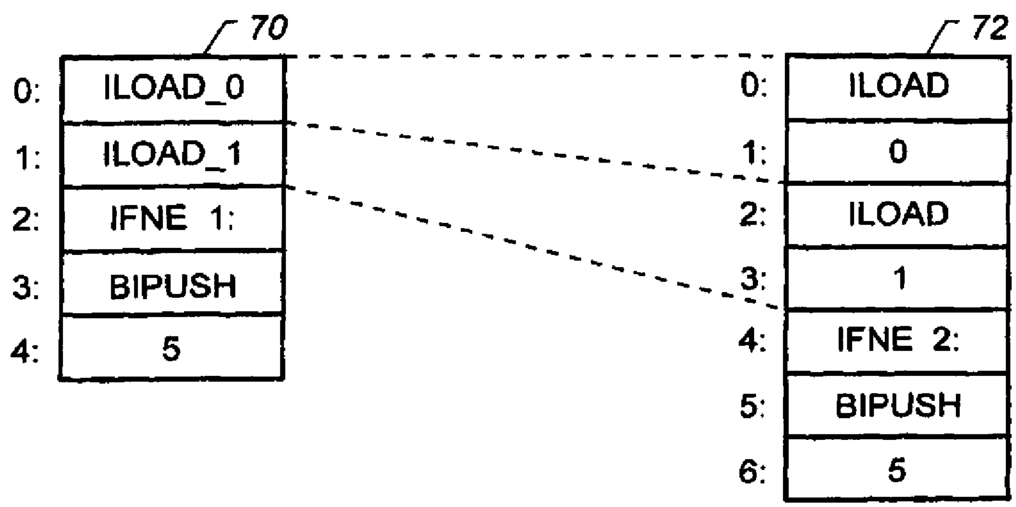
Figure 8:
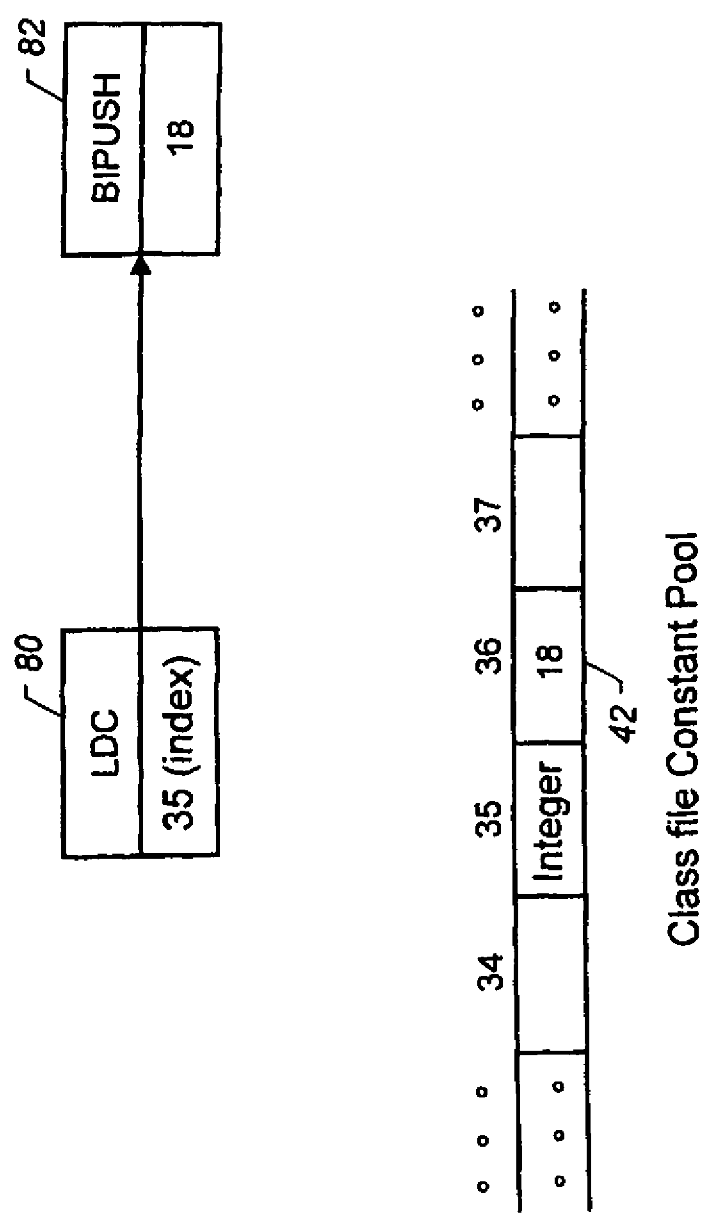
Figure 9:
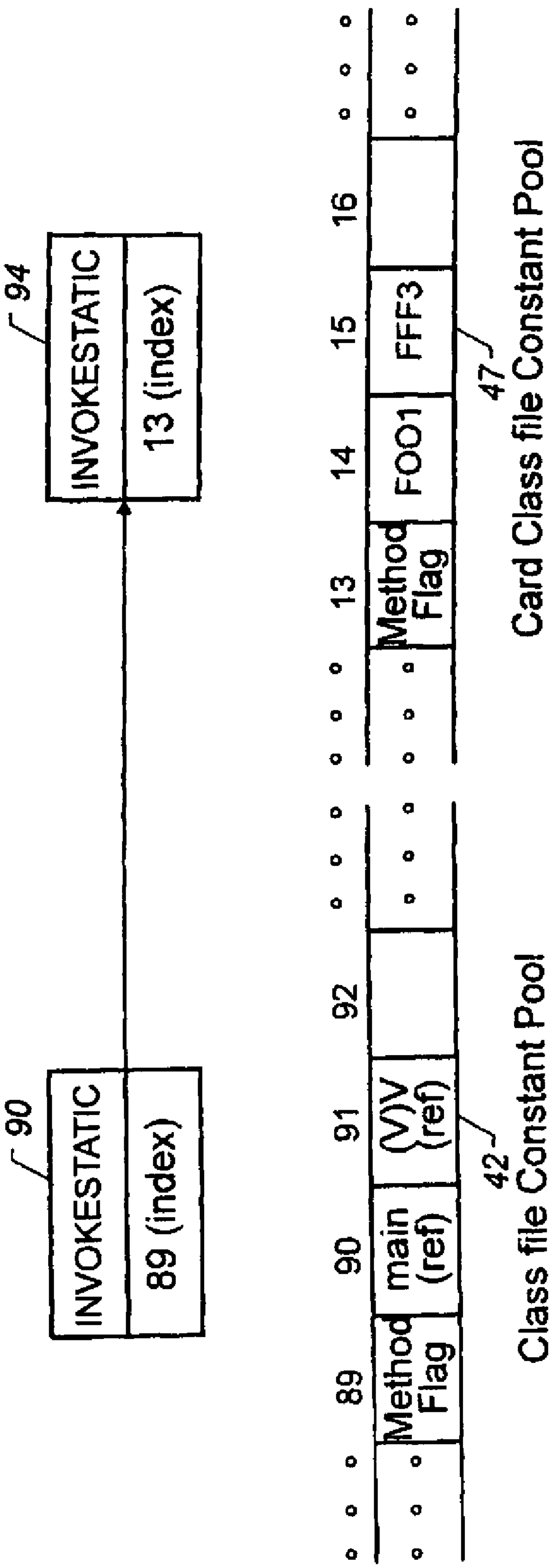
Figure 10:
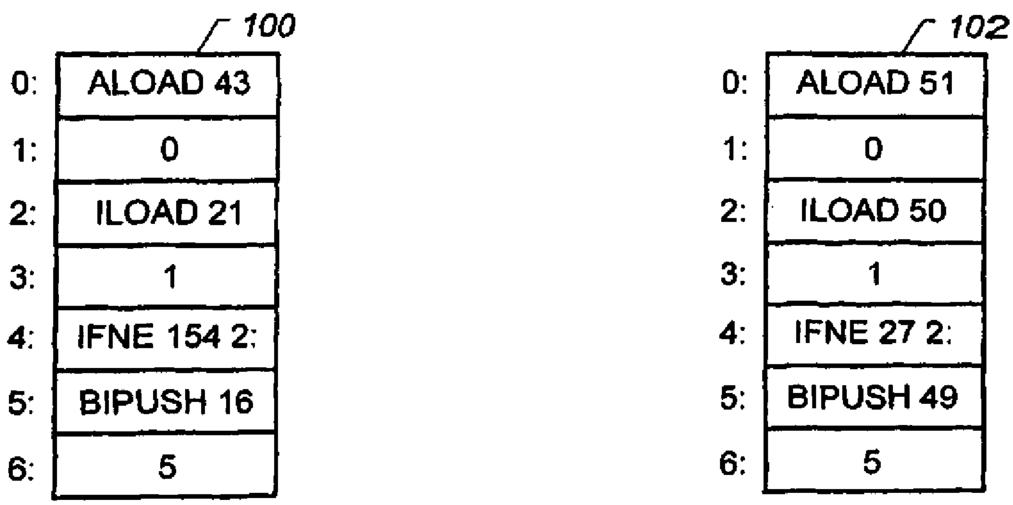
Figure 11:
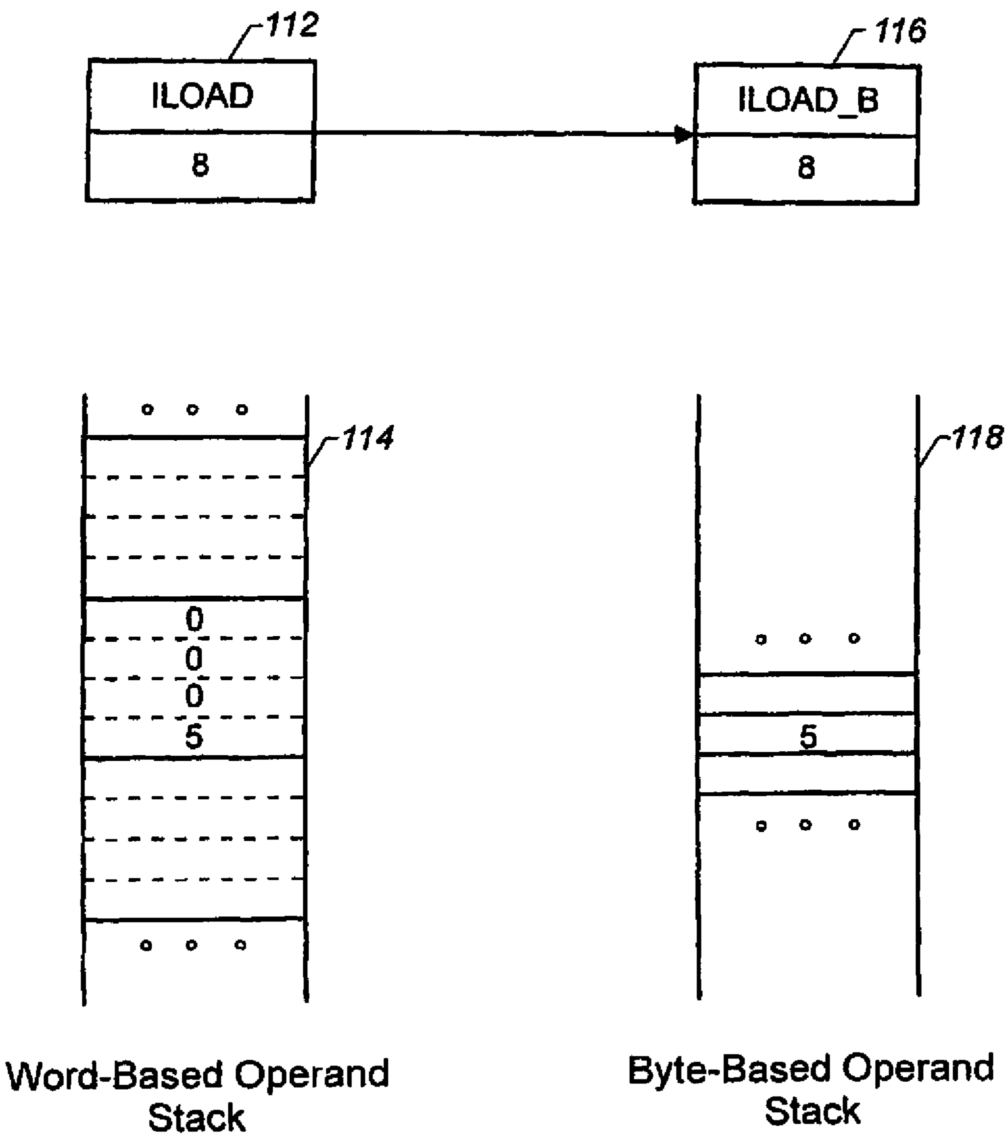
Figure 12:
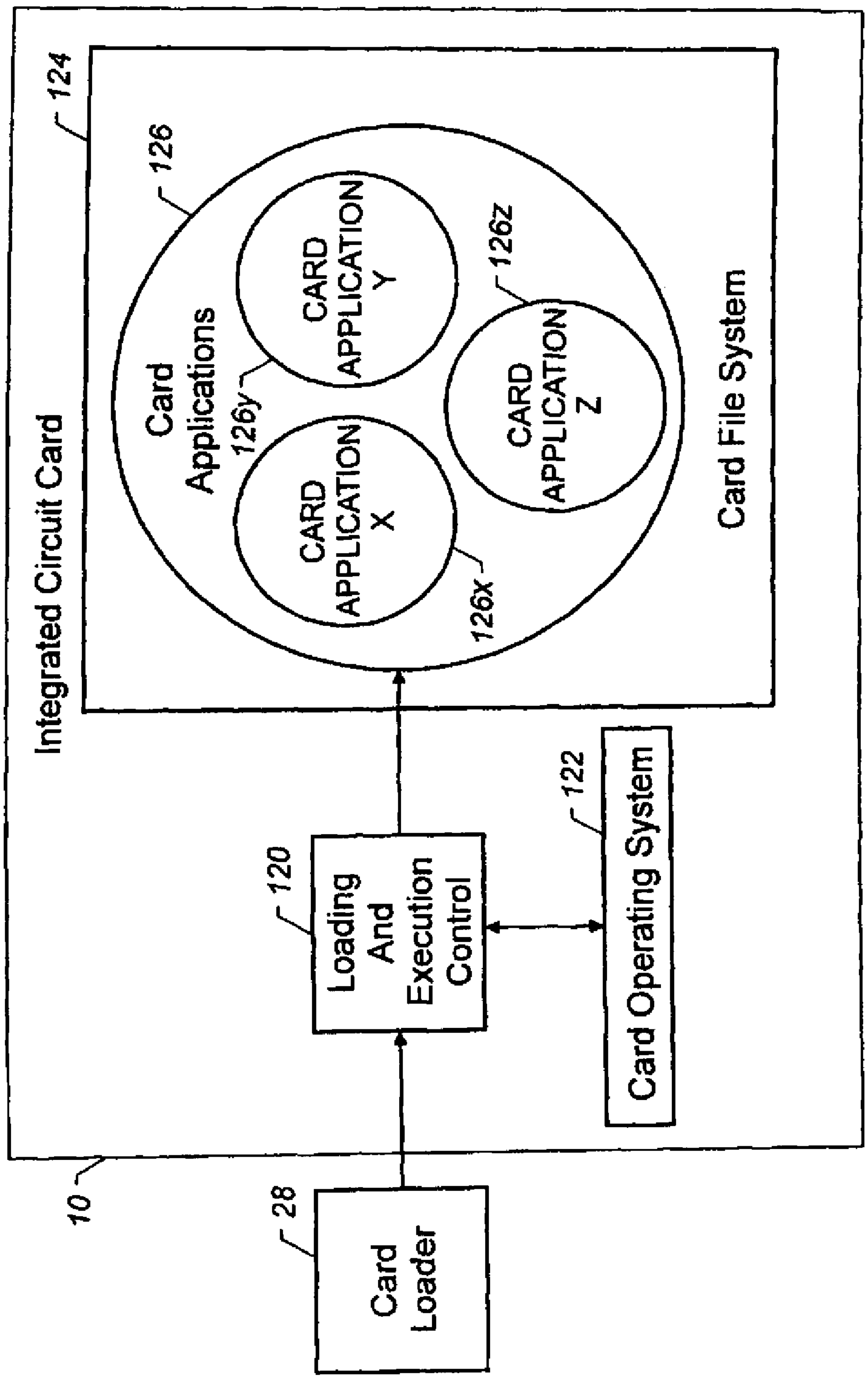
Figure 13:
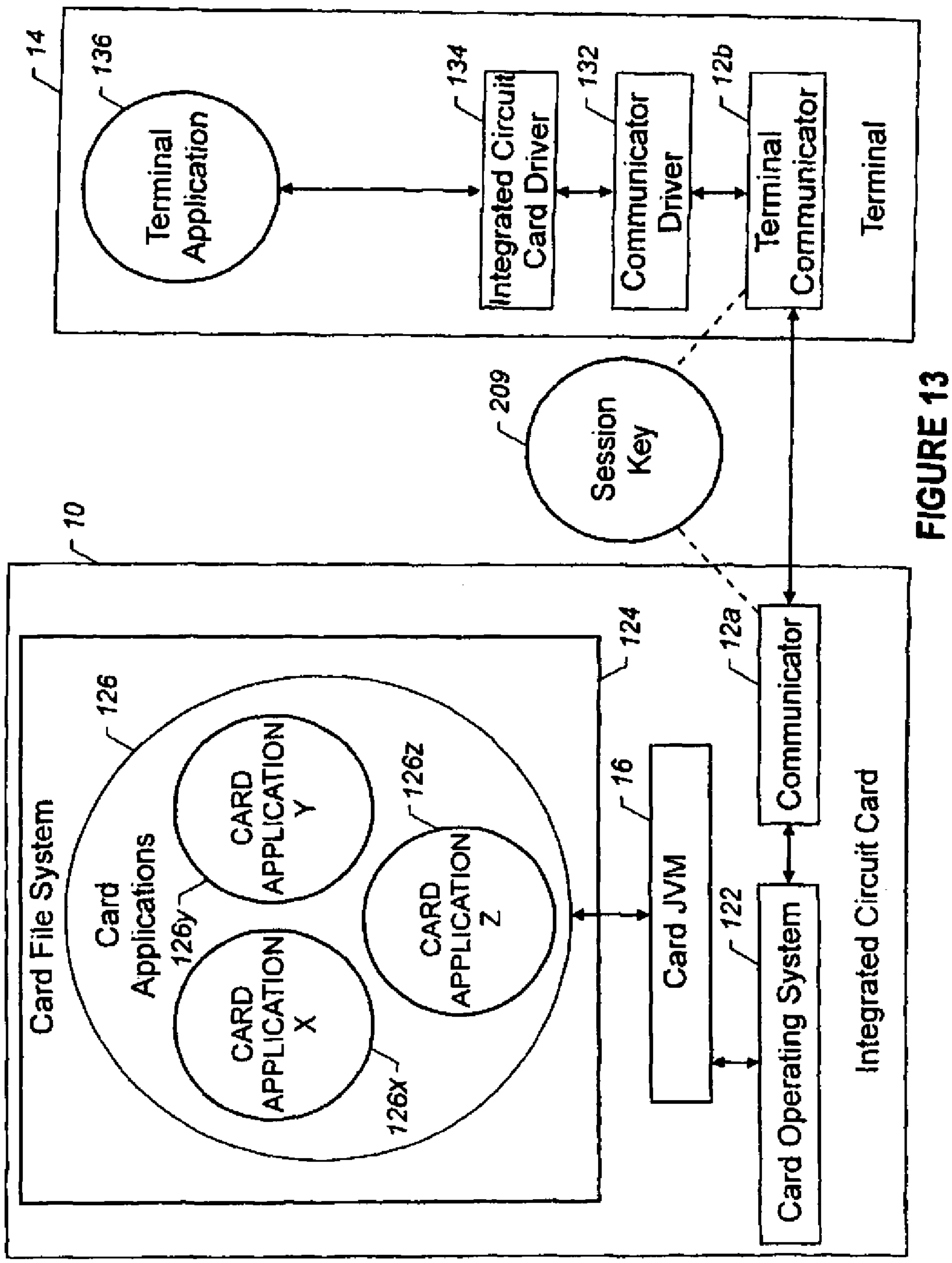
Figure 14:
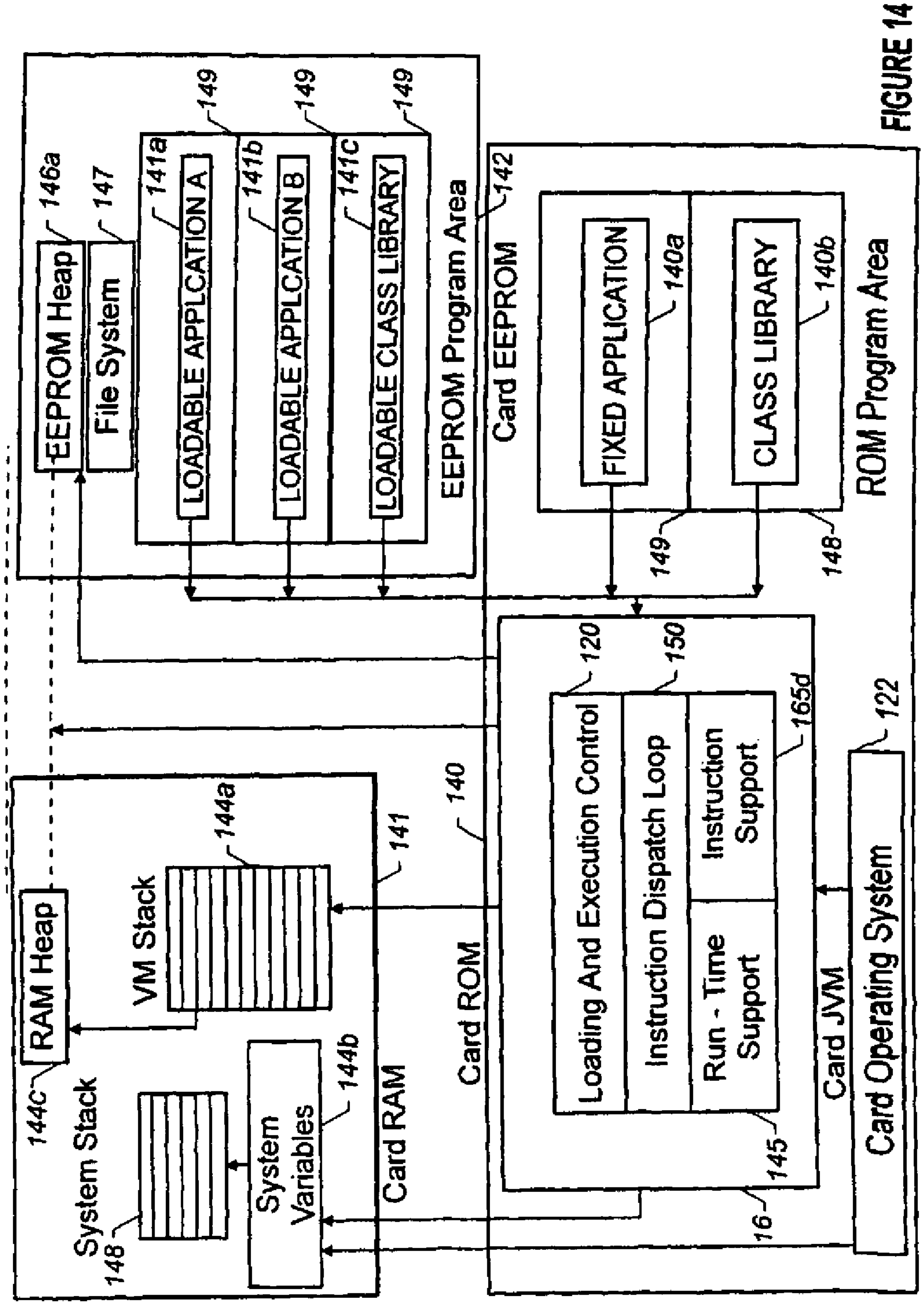
Figure 15:
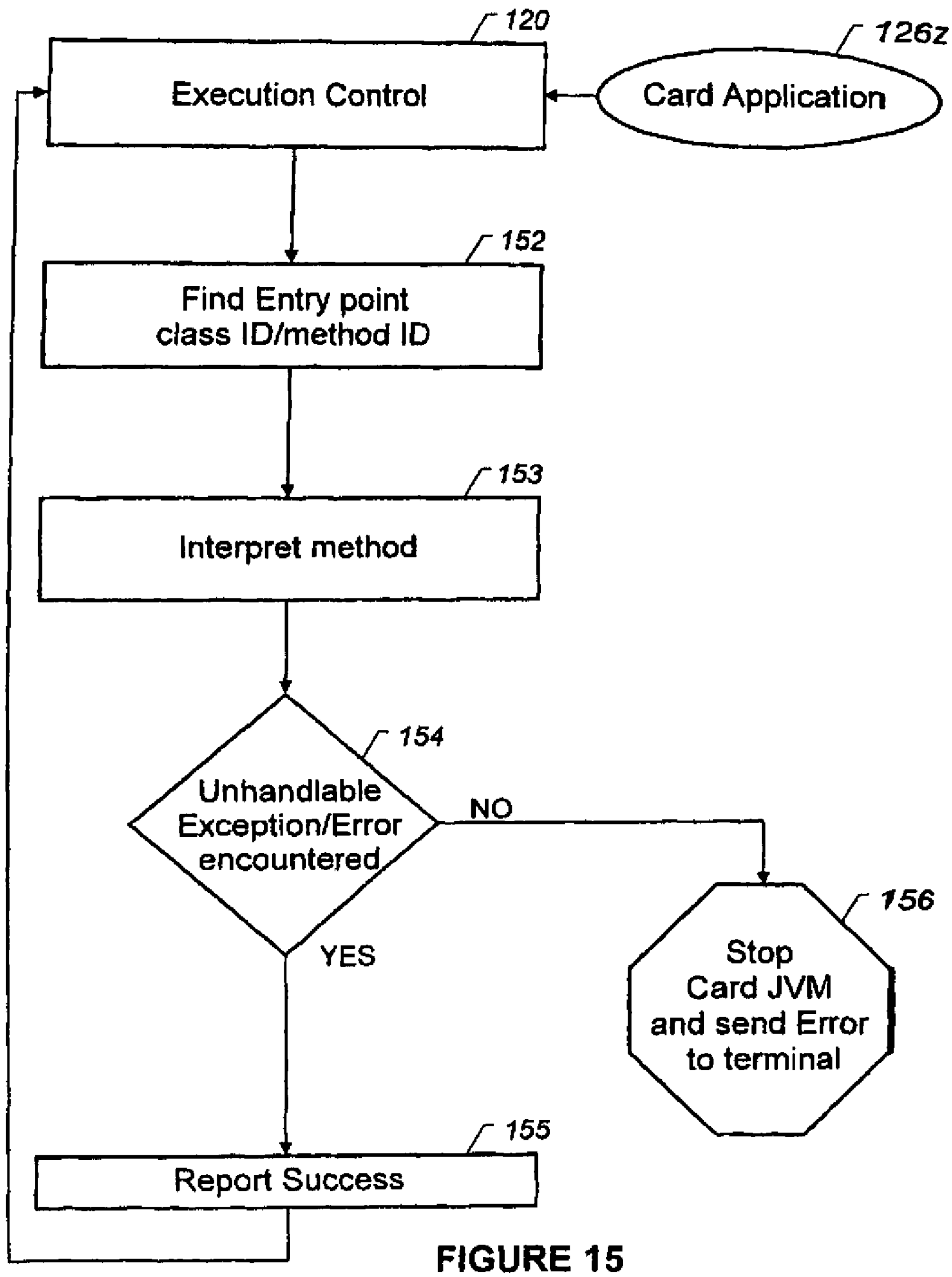
Figure 16:
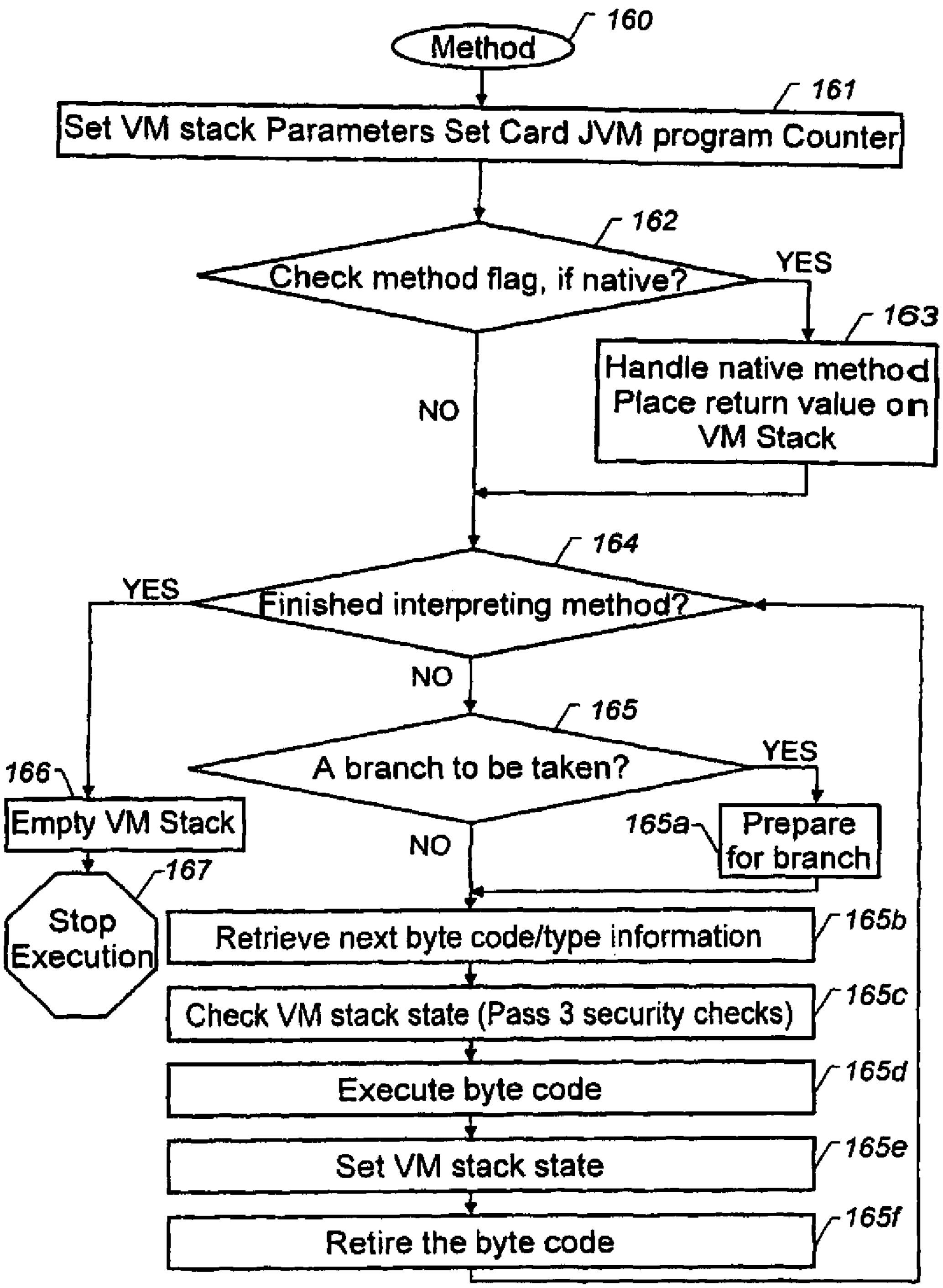
Figure 17:
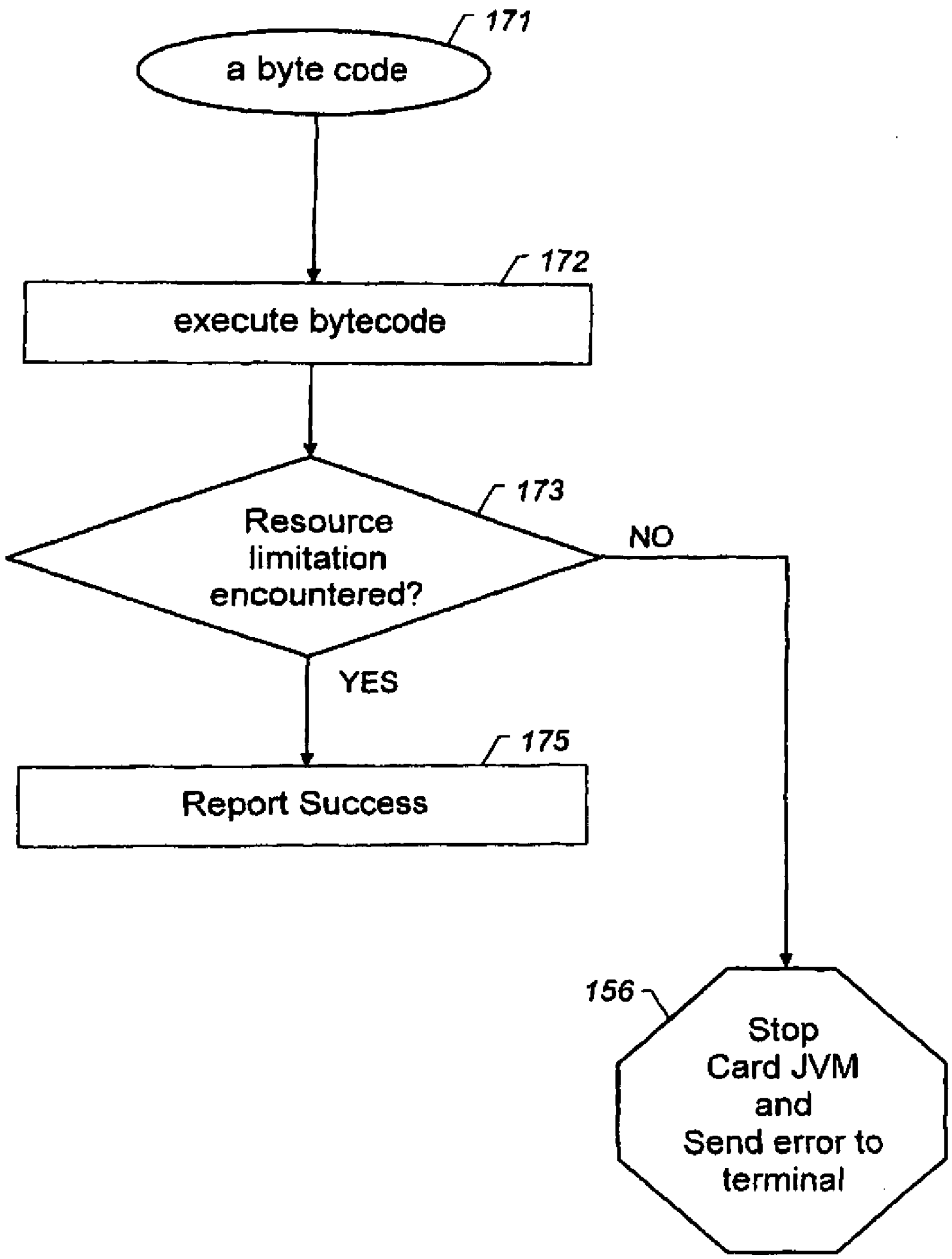
Figure 18:
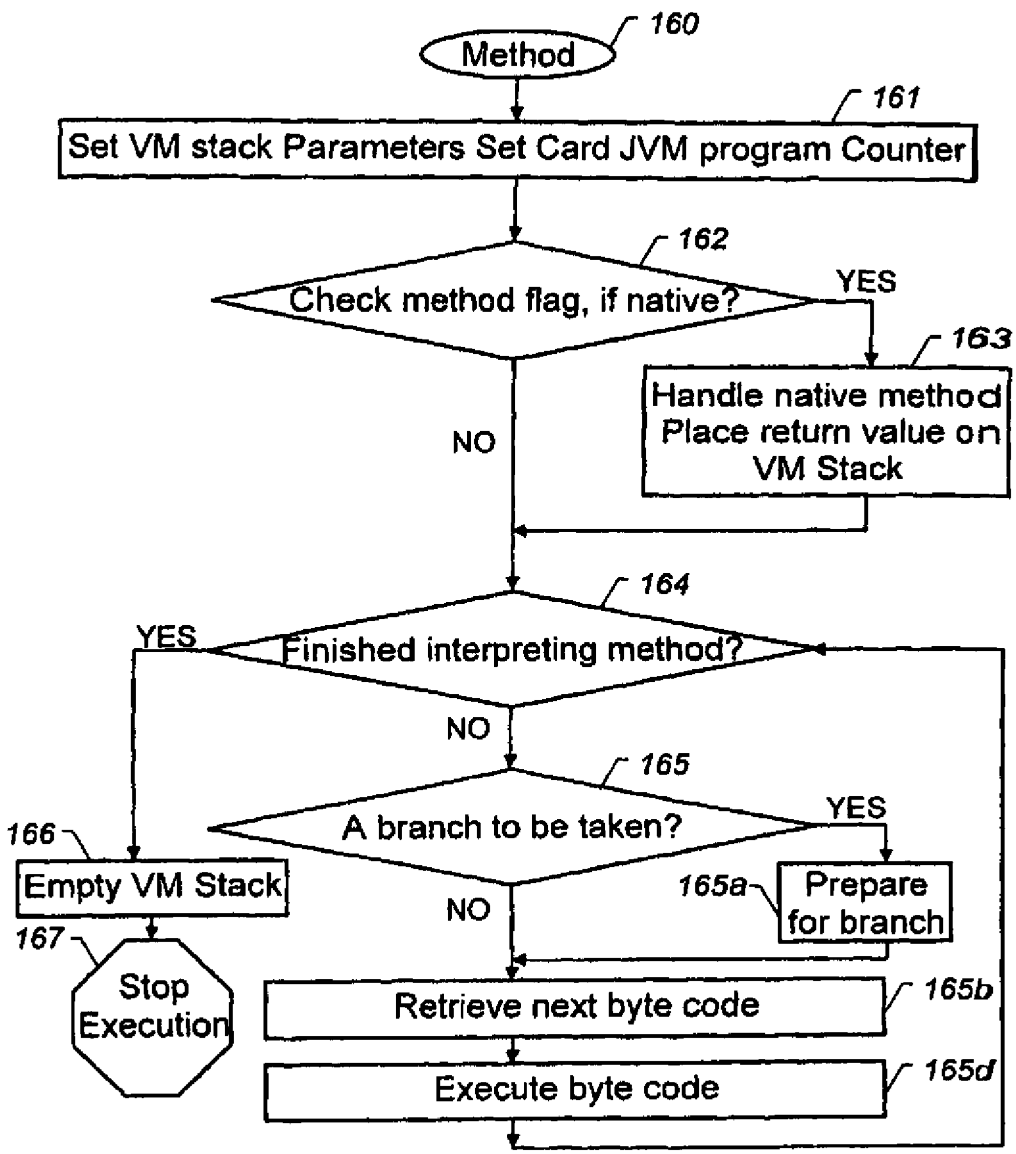
Figure 19:
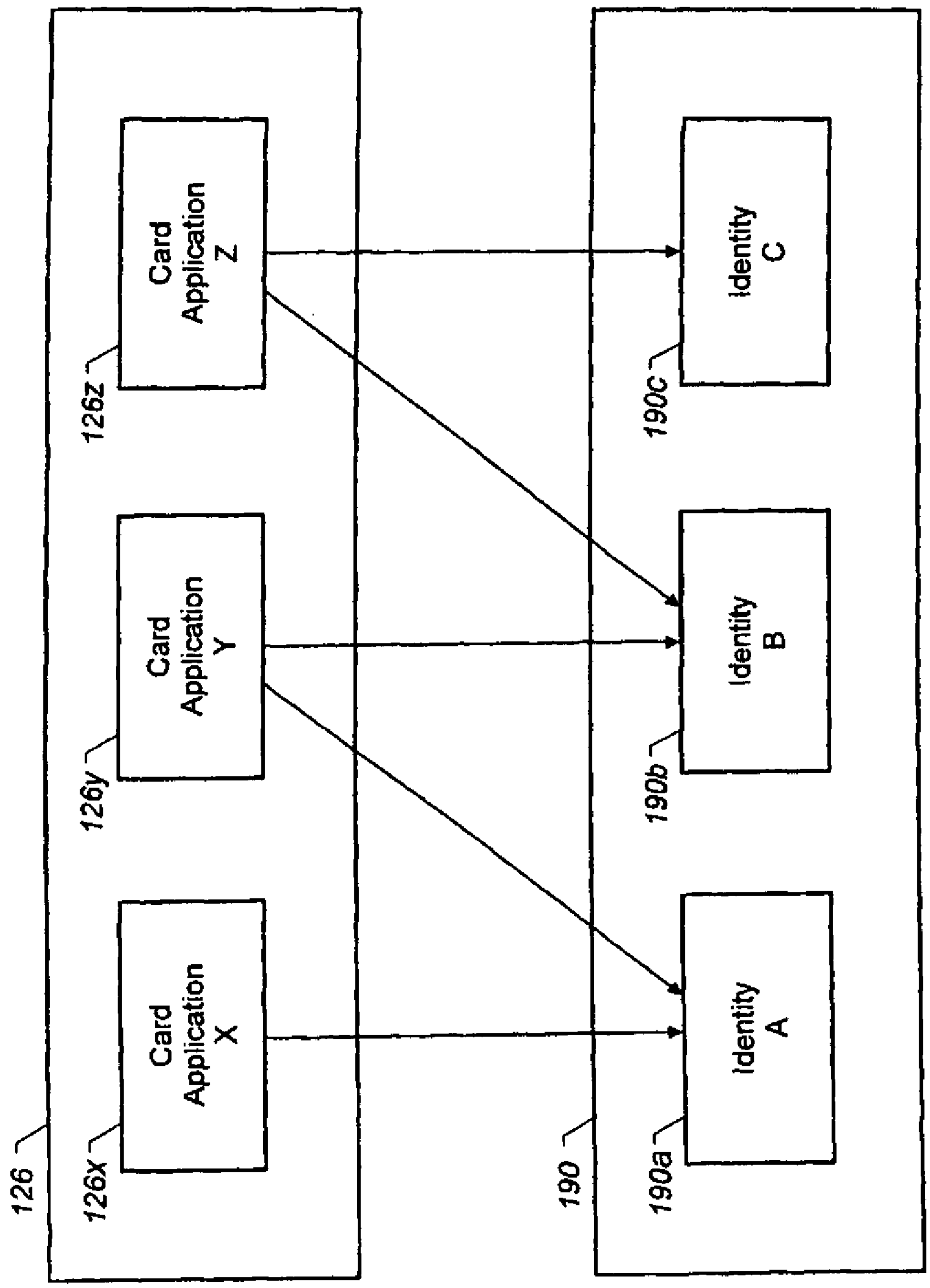
Figure 20:
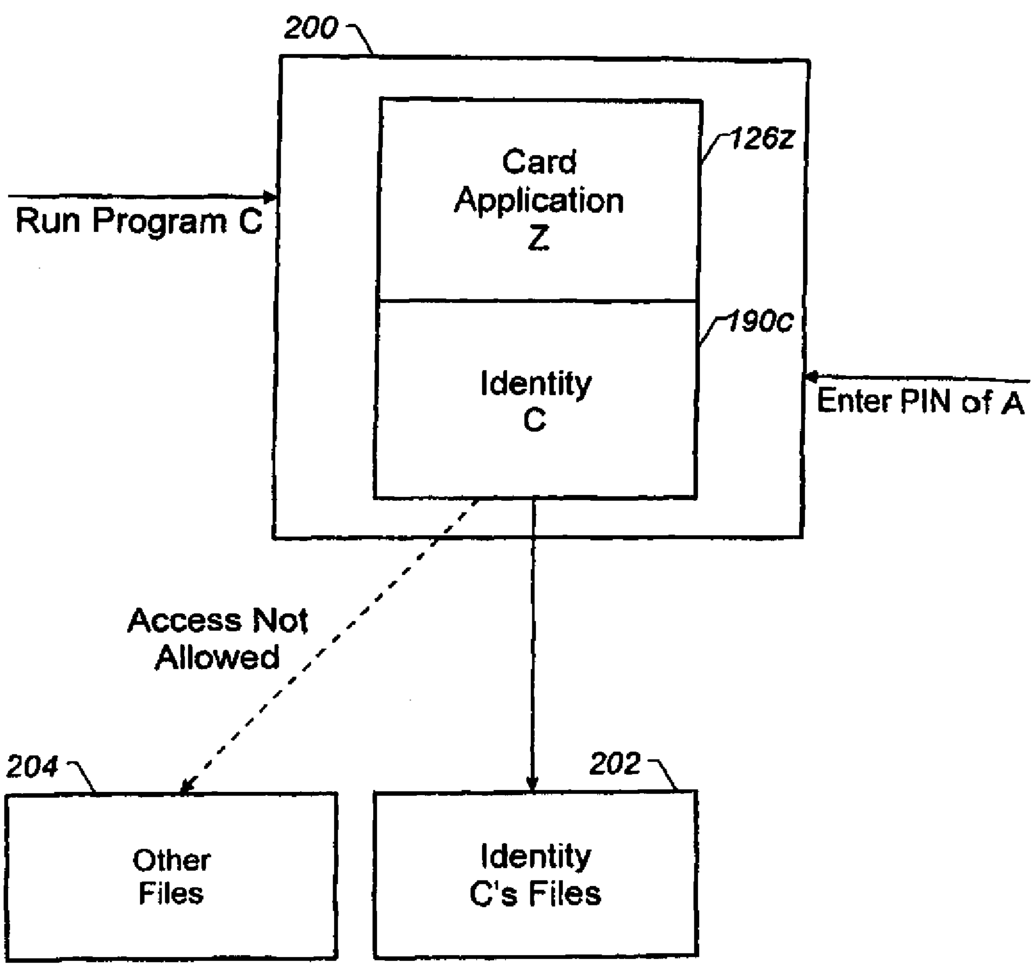
Figure 21:
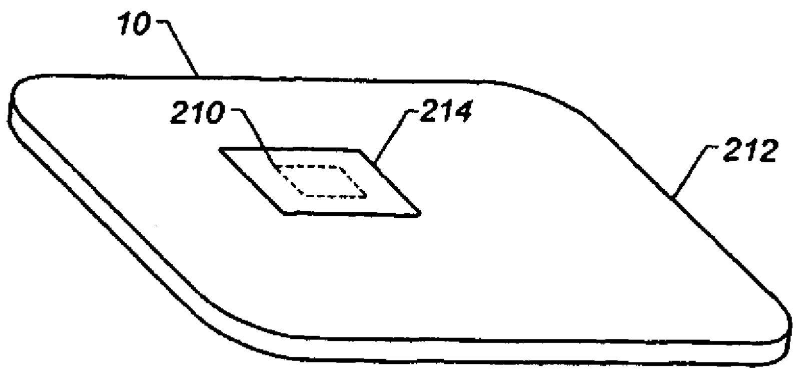
Figure 22:
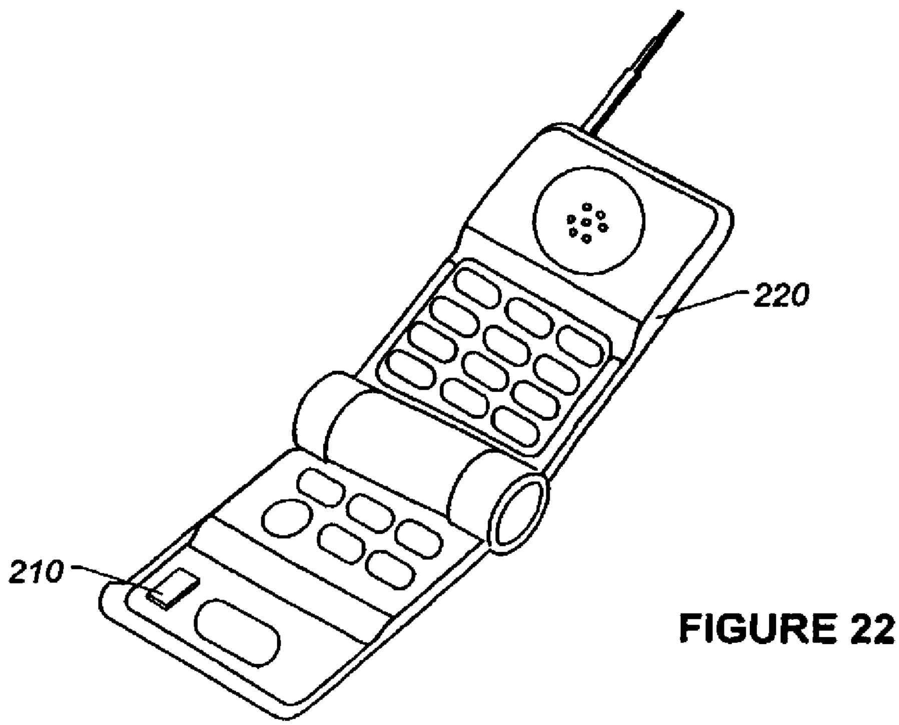
Figure 23:
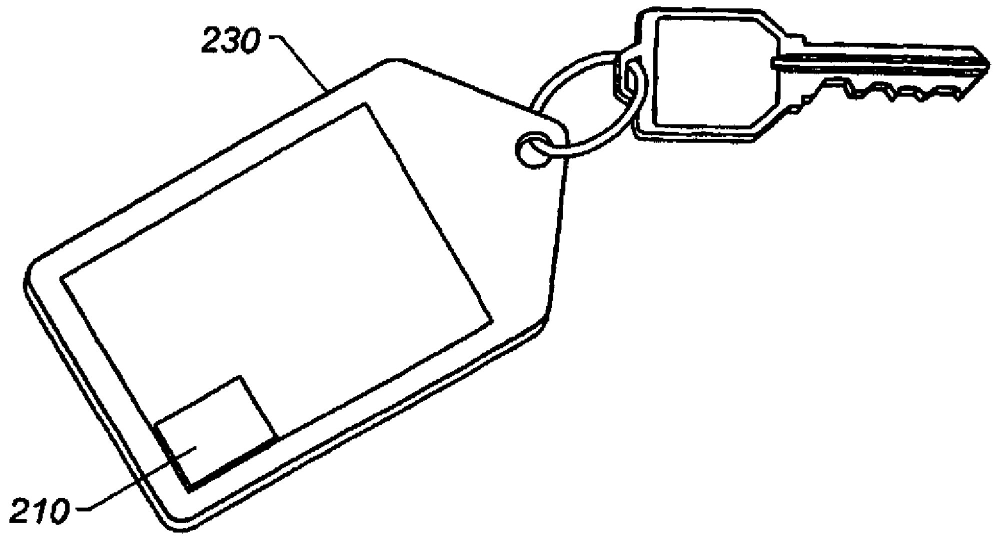
Figure 24:
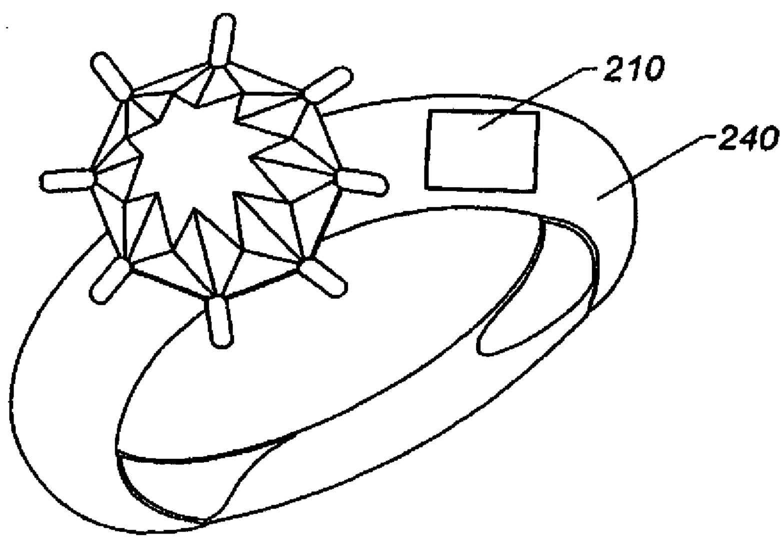
Figure 25:
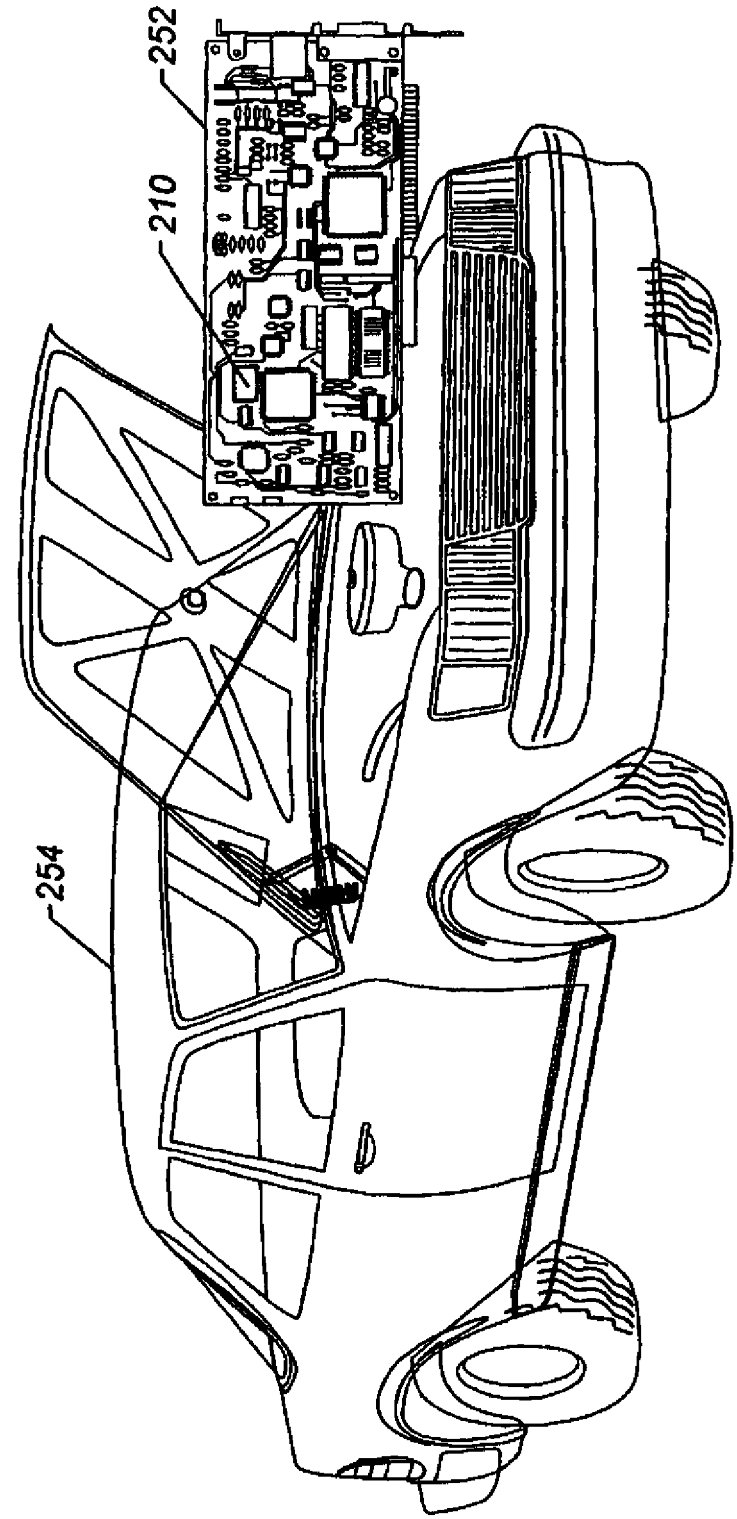

FIG. 25 illustrates a microcontroller 210 mounted in an electrical subsystem 252 of an automobile 254. In this embodiment, the microcontroller is used for a variety of purposes, such as to controlling access to the automobile, (e.g. checking identity or sobriety before enabling the ignition system of the automobile), paying tolls via wireless communication, or interfacing with a global positioning system (GPS) to track the location of the automobile, to name a few.

While specific embodiments of the present invention have been described, various modifications and substitutions will become apparent to one skilled in the art by this disclosure. Such modifications and substitutions are within the scope of the present invention, and are intended to be covered by the appended claims.

The invention claimed is:

1. A method of programming a device having a memory and a processor, the method comprising the steps of:

inputting an application program in a first programming language;

compiling the application program in the first programming language into a first intermediate code associated with the first programming language wherein the first intermediate code is interpretable by a first intermediate code virtual machine and not interpretable by a second intermediate code virtual machine;

converting the first intermediate code into a second intermediate code by performing at least one operation to replace a construct in the first intermediate code with an equivalent construct in the second intermediate code, wherein the second intermediate code is interpretable by the second intermediate code virtual machine and not interpretable by the first intermediate code virtual machine;

loading the second intermediate code into the memory of the device;

providing the application with specific privileges; and upon detecting that the application attempts access to a data item on the device, determining whether the specific privileges of the application are sufficient to allow the application the access to the data item.

2. The method of programming a device of claim 1 wherein providing specific privileges to the application comprises associating an identity with the application.

3. The method of programming a device of claim 1 further comprising determining whether the specific privileges of the application are sufficient to allow the application the access to the data item by delegating the determination to an operating system of the device.

4. The method of programming a device of claim 3 further comprising granting access upon determining that the identity associated with the application is contained in the access control list associated with the data item.

5. The method of programming a programmable device of claim 3 further comprising denying access upon determining that the identity associated with the application is not contained in the access control list associated with the data item.

6. A method of programming a device having a memory and a processor, the method comprising the steps of:

inputting an application program in a first programming language;

compiling the application program in the first programming language into a first intermediate code associated with the first programming language wherein the first intermediate code is interpretable by a first intermediate code virtual machine and not interpretable by a second intermediate code virtual machine;

converting the first intermediate code into a second intermediate code by performing at least one operation to replace a construct in the first intermediate code with an equivalent construct in the second intermediate code, wherein the second intermediate code is interpretable by the second intermediate code virtual machine and not interpretable by the first intermediate code virtual machine; and loading the second intermediate code into the memory of the device;

wherein the second code virtual machine is set to recognize a method invocation as being an invocation of a native code subroutine and upon recognizing the method invocation as being an invocation of a native code subroutine, transferring control to the native code subroutine.

7. The method of programming a device of claim 6 wherein the second code virtual machine passes parameters to the native code subroutine on a stack associated with the second code virtual machine.

8. The method of programming a device of claim 6 wherein the second code virtual machine passes parameters to the native code subroutine on a stack associated with an operating system of the device.

9. An electronic device, comprising:

a memory and a processor connected to the memory;

the memory storing:

a second intermediate code virtual machine configured to interpret applications in a converted form; and an application for the device obtained by:

a compiler operable to compile an application program in a first programming language into a first intermediate code associated with the first programming language wherein the first intermediate code is interpretable by at least one first intermediate code virtual machine and not interpretable by the second intermediate code virtual machine; and a converter operable to convert the first intermediate code into a second intermediate code by performing at least one operation to replace a construct in the first intermediate code with an equivalent construct in the second intermediate code, wherein the second intermediate code is interpretable by a second intermediate code virtual machine and not interpretable by the first intermediate code virtual machine;

wherein the application has associated therewith specific privileges; and wherein the device is operable to, upon detecting that the application attempts access to a data item on the device, determine whether the specific privileges of the application are sufficient to allow the application the access to the data item.

10. The electronic device of claim 9 wherein the specific privileges to the application are associated with an identity associated with the application.

11. The electronic device of claim 10 wherein the device is further operable to grant access upon determining that the identity associated with the application is contained in the access control list associated with the data item.

12. The electronic device of claim 10 wherein the device is further operable to deny access upon determining that the identity associated with the application is not contained in the access control list associated with the data item.

13. An electronic device, comprising:

a memory and a processor connected to the memory;

the memory storing:

a second intermediate code virtual machine configured to interpret applications in a converted form; and an application for the device obtained by:

a compiler operable to compile an application program in a first programming language into a first intermediate code associated with the first programming language wherein the first intermediate code is interpretable by at least one first intermediate code virtual machine and not interpretable by the second intermediate code virtual machine; and a converter operable to convert the first intermediate code into a second intermediate code by performing at least one operation to replace a construct in the first intermediate code with an equivalent construct in the second intermediate code, wherein the second intermediate code is interpretable by a second intermediate code virtual machine and not interpretable by the first intermediate code virtual machine; and wherein the application has associated therewith specific privileges; and wherein the device comprises an operating system operable to, upon detecting that the application attempts access to a data item on the device, determine whether the specific privileges of the application are sufficient to allow the application the access to the data item.

14. An electronic device, comprising:

a memory and a processor connected to the memory;

the memory storing:

a second intermediate code virtual machine configured to interpret applications in a converted form and further configured to recognize a method invocation as being an invocation of a native code subroutine and upon recognizing the method invocation as being an invocation of a native code subroutine, transferring control to the native code subroutine; and an application for the device obtained by:

a compiler operable to compile an application program in a first programming language into a first intermediate code associated with the first programming language wherein the first intermediate code is interpretable by at least one first intermediate code virtual machine and not interpretable by the second intermediate code virtual machine; and a converter operable to convert the first intermediate code into a second intermediate code by performing at least one operation to replace a construct in the first intermediate code with an equivalent construct in the second intermediate code, wherein the second intermediate code is interpretable by a second intermediate code virtual machine and not interpretable by the first intermediate code virtual machine.

15. The electronic device of claim 14 wherein the second code virtual machine passes parameters to the native code subroutine on a stack associated with the second code virtual machine.

16. The electronic device of claim 14 wherein the second code virtual machine passes parameters to the native code subroutine on a stack associated with an operating system of the device.

* * * * *

UNITED STATES PATENT AND TRADEMARK OFFICE

CERTIFICATE OF CORRECTION

PATENT NO. : 8,726,247 B2
APPLICATION NO. : 12/907949
DATED : May 13, 2014
INVENTOR(S) : Wildinson et al.

It is certified that error appears in the above-identified patent and that said Letters Patent is hereby corrected as shown below:

Please delete patent 8726247 in its entirety and insert patent 8726247 in its entirety as shown on the attached pages.

Signed and Sealed this
Twenty-third Day of December, 2014

Michelle K. Lee

Michelle K. Lee
*Deputy Director of the United States Patent and Trademark Office*

(12) United States Patent
Wilkinson et al.

(10) Patent No.: US 8,726,247 B2
(45) **Date of Patent: *May 13, 2014**

(54) COMPUTER PROGRAM PRODUCT CONTAINING INSTRUCTIONS FOR PROVIDING A PROCESSOR THE CAPABILITY OF EXECUTING AN APPLICATION DERIVED FROM A COMPILED FORM

(75) Inventors: Timothy J. Wilkinson, London (GB); Scott B. Guthery, Belmont, MA (US); Ksheerabdhi Krishna, Cedar Park, TX (US); Michael A. Montgomery, Cedar Park, TX (US)

(73) Assignee: Gemalto SA, Meudon (FR)

(*) Notice: Subject to any disclaimer, the term of this patent is extended or adjusted under 35 U.S.C. 154(b) by 95 days.

This patent is subject to a terminal disclaimer.

(21) Appl. No.: 12/907,949

(22) Filed: Oct. 19, 2010

(65) Prior Publication Data

US 2011/0126178 A1 May 26, 2011

Related U.S. Application Data

(63) Continuation of application No. 11/537,156, filed on Sep. 29, 2006, now Pat. No. 7,818,727, which is a continuation of application No. 10/037,390, filed on Oct. 23, 2001, now Pat. No. 7,117,485, which is a continuation of application No. 08/957,512, filed on Oct. 24, 1997, now Pat. No. 6,308,317.

(60) Provisional application No. 60/029,057, filed on Oct. 25, 1996.

(51) Int. Cl.
*G06F 9/45* (2006.01)

(52) U.S. Cl.
USPC .......... 717/139

(58) Field of Classification Search
USPC .......... 717/139
See application file for complete search history.

(56) References Cited

U.S. PATENT DOCUMENTS

| | | | |
|---|---|---|---|
| 4,256,955 | A | 3/1981 | Giraud et al. |
| 4,650,975 | A | 3/1987 | Kitchener |
| 4,667,290 | A | 5/1987 | Goss et al. |

(Continued)

FOREIGN PATENT DOCUMENTS

| | | |
|---|---|---|
| EP | 0427465 A2 | 5/1991 |
| EP | 0718760 A2 | 6/1996 |

(Continued)

OTHER PUBLICATIONS

Defendant Google Inc.'s Answer to Plaintiff's Complaint for Patent Infringement and Counterclaims, *Gemalto* V. *HTC*, Civil Action No. 6:10-cv-561(LED) (E.D.Tex. Feb. 25, 2011).

(Continued)

*Primary Examiner* — John Chavis
(74) *Attorney, Agent, or Firm* — The Jansson Firm; Pehr B. Jansson

(57) ABSTRACT

An integrated circuit card is used with a terminal. The integrated circuit card includes a memory that stores an interpreter and an application that has a high level programming language format. A processor of the card is configured to use the interpreter to interpret the application for execution and to use a communicator of the card to communicate with the terminal.

16 Claims, 23 Drawing Sheets

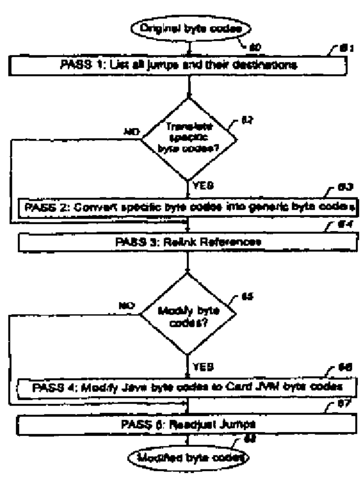

(56) References Cited

U.S. PATENT DOCUMENTS

| | | | | |
|---|---|---|---|---|
| 4,777,355 | A | | 10/1988 | Takahira |
| 4,791,558 | A | * | 12/1988 | Chaitin et al. ............... 717/140 |
| 4,797,543 | A | | 1/1989 | Watanabe |
| 4,874,935 | A | | 10/1989 | Younger |
| 4,877,947 | A | | 10/1989 | Mori |
| 4,905,138 | A | | 2/1990 | Bourne |
| 4,928,001 | A | | 5/1990 | Masada |
| 5,014,312 | A | | 5/1991 | Lisimaque et al. |
| 5,064,999 | A | | 11/1991 | Okamoto et al. |
| 5,133,072 | A | | 7/1992 | Buzbee |
| 5,195,130 | A | | 3/1993 | Weiss et al. |
| 5,210,876 | A | | 5/1993 | Uchida |
| 5,307,492 | A | | 4/1994 | Benson |
| 5,367,685 | A | | 11/1994 | Gosling |
| 5,406,380 | A | | 4/1995 | Teter |
| 5,450,575 | A | | 9/1995 | Sites |
| 5,457,799 | A | | 10/1995 | Srivastava |
| 5,469,572 | A | | 11/1995 | Taylor |
| 5,500,517 | A | | 3/1996 | Cagliostro |
| 5,519,866 | A | | 5/1996 | Lawrence et al. |
| 5,537,474 | A | | 7/1996 | Brown et al. |
| 5,544,086 | A | | 8/1996 | Davis et al. |
| 5,550,919 | A | | 8/1996 | Kowalski |
| 5,551,015 | A | | 8/1996 | Goettelmann et al. |
| 5,590,197 | A | | 12/1996 | Chen et al. |
| 5,590,331 | A | | 12/1996 | Lewis et al. |
| 5,604,802 | A | | 2/1997 | Holloway |
| 5,613,012 | A | | 3/1997 | Hoffman et al. |
| 5,613,120 | A | | 3/1997 | Palay et al. |
| 5,650,761 | A | | 7/1997 | Gomm et al. |
| 5,663,553 | A | | 9/1997 | Aucsmith |
| 5,668,999 | A | | 9/1997 | Gosling |
| 5,675,804 | A | | 10/1997 | Sidik et al. |
| 5,679,945 | A | | 10/1997 | Renner et al. |
| 5,689,565 | A | | 11/1997 | Spies et al. |
| 5,692,132 | A | | 11/1997 | Hogan |
| 5,734,150 | A | | 3/1998 | Brown et al. |
| 5,742,756 | A | | 4/1998 | Dillaway et al. |
| 5,748,964 | A | | 5/1998 | Gosling |
| 5,761,306 | A | | 6/1998 | Lewis |
| 5,764,989 | A | | 6/1998 | Gustafsson et al. |
| 5,768,419 | A | | 6/1998 | Gundlach et al. |
| 5,794,049 | A | | 8/1998 | Lindholm |
| 5,799,138 | A | | 8/1998 | Yoshida |
| 5,811,771 | A | | 9/1998 | Dethloff |
| 5,815,657 | A | | 9/1998 | Williams et al. |
| 5,826,088 | A | | 10/1998 | Sitbon et al. |
| 5,835,772 | A | | 11/1998 | Thurlo |
| 5,841,866 | A | | 11/1998 | Bruwer et al. |
| 5,844,218 | A | | 12/1998 | Kawan et al. |
| 5,848,274 | A | | 12/1998 | Hamby et al. |
| 5,860,008 | A | | 1/1999 | Bradley |
| 5,889,941 | A | | 3/1999 | Tushie et al. |
| 5,896,530 | A | | 4/1999 | White |
| 5,905,895 | A | | 5/1999 | Halter |
| 5,912,453 | A | | 6/1999 | Gungl |
| 5,915,226 | A | | 6/1999 | Martineau |
| 5,923,884 | A | | 7/1999 | Peyret et al. |
| 5,940,516 | A | | 8/1999 | Mason et al. |
| 5,946,487 | A | | 8/1999 | Dangelo |
| 5,956,716 | A | | 9/1999 | Kenner et al. |
| 5,963,980 | A | | 10/1999 | Coulier et al. |
| 5,966,536 | A | | 10/1999 | Ravichandran |
| 5,987,256 | A | | 11/1999 | Wu et al. |
| 6,061,520 | A | | 5/2000 | Yellin et al. |
| 6,075,863 | A | | 6/2000 | Krishnan et al. |
| 6,078,744 | A | | 6/2000 | Wolczko et al. |
| 6,094,528 | A | | 7/2000 | Jordan |
| 6,151,703 | A | | 11/2000 | Crelier |
| 6,223,984 | B1 | | 5/2001 | Renner et al. |
| 6,226,789 | B1 | | 5/2001 | Tye et al. |
| 6,233,733 | B1 | | 5/2001 | Ghosh |
| 6,438,573 | B1 | | 8/2002 | Nilsen |
| 6,526,565 | B1 | | 2/2003 | Nally |
| 6,535,903 | B2 | | 3/2003 | Yates et al. |
| 2005/0097550 | A1 | | 5/2005 | Schwab et al. |
| 2008/0282238 | A1 | | 11/2008 | Meijer et al. |

FOREIGN PATENT DOCUMENTS

| | | | |
|---|---|---|---|
| EP | 0829828 | A1 | 3/1998 |
| EP | 0889393 | A2 | 1/1999 |
| FR | 2667171 | A1 | 3/1992 |
| GB | 2191029 | A | 12/1987 |
| GB | 2261973 | A | 6/1993 |
| JP | 204741 | A1 | 9/1986 |
| JP | 63156254 | A | 6/1988 |
| JP | 63156255 | A | 6/1988 |
| WO | WO95/04328 | A1 | 2/1995 |
| WO | WO9504328 | A1 | 2/1995 |
| WO | WO96/25724 | A1 | 8/1996 |
| WO | WO9720281 | A1 | 6/1997 |
| WO | WO9750063 | A2 | 12/1997 |
| WO | 9819237 | A1 | 5/1998 |

OTHER PUBLICATIONS

HTC Defendants' Answer to Plaintiff's Complaint for Patent Infringement and Counterclaims, *Gemalto* V. *HTC*, Civil Action No. 6:10-cv-561(LED) (E.D.Tex. Feb. 25, 2011).

Amended Complaint for Patent Infringement, *Gemalto* V. *HTC*, Civil Action No. 6:10-cv-561(LED) (E.D.Tex. Jan. 26, 2011).

Samsung Electronics Co., Ltd and Samsung Telecommunications America LLC's Answer to Plaintiff's Amended Complaint for Patent Infringement, *Gemalto* V. *HTC*, Civil Action No. 6:10-cv-561(LED) (E.D.Tex. Feb. 25, 2011).

Motorola Mobility's Answer to Plaintiff's Amended Complaint for Patent Infringement and Counterclaims, *Gemalto* V. *HTC*, Civil Action No. 6:10-cv-561(LED) (E.D.Tex. Feb. 25, 2011).

Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Exhibit A of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-1 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-2 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-3 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-4 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-5 of: Invalidity Contentions filed with the US District Court for the Eastern District of Texas, Tyler Division, by a Defendant on Oct. 31, 2011 in which arguments are presented that claims in US

(56) References Cited

OTHER PUBLICATIONS 6,308,317, US 7,117,485 and US 7,818,727 are invalid or unenforceable in *Gemalto S.A.* v. *HTC Corporation*, Civil Action No. 6:10-CV-561-LED.

Chart A-6 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-7 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-8 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-9 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-10 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-11 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-12 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-13 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-14 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-15 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-16 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-17 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-18 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-19 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-20 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-21 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-22 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-23 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-24 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-25 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-26 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-27 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-28 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

(56) References Cited

OTHER PUBLICATIONS

Chart A-29 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-30 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-31 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-32 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-33 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-34 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-35 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-36 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Exhibit B of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Michal Cierniak, et al., Briki: a Fexible Java Compiler, Technical Report 621, May 1996, Department of Computer Science, University of Rochester, Rochester, NY.

Michal Cierniak, et al., Briki: an Optimizing Java Compiler, 1997, IEEE, p. 179-184.

Adl-Tabatabai, Ali-Reza, et al., Efficient and Language-Independent Mobile Programs, Extended Abstract, School of Computer Science, Carnegie Mellon University, Pittsburgh, PA., Oct. 22, 1995.

Lucco, et al., Colusa Software White Paper, Omniware: A Universal Substrate for Mobile Code, 1995.

Steven Lucco, et al., Omniware: A Universal Substrate for Web Programming, 1995.

Walter R. Smith, The Newton Application Architecture, Proceedings of the 39th IEEE Computer Society International Conference, pp. 156-161, San Francisco, 1994.

Jonathan C. Hardwick, et al., Java as an Intermediate Language, Aug. 12, 1996, School of Computer Science, Carnegie Mellon University, Pittsburgh, PA.

Pierre Paradinas, et al., A Personal and Portable Database Server: the CQL Card, Lecture Notes in Computer Science (Applications of Databases), 1994, vol. 819, pp. 444-457.

Pieter H. Hartel, et al., Towards testability in smart card operating system design, CARDIS 94, Lille, France, 1994, p. 1-16.

Olivier Caron, et al., New architectures for smart cards: the OCEAN approach, IEEE, 1994, p. 148-155.

Brian T. Lewis, et al., Clarity MCode: A Retargetable Intermediate Representation for Compilation, ACM, May 1995, p. 119-128.

Jack W. Davidson, et al., Cint: A RISC Interpreter for the C Programming Language, 1987, p. 189-198, Association for Computing Machinery.

Richard P. Gabriel, Performance and Evaluation of Lisp Systems, The MIT Press in their Computer System Series. (ISBN 0-262-07093-6), Aug. 14, 1985, whole document, The Massachusetts Institute of Technology, Cambridge, Massachusetts.

David Gries, Compiler Construction for Digital Computers, 1971, John Wiley & Sons, Inc., Toronto, Canada.

General Magic, Inc., Telescript Language Reference, Oct. 1995., Sunnyvale, CA.

General Magic, Inc., Telescript Programming Guide V0.5, Oct. 19, 1995, Sunnyvale, CA.

Gregory John Michaelson, Interpreter prototypers from formal language definitions, Apr. 1993, Thesis submitted for the degree of Doctor of Philosophy, Heriot-Watt University, Edinburgh, Scotland.

J. Bradley Chen, et al., Morph: A Framework for Platform-Specific Optimization, Technical Report 04-96, Center for Research in Computing Technology, Harvard University, Cambridge, MA, Mar. 12, 1996.

Scott Draves, Compiler Generation for Interactive Graphics using Intermediate Code, Lecture Notes in Computer Science, vol. 1110/1996, 1996.

Frederick Colville Knabe, Language Support for Mobile Agents, CMU-CS-95-223, School of Computer Science Carnegie Mellon University, Pittsburgh, PA 15213, Submitted in partial fulfillment of the requirements for the degree of Doctor of Philosophy, Dec. 1995.

Henry M. Wu, Scheme86 An Architecture for Microcoding a Scheme Interpreter, Aug. 1988, Artificial Intelligence Laboratory and Department of Electrical Engineering and Computer Science, Massachusetts Institute of Technology, Cambridge, MA.

Christopher W. Fraser, et al., Custom Instruction Sets for Code Compression, Oct. 19, 1995.

David F. Bacon, et al., Compiler Transformations for High-Performance Computing, ACM Computing Surveys, vol. 26, No. 4, Dec. 1994.

David S. Blickstein, et al., The GEM Optimizing Compiler System, Digital Technical Journal, vol. 4, No. 4, Special Issue 1992.

CASL Programmers Reference, publication date unknown, possibly before 1997.

Enrico Ballarin, et al., Making a Compiler Easily Portable, May 1988, IEEE Software, IEEE, pp. 30-38.

James Gosling, Java Intermediate Bytecodes, ACM SIGPLAN Workshop on Intermediate Representations, ACM, 1995.

Greg Hewgill, Jump User's Manual Version 1.0 Beta 4, Oct. 1997 (earlier version 1996).

David G. Messerschmitt, Important future technologies—Java,—CORBA, Department of Electrical Engineering and Computer Sciences, Lecture Mar. 30, 1997.

Daniel P. Miranker, et al., The Organization and Performance of a TREAT-Based Production System Compiler, IEEE Transactions on Knowledge and Data Engineering, vol. 3, No. 1, Mar. 1991, IEEE, p. 3-10.

Dave Birch, et al., Multi-Application Smartcard Platforms The third way, Hyperion Systems Limited, Nov. 14, 1998, p. 1-5.

Kin-Man Chung, et al., A "Tiny" Pascal Compiler, Part 1: The P-Code Interpreter, Sep. 1978, BYTE Publications Inc.

Thomas Gustafsson, Control, et al, Regsim: A Software Tool for Real Time Control and Simulation, 1995 Proceedings of the 4th IEEE Conference on Control Applications, Piscataway, NJ, IEEE, 1995, p. 168-173.

(56) References Cited

OTHER PUBLICATIONS

William Rowan, A LISP Compiler Producing Compact Code, LPF '80 Proceedings of the 1980 ACM Conference on LISP and Functional Languages, ACM, pp. 216-222.
Stefano Crespi-Reghizzi, et al., A Survey of Microprocessor Languages, Computer, Jan. 1980, p. 48-66, IEEE Computer Society Press, Los Alamitos, CA.
Kemal Ebcioglu, et al., VLIW Compilation Techniques in a Superscalar Environment, ACM SIG Plan Notices, vol. 29, No. 6, Proceedings of the ACM SIGLAN '94 Conference on Programming Language Design and Implementation (PLDI) Jun. 20-24, 1994, pp. 36-48.
John Banning, The XDOS Binary Code Conversion System, IEEE, 1989, p. 282-287.
Cheng-Hsueh A. Hsieh, et al., Java Bytecode to Native Code Translation: The Caffeine Prototype and Preliminary Results, Published in the Proceedings of the 29th Annual International Symposium on Microarchitecture, p. 1-8, Dec. 2-4, 1996, Paris, France, IEEE, 1996.
Paul Tarau, et al., The Power of Partial Translation: An Experiment With the C-Ification of Binary Prolog, ACM, p. 152-156, 1995.
Frank Yellin, The JIT Compiler API, Sun Microsystems Inc., Oct. 4, 1996, p. 1-23.
James Gosling, et al., The JavaTM Language Environment, A White Paper, JAVASOFT, Sun Microsystems Inc., Mountain View, CA, May 1996.
Olin Shivers, Supporting dynamic languages on the Java virtual machine, A.I. Memo No. 1576, Apr. 1996, Massachusetts Institute of Technology Artificial Intelligence Laboratory, Cambridge, MA.
Craig Chambers, et al., Whole-Program Optimization of Object-Oriented Languages, Department of Computer Science and Engineering, University of Washington, Seattle, Washington, Technical Report Jun. 2, 1996, Jun. 6, 1996.
Bjarne Steensgaard, et al., Object and Native Code Thread Mobility Among Heterogeneous Computers, ACM, 1995.
T.L. Harris, A just-in-time Java byte-code compiler, Oct. 22, 1996, Churchill College, p. 1-6, Churchill College.
BASIC stamp user manual, Parallax, Inc., 1993.
BASIC stamp I—Instruction List, Parallax, Inc., 1993.
BASIC stamp—Syntax Description, Parallax, Inc., 1993.
Chuck McManis, Decoding The BASIC Stamp, 1994 (http://www.mcmanis.com/chuck/robotics/stamp-decode.html, accessed on Mar. 6, 2012).
Clark Lindsey, et al., Javelin Stamp, JAVATECH: An Introduction to Scientific and Technical Computing with JAVA, chapter 24, Dec. 14, 2004 (web version at http://www.particle.kth.se/~lindsey/JavaCourse/Book/Part3/Chapter24/Javelin.html accessed on Mar. 6, 2012).
Al Williams, Scaling Java, Embedded Systems Programming Magazine, Jun. 2001, http://www.eetimes.com/design/embedded/4023339/Scaling-Java (accessed on Mar. 6, 2012).
Manuel E. Benitez, et al., A Portable Global Optimizer and Linker, Proceedings of the SIGPLAN '88 Conference on Programming Language Design and Implementation, Atlanta, Georgia, Jun. 22-24, ACM, 1988, p. 329-338.
Parallax Inc: Origins, http://www.parallax.com/tabid/791/Default.aspx (accessed on Mar. 6, 2012).
p-System: Description, Background, Utilities, Education Technology Center, Dept. of Information and Computer Science, University of California, Irvine, CA, http://www.ics.uci.edu/~archive/documentation/p-system/p-system.html (accessed on Mar. 6, 2012).
Stephen Pelc, The Evolution of SENDIT Into EPIC, Proceedings of the 1996 Rochester Conference on Open Systems, Jun. 19-22, 1996, Ryerson Polytechnic University, Toronto, Ontario, Canada, Jun. 19-22, 1996, p. 63-67.
Peter Johannes, et al., A Platform-Independent Token System for Payment rerminals, Forth Dimensions, vol. XIX, No. 2, Jul.-Aug. 1997, pp. 7-11.
Open Terminal Architecture System Overview, Europay International SA, Waterloo, Belgium, Version 2.1, May 19, 1997.
Europay International, Open Terminal Architecture (OTA) for Multi-application Smart Card Terminals, Waterloo, Belgium, p. 1-6, whole document, 1996.
E. D. Rather and D.A. Ruffer, A Platform-independent Token System for Payment Terminals (V1), Forth, Inc., pp. 1-7, 1996.
E. D. Rather, S.F. Pelc, and P. Johannes, A Platform-independent Token System for Payment Terminals (V2), pp. 1-6, 1996.
E. D. Rather, et al., A Platform-independent Token System for Payment Terminals, Forth Dimensions XIX/2, No. 2, Jul.-Aug. 1997, Forth Interest Group, Carmel, CA, p. 7-11.
E. D. Rather, et al., The Europay Open Terminal Architecture, A Forth-based Token System for Payment Terminals, Proceedings of the 1996 Rochester Conference on Open Systems, Jun. 1996.
Peter Wayner, State of the Art Sun Gambles on Java Chips, BYTE, Nov. 1996, p. 79, 80, 82, 84, 86 and 88.
Claus M. Muller, Java—mehr als eine programmiersprache, Heidelberg, Germany, 1996 (in German, Translation not available).
Europay Announces OTA, Smart Card News, ISSN: 0967-196X, Brighton, England, Jul. 1996, p. 125.
E. D. Rather, et al., The Europay Open Terminal Archetecture A Forth-based Token System for Payment Terminals (2nd of 3 papers on OTA), Proceedings of the 1996 Rochester Conference on Open Systems, Jun. 1996, pp. 73-77.
Europay International S.A., Open Terminal Architecture (OTA) Specification, vol. 1: Virtual Machine Specification, Waterloo, Belgium, Version 3.3, Dec. 15, 1998.
Europay International S.A., Open Terminal Architecture (OTA) Specification, vol. 2: Forth Language Programming Interface, Waterloo, Belgium, Version 3.0, Feb. 11, 1999.
Europay International S.A., Open Terminal Architecture (OTA) Specification, vol. 3: C Language Programming Interface, Waterloo, Belgium, Version 3.2, Dec. 9, 1998.
Europay International S.A., Open Terminal Architecture (OTA) Specification, vol. 4: Mixed Language Programming, Waterloo, Belgium, Version 1.1, Jul. 1, 1997.
Europay International S.A., TKTP Reference Manual, Version 4.4, Mar. 10, 1999.
E. D. Rather, et al., The Europay Open Terminal Archetecture A Forth-based Token System for Payment Terminals 1st of 3 papers on OTA), Proceedings of the 1996 Rochester Conference on Open Systems, Jun. 1996, pp. 27-29.
Pierre Paradinas, et al., New Directions for Integrated Circuit Cards Operating Systems, Operating Systems Review, 29(1):56-61, 1995 (Accessed from http://cedric.cnam.fr/%7Eparadinas/presentation/OSR.pdf on Mar. 6, 2012).
Defendants 3-3 and 3-6 Invalidity Contentions: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A. v. HTC Corporation*, Civil Action No. 6:10-CV-561-LED.
Exhibit A of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A. v. HTC Corporation*, Civil Action No. 6:10-CV-561-LED.
Chart A-1 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A. v. HTC Corporation*, Civil Action No. 6:10-CV-561-LED.
Chart A-2 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A. v. HTC Corporation*, Civil Action No. 6:10-CV-561-LED.
Chart A-3 of: Amended Invalidity Contentions filed with the US District Court for the Eastern District of Texas, Tyler Division, by a Defendant on Oct. 23, 2012 in which arguments are presented that

(56) References Cited

OTHER PUBLICATIONS claims in US 6,308,317, US 7,117,485 and US 7,818,727 are invalid or unenforceable in *Gemalto S.A.* v. *HTC Corporation*, Civil Action No. 6:10-CV-561-LED.

Chart A-4 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-5 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-6 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-7 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-8 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-9 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-10 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-11 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-12 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-13 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-14 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-15 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-16 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-17 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-18 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-19 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-30 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-32 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-33 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-34 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-35 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-36 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-37 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

(56) References Cited

OTHER PUBLICATIONS

Chart A-38 of: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Exhibit B: List of Prior Art: Amended Invalidity Contentions filed with the US District Court for the Eastern District of Texas, Tyler Division, by a Defendant on Oct. 23, 2012 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
*Gemalto S.A.* vs. *HTC Corporation, et al.*, Case No. 6:10-CV-561 LED-JDL, Report and Recommendation of United States Magistrate Judge, Jun. 28, 2012, United States District Court for the Eastern District of Texas, Tyler Division, whole Document.
*Gemalto S.A.* vs. *HTC Corporation, et al.*, Case No. 6:10-CV-561 LED-JDL, Memorandum Opinion and Order, Jun. 28, 2012, United States District Court for the Eastern District ofTexas, Tyler Division, whole Document and Appendix A.
Palsberg Expert Report on Invalidity filed with the US District Court for the Eastern District of Texas, Tyler Division, on Dec. 5, 2012. *Gemalto S.A.* v. *HTC Corporation* Case 6:10-CV-561-LED relating to claims in U.S. Patent 6,308,317, 7,117,485, and 7,818,727.
Exhibit A—to the Expert Report of Jens Palsberg, Ph.D.: List of Materials Considered, filed with the US District Court for the Eastern District of Texas, Tyler Division, on Dec. 5, 2012. *Gemalto S.A.* v. *HTC Corporation* Case 6:10-CV-561-LED relating to claims in U.S. Patent 6,308,317, 7,117,485, and 7,818,727.
Exhibit B—Curriculum Vitae of Jens Palsberg, Ph.D.: List of Materials Considered, filed with the US District Court for the Eastern District of Texas, Tyler Division, on Dec. 6, 2012. *Gemalto S.A.* v. *HTC Corporation* Case 6:10-CV-561-LED relating to claims in U.S. Patent 6,308,317, 7,117,485, and 7,818,727.
Exhibit C—filed with the US District Court for the Eastern District of Texas, Tyler Division, on Dec. 5, 2012. *Gemalto S.A.* v. *HTC Corporation* Case 6:10-CV-561-LED relating to claims in U.S. Patent 6,308,317, 7,117,485, and 7,818,727.
Supplimental Expert Report of Dr. Jens Palsberg, Ph.D. filed with the US District Court for the Eastern District of Texas, Tyler Division, on Dec. 7, 2012. *Gemalto S.A.* v. *HTC Corporation* Case 6:10-CV-561-LED relating to claims in U.S. Patent 6,308,317, 7,117,485, and 7,818,727.
Chart C-1 filed with the US District Court for the Eastern District of Texas, Tyler Division, on Dec. 5, 2012. *Gemalto S.A.* v. *HTC Corporation* Case 6:10-CV-561-LED relating to claims in U.S. Patent 6,308,317, 7,117,485, and 7,818,727.
Chart C-2 filed with the US District Court for the Eastern District of Texas, Tyler Division, on Dec. 5, 2012. *Gemalto S.A.* v. *HTC Corporation* Case 6:10-CV-561-LED relating to claims in U.S. Patent 6,308,317, 7,117,485, and 7,818,727.
Chart C-3 filed with the US District Court for the Eastern District of Texas, Tyler Division, on Dec. 5, 2012. *Gemalto S.A.* v. *HTC Corporation* Case 6:10-CV-561-LED relating to claims in U.S. Patent 6,308,317, 7,117,485, and 7,818,727.
Chart C-4 filed with the US District Court for the Eastern District of Texas, Tyler Division, on Dec. 5, 2012. *Gemalto S.A.* v. *HTC Corporation* Case 6:10-CV-561-LED relating to claims in U.S. Patent 6,308,317, 7,117,485, and 7,818,727.
Chart C-5 filed with the US District Court for the Eastern District of Texas, Tyler Division, on Dec. 5, 2012. *Gemalto S.A.* v. *HTC Corporation* Case 6:10-CV-561-LED relating to claims in U.S. Patent 6,308,317, 7,117,485, and 7,818,727.
Chart C-6 filed with the US District Court for the Eastern District of Texas, Tyler Division, on Dec. 5, 2012. *Gemalto S.A* v. *HTC Corporation* Case 6:10-CV-561-LED relating to claims in U.S. Patent 6,308,317, 7,117,485, and 7,818,727.

* cited by examiner

COMPUTER PROGRAM PRODUCT CONTAINING INSTRUCTIONS FOR PROVIDING A PROCESSOR THE CAPABILITY OF EXECUTING AN APPLICATION DERIVED FROM A COMPILED FORM

CROSS REFERENCE TO RELATED APPLICATIONS

This application is a continuation application, under 35 U.S.C. §120, of application Ser. No. 11/537,156, filed Sep. 29, 2006, now U.S. Pat. No. 7,818,727, which is a continuation application of application Ser. No. 10/037,390, filed Oct. 23, 2001, now U.S. Pat. No. 7,117,485, which is a continuation of application Ser. No. 08/957,512, filed Oct. 24, 1997, now U.S. Pat. No. 6,308,317, and which, under 35 U.S.C. §119(e), claims benefit of prior U.S. provisional application Ser. No. 60/029,057, filed Oct. 25, 1996. The entire disclosures of these prior applications are incorporated herein in their entireties by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates in general to the field of programming, and more particularly to using a high level programming language with a smart card or a microcontroller.

Software applications written in the Java high-level programming language have been so designed that an application written in Java can be run on many different computer brands or computer platforms without change. This is accomplished by the following procedure. When a Java application is written, it is compiled into "Class" files containing byte codes that are instructions for a hypothetical computer called a Java Virtual Machine. An implementation of this virtual machine is written for each platform that is supported. When a user wishes to run a particular Java application on a selected platform, the class files compiled from the desired application is loaded onto the selected platform. The Java virtual machine for the selected platform is run, and interprets the byte codes in the class file, thus effectively running the Java application.

Java is described in the following references which are hereby incorporated by reference: (1) Arnold, Ken, and James Gosling, "The Java Programming Language," Addison-Wesley, 1996; (2) James Gosling, Bill Joy, and Guy Steele, "The Java Language Specification," Sun Microsystems, 1996, (web site: http://java.sun.com/doc/language_specification); (3) James Gosling and Henry McGilton, "The Java Language Environment: A White Paper," Sun Microsystems, 1995 (web site: http://java.sun.com/doc/language_environment/); and (4) Tim Lindholm and Frank Yellin, "The Java Virtual Machine Specification," Addison-Wesley, 1997. These texts among many others describe how to program using Java.

In order for a Java application to run on a specific platform, a Java virtual machine implementation must be written that will run within the constraints of the platform, and a mechanism must be provided for loading the desired Java application on the platform, again keeping within the constraints of this platform.

Conventional platforms that support Java are typically microprocessor-based computers, with access to relatively large amounts of memory and hard disk storage space. Such microprocessor implementations frequently are used in desktop and personal computers. However, there are no conventional Java implementations on microcontrollers, as would typically be used in a smart card.

Microcontrollers differ from microprocessors in many ways. For example, a microprocessor typically has a central processing unit that requires certain external components (e.g., memory, input controls and output controls) to function properly. A typical microprocessor can access from a megabyte to a gigabyte of memory, and is capable of processing 16, 32, or 64 bits of information or more with a single instruction. In contrast to the microprocessor, a microcontroller includes a central processing unit, memory and other functional elements, all on a single semiconductor substrate, or integrated circuit (e.g., a "chip"). As compared to the relatively large external memory accessed by the microprocessor, the typical microcontroller accesses a much smaller memory. A typical microcontroller can access one to sixty-four kilobytes of built-in memory, with sixteen kilobytes being very common.

There are generally three different types of memory used: random access memory (RAM), read only memory (ROM), and electrically erasable programmable read only memory (EEPROM). In a microcontroller, the amount of each kind of memory available is constrained by the amount of space on the integrated circuit used for each kind of memory. Typically, RAM takes the most space, and is in shortest supply. ROM takes the least space, and is abundant. EEPROM is more abundant than RAM, but less than ROM.

Each kind of memory is suitable for different purposes. Although ROM is the least expensive, it is suitable only for data that is unchanging, such as operating system code. EEPROM is useful for storing data that must be retained when power is removed, but is extremely slow to write. RAM can be written and read at high speed, but is expensive and data in RAM is lost when power is removed. A microprocessor system typically has relatively little ROM and EEPROM, and has 1 to 128 megabytes of RAM, since it is not constrained by what will fit on a single integrated circuit device, and often has access to an external disk memory system that serves as a large writable, non-volatile storage area at a lower cost than EEPROM. However, a microcontroller typically has a small RAM of 0.1 to 2.0 K, 2K to 8K of EEPROM, and 8K-56K of ROM.

Due to the small number of external components required and their small size, microcontrollers frequently are used in integrated circuit cards, such as smart cards. Such smart cards come in a variety of forms, including contact-based cards, which must be inserted into a reader to be used, and contactless cards, which need not be inserted. In fact, microcontrollers with contactless communication are often embedded into specialized forms, such as watches and rings, effectively integrating the functionality of a smart card in an ergonomically attractive manner.

Because of the constrained environment, applications for smart cards are typically written in a low level programming language (e.g., assembly language) to conserve memory.

The integrated circuit card is a secure, robust, tamper-resistant and portable device for storing data. The integrated circuit card is the most personal of personal computers because of its small size and because of the hardware and software data security features unique to the integrated circuit card.

The primary task of the integrated circuit card and the microcontroller on the card is to protect the data stored on the card. Consequently, since its invention in 1974, integrated circuit card technology has been closely guarded on these same security grounds. The cards were first used by French banks as debit cards. In this application, before a financial transaction based on the card is authorized, the card user must demonstrate knowledge of a 4-digit personal identification number (PIN) stored in the card in addition to being in possession of the card. Any information that might contribute to discovering the PIN number on a lost or stolen card was blocked from public distribution. In fact, since nobody could tell what information might be useful in this regard, virtually all information about integrated circuit cards was withheld.

Due to the concern for security, applications written for integrated circuit cards have unique properties. For example, each application typically is identified with a particular owner or identity. Because applications typically are written in a low-level programming language, such as assembly language, the applications are written for a particular type of microcontroller. Due to the nature of low level programming languages, unauthorized applications may access data on the integrated circuit card. Programs written for an integrated circuit card are identified with a particular identity so that if two identities want to perform the same programming function there must be two copies of some portions of the application on the microcontroller of the integrated circuit card.

Integrated circuit card systems have historically been closed systems. An integrated circuit card contained a dedicated application that was handcrafted to work with a specific terminal application. Security checking when an integrated circuit card was used consisted primarily of making sure that the card application and the terminal application were a matched pair and that the data on the card was valid.

As the popularity of integrated circuit cards grew, it became clear that integrated circuit card users would be averse to carrying a different integrated circuit card for each integrated circuit card application. Therefore, multiple cooperating applications began to be provided on single provider integrated circuit cards. Thus, for example, an automated teller machine (ATM) access card and a debit card may coexist on a single integrated circuit card platform. Nevertheless, this was still a closed system since all the applications in the terminal and the card were built by one provider having explicit knowledge of the other providers.

The paucity of information about integrated circuit cards—particularly information about how to communicate with them and how to program them—has impeded the general application of the integrated circuit card. However, the advent of public digital networking (e.g., the Internet and the World Wide Web) has opened new domains of application for integrated circuit cards. In particular, this has lead to a need to load new applications on the card that do not have explicit knowledge of the other providers, but without the possibility of compromising the security of the card. However, typically, this is not practical with conventional cards that are programmed using low level languages.

SUMMARY OF THE INVENTION

In general, in one aspect, the invention features an integrated circuit card for use with a terminal. The integrated circuit card includes a memory that stores an interpreter and an application that has a high level programming language format. A processor of the card is configured to use the interpreter to interpret the application for execution and to use a communicator of the card to communicate with the terminal.

Among the advantages of the invention are one or more of the following. New applications may be downloaded to a smart card without compromising the security of the smart card. These applications may be provided by different companies loaded at different times using different terminals. Security is not compromised since the applications are protected against unauthorized access of any application code or data by the security features provided by the Java virtual machine. Smart card applications can be created in high level languages such as Java and Eiffel, using powerful mainstream program development tools. New applications can be quickly prototyped and downloaded to a smart card in a matter of hours without resorting to soft masks. Embedded systems using microcontrollers can also gain many of these advantages for downloading new applications, high level program development, and rapid prototyping by making use of this invention.

Implementations of the invention may include one or more of the following. The high level programming language format of the application may have a class file format and may have a Java programming language format. The processor may be a microcontroller. At least a portion of the memory may be located in the processor.

The application may have been processed from a second application that has a string of characters, and the string of characters may be represented in the first application by an identifier (e.g., an integer).

The processor may be also configured to receive a request from a requester (e.g., a processor or a terminal) to access an element (e.g., an application stored in the memory, data stored in the memory or the communicator) of the card, after receipt of the request, interact with the requester to authenticate an identity of the requester, and based on the identity, selectively grant access to the element.

The memory may also store an access control list for the element. The access control list furnishes an indication of types of access to be granted to the identity, and based on the access control list, the processor selectively grants specific types of access (e.g., reading data, writing data, appending data, creating data, deleting data or executing an application) to the requester.

The application may be one of a several applications stored in the memory. The processor may be further configured to receive a request from a requester to access one of the plurality of applications; after receipt of the request, determine whether said one of the plurality of applications complies with a predetermined set of rules; and based on the determination, selectively grant access to the requester to said one of the plurality of applications. The predetermined rules provide a guide for determining whether said one of the plurality of applications accesses a predetermined region of the memory. The processor may be further configured to authenticate an identity of the requester and grant access to said one of the plurality of applications based on the identity.

The processor may be also configured to interact with the terminal via the communicator to authenticate an identity; determine if the identity has been authenticated; and based on the determination, selectively allow communication between the terminal and the integrated circuit card.

The communicator and the terminal may communicate via communication channels. The processor may also be configured to assign one of the communication channels to the identity when the processor allows the communication between the terminal and the integrated circuit card. The processor may also be configured to assign a session key to the assigned communication channel and use the session key when the processor and the terminal communicate via the assigned communication channel.

The terminal may have a card reader, and the communicator may include a contact for communicating with the card reader. The terminal may have a wireless communication device, and the communicator may include a wireless transceiver for communicating with the wireless communication device. The terminal may have a wireless communication device, and the communicator may include a wireless transmitter for communicating with the wireless communication device.

In general, in another aspect, the invention features a method for use with an integrated circuit card and a terminal. The method includes storing an interpreter and at least one application having a high level programming language format in a memory of the integrated circuit card. A processor of the integrated circuit card uses the interpreter to interpret the at least one application for execution, and the processor uses a communicator of the card when communicating between the processor and the terminal.

In general, in another aspect, the invention features a smart card. The smart card includes a memory that stores a Java interpreter and a processor that is configured to use the interpreter to interpret a Java application for execution.

In general, in another aspect, the invention features a microcontroller that has a semiconductor substrate and a memory located in the substrate. A programming language interpreter is stored in the memory and is configured to implement security checks. A central processing unit is located in the substrate and is coupled to the memory.

Implementations of the invention may include one or more of the following. The interpreter may be a Java byte code interpreter. The security checks may include establishing firewalls and may include enforcing a sandbox security model.

In general, in another aspect, the invention features a smart card that has a programming language interpreter stored in a memory of the card. The interpreter is configured to implement security check. A central processing unit of the card is coupled to the memory.

In general, in another aspect, the invention features an integrated circuit card that is used with a terminal. The card includes a communicator and a memory that stores an interpreter and first instructions of a first application. The first instructions have been converted from second instructions of a second application. The integrated circuit card includes a processor that is coupled to the memory and is configured to use the interpreter to execute the first instructions and to communicate with the terminal via the communicator.

Implementations of the invention may include one or more of the following. The first and/or second applications may have class file format(s). The first and/or second applications may include byte codes, such as Java byte codes. The first instructions may be generalized or renumbered versions of the second instructions. The second instructions may include constant references, and the first instructions may include constants that replace the constant references of the second instructions. The second instructions may include references, and the references may shift location during the conversion of the second instructions to the first instructions. The first instructions may be relinked to the references after the shifting. The first instructions may include byte codes for a first type of virtual machine, and the second instructions may include byte codes for a second type of virtual machine. The first type is different from the second type.

In general, in another aspect, the invention features a method for use with an integrated circuit card. The method includes converting second instructions of a second application to first instructions of a first application; storing the first instructions in a memory of the integrated circuit card; and using an interpreter of the integrated circuit card to execute the first instructions.

In general, in another aspect, the invention features an integrated circuit for use with a terminal. The integrated circuit card has a communicator that is configured to communicate with the terminal and a memory that stores a first application that has been processed from a second application having a string of characters. The string of characters are represented in the first application by an identifier. The integrated circuit card includes a processor that is coupled to the memory. The processor is configured to use the interpreter to interpret the first application for execution and to use the communicator to communicate with the terminal.

In general, in another aspect, the invention features a method for use with an integrated circuit card and a terminal. The method includes processing a second application to create a first application. The second application has a string of characters. The string of characters is represented by an identifier in the second application. An interpreter and the first application are stored in a memory of the integrated circuit card. A processor uses an interpreter to interpret the first application for execution.

In general, in another aspect, the invention features a microcontroller that includes a memory which stores an application and an interpreter. The application has a class file format. A processor of the microcontroller is coupled to the memory and is configured to use the interpreter to interpret the application for execution.

In implementations of the invention, the microcontroller may also include a communicator that is configured to communicate with a terminal.

In general, in another aspect, the invention features a method for use with an integrated circuit card. The method includes storing a first application in a memory of the integrated circuit card, storing a second application in the memory of the integrated circuit card, and creating a firewall that isolates the first and second applications so that the second application cannot access either the first application or data associated with the first application.

In general, in another aspect, the invention features an integrated circuit card for use with a terminal. The integrated circuit card includes a communicator that is configured to communicate with the terminal, a memory and a processor. The memory stores applications, and each application has a high level programming language format. The memory also stores an interpreter. The processor is coupled to the memory and is configured to: a.) use the interpreter to interpret the applications for execution, b.) use the interpreter to create a firewall to isolate the applications from each other, and c.) use the communicator to communicate with the terminal.

Other advantages and features will become apparent from the following description and from the claims.

BRIEF DESCRIPTION OF THE DRAWING

FIG. 1 is a block diagram of an integrated card system.

FIG. 2 is a flow diagram illustrating the preparation of Java applications to be downloaded to an integrated circuit card.

FIG. 3 is a block diagram of the files used and generated by the card class file converter.

FIG. 4 is a block diagram illustrating the transformation of application class file(s) into a card class file.

FIG. 5 is a flow diagram illustrating the working of the class file converter.

FIG. 6 is a flow diagram illustrating the modification of the byte codes.

FIG. 7 is a block diagram illustrating the transformation of specific byte codes into general byte codes.

FIG. 8 is a block diagram illustrating the replacement of constant references with constants.

FIG. 9 is a block diagram illustrating the replacement of references with their updated values.

FIG. 10 is a block diagram illustrating renumbering of original byte codes.

FIG. 11 is a block diagram illustrating translation of original byte codes for a different virtual machine architecture.

FIG. 12 is a block diagram illustrating loading applications into an integrated circuit card.

FIG. 13 is a block diagram illustrating executing applications in an integrated circuit card.

FIG. 14 is a schematic diagram illustrating memory organization for ROM, RAM and EEPROM.

FIG. 15 is a flow diagram illustrating the overall architecture of the Card Java virtual machine.

Figure 16:
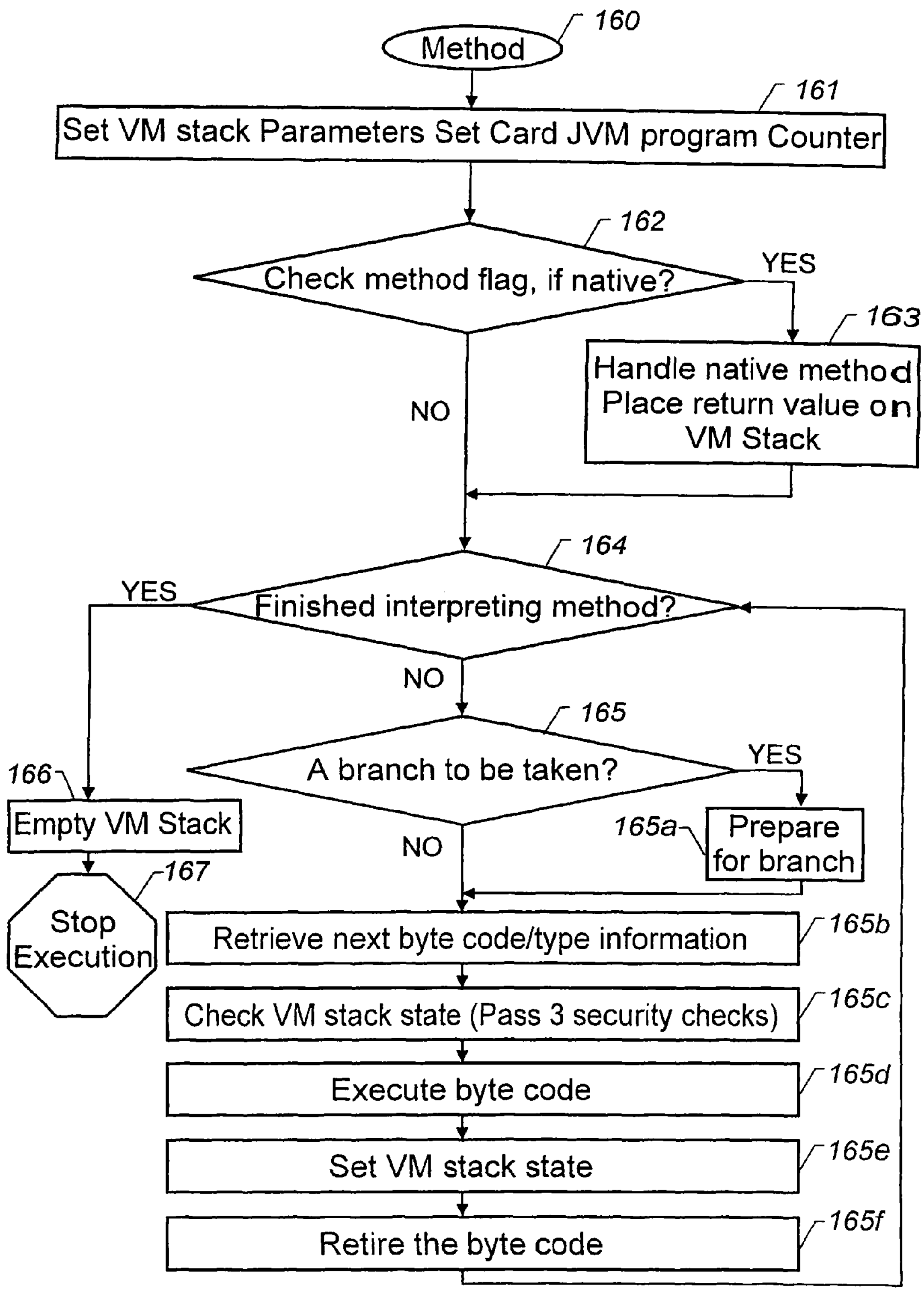
FIG. 16 is a flow diagram illustrating method execution in the Card Java virtual machine with the security checks.

FIG. 16 is a flow diagram illustrating method execution in the Card Java virtual machine with the security checks.

FIG. 17 is a flow diagram illustrating byte code execution in the Card Java virtual machine.

FIG. 18 is a flow diagram illustrating method execution in the Card Java virtual machine without the security checks.

FIG. 19 is a block diagram illustrating the association between card applications and identities.

FIG. 20 is a block diagram illustrating the access rights of a specific running application.

FIG. 21 is a perspective view of a microcontroller on a smart card.

FIG. 22 is a perspective view of a microcontroller on a telephone.

FIG. 23 is a perspective view of a microcontroller on a key ring.

FIG. 24 is a perspective view of a microcontroller on a ring.

FIG. 25 is a perspective view of a microcontroller on a circuit card of an automobile.

DETAILED DESCRIPTION OF THE PREFERRED EMBODIMENTS

Referring to FIG. 1, an integrated circuit card 10 (e.g., a smart card) is constructed to provide a high level, Java-based, multiple application programming and execution environment. The integrated circuit card 10 has a communicator **12*a* that is configured to communicate with a terminal communicator 12*b* of a terminal 14. In some embodiments, the integrated circuit card 10 is a smart card with an 8 bit microcontroller, 512 bytes of RAM, 4K bytes of EEPROM, and 20K of ROM; the terminal communicator 12*b* is a conventional contact smart card reader; and the terminal 14** is a conventional personal computer running the Windows NT operating system supporting the personal computer smart card (PC/SC) standard and providing Java development support.

In some embodiments, the microcontroller, memory and communicator are embedded in a plastic card that has substantially the same dimensions as a typical credit card. In other embodiments, the microcontroller, memory and communicator are mounted within bases other than a plastic card, such as jewelry (e.g., watches, rings or bracelets), automotive equipment, telecommunication equipment (e.g., subscriber identity module (SIM) cards), security devices (e.g., cryptographic modules) and appliances.

The terminal 14 prepares and downloads Java applications to the integrated circuit card 10 using the terminal communicator **12*b*. The terminal communicator 12*b* is a communications device capable of establishing a communications channel between the integrated circuit card 10 and the terminal 14**. Some communication options include contact card readers, wireless communications via radio frequency or infrared techniques, serial communication protocols, packet communication protocols, ISO 7816 communication protocol, to name a few.

The terminal 14 can also interact with applications running in the integrated circuit card 10. In some cases, different terminals may be used for these purposes. For example, one kind of terminal may be used to prepare applications, different terminals could be used to download the applications, and yet other terminals could be used to run the various applications. Terminals can be automated teller machines (ATMs), point-of-sale terminals, door security systems, toll payment systems, access control systems, or any other system that communicates with an integrated circuit card or microcontroller.

The integrated circuit card 10 contains a card Java virtual machine (Card JVM) 16, which is used to interpret applications which are contained on the card 10.

Referring to FIG. 2, the Java application 20 includes three Java source code files A.java **20*a*, B.java 20*b*, and C.java 20*c*. These source code files are prepared and compiled in a Java application development environment 22. When the Java application 20 is compiled by the development environment 22, application class files 24 are produced, with these class files A.class 24*a*, B.class 24*b*, and C.class 24*c* corresponding to their respective class Java source code 20*a*, 20*b*, and 20*c*. The application class files 24 follow the standard class file format as documented in chapter 4 of the Java virtual machine specification by Tim Lindholm and Frank Yellin, "The Java Virtual Machine Specification," Addison-Wesley, 1996. These application class files 24 are fed into the card class file converter 26, which consolidates and compresses the files, producing a single card class file 27. The card class file 27 is loaded to the integrated circuit card 10 using a conventional card loader 28**.

Referring to FIG. 3, the card class file converter 26 is a class file postprocessor that processes a set of class files 24 that are encoded in the standard Java class file format, optionally using a string to ID input map file 30 to produce a Java card class file 27 in a card class file format. One such card class file format is described in Appendix A which is hereby incorporated by reference. In addition, in some embodiments, the card class file converter 26 produces a string to ID output map file 32 that is used as input for a subsequent execution of the card class file converter.

In some embodiments, in order for the string to ID mapping to be consistent with a previously generated card class file (in the case where multiple class files reference the same strings), the card class file converter 26 can accept previously defined string to ID mappings from a string to ID input map file 30. In the absence of such a file, the IDs are generated by the card class file converter 26. Appendix B, which is hereby incorporated by reference, describes one possible way of implementing and producing the string to ID input map file 30 and string to ID output map file 32 and illustrates this mapping via an example.

Referring to FIG. 4, a typical application class file **24*a* includes class file information 41; a class constant pool 42; class, fields created, interfaces referenced, and method information 43; and various attribute information 44, as detailed in aforementioned Java Virtual Machine Specification. Note that much of the attribute information 44 is not needed for this embodiment and is eliminated 45 by the card class file converter 26**. Eliminated attributes include SourceFile, ConstantValue, Exceptions, LineNumberTable, LocalVariable- Table, and any optional vendor attributes. The typical card class file 27 as described in Appendix A is derived from the application class files 24 in the following manner. The card class file information 46 is derived from the aggregate class file information 41 of all application class files 24a, 24b, and 24c. The card class file constant pool 47 is derived from the aggregate class constant pool 42 of all application class files 24a, 24b, and 24c. The card class, fields created, interfaces referenced, and method information 48 is derived from the aggregate class, fields created, interfaces referenced, and method information 43 of all application class files 24a, 24b, and 24c. The card attribute information 49 in this embodiment is derived from only the code attribute of the aggregate attribute information 44 of all application class files 24a, 24b, and 24c.

To avoid dynamic linking in the card, all the information that is distributed across several Java class files 24a, 24b, and 24c that form the application 24, are coalesced into one card class file 27 by the process shown in the flowchart in FIG. 5. The first class file to be processed is selected 51a. The constant pool 42 is compacted 51b in the following manner. All objects, classes, fields, methods referenced in a Java class file 24a are identified by using strings in the constant pool 42 of the class file 24a. The card class file converter 26 compacts the constant pool 42 found in the Java class file 24a into an optimized version. This compaction is achieved by mapping all the strings found in the class file constant pool 42 into integers (the size of which is microcontroller architecture dependent). These integers are also referred to as IDs. Each ID uniquely identifies a particular object, class, field or method in the application 20. Therefore, the card class file converter 26 replaces the strings in the Java class file constant pool 42 with its corresponding unique ID. Appendix B shows an example application HelloSmartCard.java, with a table below illustrating the IDs corresponding to the strings found in the constant pool of the class file for this application. The IDs used for this example are 16-bit unsigned integers.

Next, the card class file converter 26 checks for unsupported features 51c in the Code attribute of the input Java class file 24a. The Card JVM 16 only supports a subset of the full Java byte codes as described in Appendix C, which is hereby incorporated by reference. Hence, the card class file converter 26 checks for unsupported byte codes in the Code attribute of the Java class file 24a. If any unsupported byte codes are found 52, the card class file converter flags an error and stops conversion 53. The program code fragment marked "A" in APPENDIX D shows how these spurious byte codes are apprehended. Another level of checking can be performed by requiring the standard Java development environment 22 to compile the application 20 with a '-g' flag. Based on the aforementioned Java virtual machine specification, this option requires the Java compiler to place information about the variables used in a Java application 20 in the LocalVariableTable attribute of the class file 24a. The card class file converter 26 uses this information to check if the Java class file 24a references data types not supported by the Java card.

Next, the card class file converter 26 discards all the unnecessary parts 51c of the Java class file 24a not required for interpretation. A Java class file 24a stores information pertaining to the byte codes in the class file in the Attributes section 44 of the Java class file. Attributes that are not required for interpretation by the card JVM 16, such as SourceFile, ConstantValue, Exceptions, LineNumberTable, and LocalvariableTable may be safely discarded 45. The only attribute that is retained is the Code attribute. The Code attribute contains the byte codes that correspond to the methods in the Java class file 24a.

Modifying the byte codes 54 involves examining the Code attribute information 44 for each method in the class file, and modifying the operands of byte codes that refer to entries in the Java class file constant pool 42 to reflect the entries in the card class file constant pool 47. In some embodiments, the byte codes are also modified, as described below.

Modifying the byte codes 54 involves five passes (with two optional passes) as described by the flowchart in FIG. 6. The original byte codes 60 are found in the Code attribute 44 of the Java class file 24a being processed. The first pass 61 records all the jumps and their destinations in the original byte codes. During later byte code translation, some single byte code may be translated to dual or triple bytes. FIG. 7 illustrates an example wherein byte code ILOAD_0 is replaced with two bytes, byte code ILOAD and argument 0. When this is done, the code size changes, requiring adjustment of any jump destinations which are affected. Therefore, before these transformations are made, the original byte codes 60 are analyzed for any jump byte codes and a note made of their position and current destination. The program code fragment marked "B" in Appendix D shows how these jumps are recorded. Appendix D is hereby incorporated by reference.

Once the jumps are recorded, if the optional byte code translation is not being performed 62, the card class file converter 26 may proceed to the third pass 64.

Otherwise, the card class file converter converts specific byte codes into generic byte codes. Typically, the translated byte codes are not interpreted in the Card JVM 16 but are supported by converting the byte codes into equivalent byte codes that can be interpreted by the Card JVM 16 (see FIG. 7). The byte codes 70 may be replaced with another semantically equivalent but different byte codes 72. This generally entails the translation of short single specific byte codes such as ILOAD_0 into their more general versions. For example, ILOAD_0 may be replaced by byte code ILOAD with an argument 0. This translation is done to reduce the number of byte codes translated by the Card JVM 16, consequently reducing the complexity and code space requirements for the Card JVM 16. The program code fragment marked "C" in Appendix D shows how these translations are made. Note that such translations increase the size of the resulting byte code and force the re-computation of any jumps which are affected.

In the third pass 64, the card class file converter rebuilds constant references via elimination of the strings used to denote these constants. FIG. 8 shows an example wherein the byte code LDC 80 referring to constant "18" found via an index in the Java class file 24a constant pool 42 may be translated into BIPUSH byte code 82. In this pass the card class file converter 26 modifies the operands to all the byte codes that refer to entries in the Java class file constant pool 42 to reflect their new location in the card class file constant pool 47. FIG. 9 shows an example wherein the argument to a byte code, INVOKESTATIC 90, refers to an entry in the Java class file constant pool 42 that is modified to reflect the new location of that entry in the card class file constant pool 47. The modified operand 94 shows this transformation. The program code fragment marked "D" in Appendix D shows how these modifications are made.

Once the constant references are relinked, if the optional byte code modification is not being performed, the card class file converter may proceed to the fifth and final pass 67.

Otherwise, the card class file converter modifies the original byte codes into a different set of byte codes supported by the particular Card JVM 16 being used. One potential modification renumbers the original byte codes 60 into Card JVM 16 byte codes (see FIG. 10). This renumbering causes the byte codes 100 in the original byte codes 60 to be modified into a renumbered byte codes 102. Byte code ILOAD recognized by value 21 may be renumbered to be recognized by value 50. This modification may be done for optimizing the type tests (also known in prior art as Pass 3 checks) in the Card JVM 16. The program code fragment marked "E" in Appendix D shows an implementation of this embodiment. This modification may be done in order to reduce the program space required by the Card JVM 16 to interpret the byte code. Essentially this modification regroups the byte codes into Card JVM 16 byte codes so that byte codes with similar operands, results are grouped together, and there are no gaps between Card JVM 16 byte codes. This allows the Card JVM 16 to efficiently check Card JVM 16 byte codes and validate types as it executes.

In some embodiments, the card class file converter modifies the original byte codes 60 into a different set of byte codes designed for a different virtual machine architecture, as shown in FIG. 11. The Java byte code ILOAD 112 intended for use on a word stack 114 may be replaced by Card JVM 16 byte code ILOAD_B 116 to be used on a byte stack 118. An element in a word stack 114 requires allocating 4 bytes of stack space, whereas an element in the byte stack 118 requires only one byte of stack space. Although this option may provide an increase in execution speed, it risks losing the security features available in the original byte codes.

Since the previous steps 63, 64 or 66 may have changed the size of the byte codes 60 the card class file converter 26 has to relink 67 any jumps which have been effected.

Since the jumps were recorded in the first step 61 of the card class file converter 26, this adjustment is carried out by fixing the jump destinations to their appropriate values. The program code fragment marked "F" in Appendix D shows how these jumps are fixed.

The card class file converter now has modified byte codes 68 that is equivalent to the original byte codes 60 ready for loading. The translation from the Java class file 24a to the card class file 27 is now complete.

Referring back to FIG. 5, if more class files 24 remain to be processed 55 the previous steps 51a, 51b, 51c, 52 and 54 are repeated for each remaining class file. The card class file converter 26 gathers 56 the maps and modified byte codes for the classes 24 that have been processed, places them as an aggregate and generates 57 a card class file 27. If required, the card class file converter 26 generates a string to ID output map file 32, that contains a list of all the new IDs allocated for the strings encountered in the constant pool 42 of the Java class files 24 during the translation.

Referring to FIG. 12, the card loader 28 within the terminal 14 sends a card class file to the loading and execution control 120 within the integrated circuit card 10 using standard ISO 7816 commands. The loading and execution control 120 with a card operating system 122, which provides the necessary system resources, including support for a card file system 124, which can be used to store several card applications 126. Many conventional card loaders are written in low level languages, supported by the card operating system 122. In the preferred embodiment, the bootstrap loader is written in Java, and the integrated circuit card 10 includes a Java virtual machine to run this application. A Java implementation of the loading and execution control 120 is illustrated in Appendix E which is hereby incorporated by reference. The loading and execution control 120 receives the card class file 26 and produces a Java card application 126x stored in the card file system 126 in the EEPROM of the integrated circuit card 10. Multiple Java card applications 126x, 126y, and 126z can be stored in a single card in this manner. The loading and execution control 120 supports commands whereby the terminal 14 can select which Java card application to run immediately, or upon the next card reset.

Referring to FIG. 13, upon receiving a reset or an execution command from the loading and execution control 120, the Card Java Virtual Machine (Card JVM) 16 begins execution at a predetermined method (for example, main) of the selected class in the selected Java Card application 126z. The Card JVM 16 provides the Java card application 126z access to the underlying card operating system 122, which provides capabilities such as I/O, EEPROM support, file systems, access control, and other system functions using native Java methods as illustrated in Appendix F which is hereby incorporated by reference.

The selected Java card application 126z communicates with an appropriate application in the terminal 14 using the communicator 12a to establish a communication channel to the terminal 14. Data from the communicator 12a to the terminal 14 passes through a communicator driver 132 in the terminal, which is specifically written to handle the communications protocol used by the communicator 12a. The data then passes to an integrated circuit card driver 134, which is specifically written to address the capabilities of the particular integrated circuit card 10 being used, and provides high level software services to the terminal application 136. In the preferred embodiment, this driver would be appropriate PC/SC Smartcard Service Provider (SSP) software. The data then passes to the terminal application 136, which must handle the capabilities provided by the particular card application 126z being run. In this manner, commands and responses pass back and forth between the terminal application 136 and the selected card application 126z. The terminal application interacts with the user, receiving commands from the user, some of which are passed to the selected Java card application 126z, and receiving responses from the Java card application 126z, which are processed and passed back to the user.

Referring to FIG. 14, the Card JVM 16 is an interpreter that interprets a card application 126x. The memory resources in the microcontroller that impact the Card JVM 16 are the Card ROM 140, Card RAM 141 and the Card EEPROM 142. The Card ROM 140 is used to store the Card JVM 16 and the card operating system 122. Card ROM 140 may also be used to store fixed card applications 140a and class libraries 140b. Loadable applications 141a, 141b and libraries 141c may also be stored in Card RAM 141. The Card JVM 16 interprets a card application 141a, 141b, or 140a. The Card JVM 16 uses the Card RAM to store the VM stack 144a and system state variables 144b. The Card JVM 16 keeps track of the operations performed via the VM stack 144a. The objects created by the Card JVM 16 are either on the RAM heap 144c, in the EEPROM heap 146a, or in the file system 147.

All of the heap manipulated by the Card JVM 16 may be stored in the Card RAM 141 as a RAM Heap 144c, or it may be distributed across to the Card EEPROM 142 as a EEPROM Heap 146a. Card RAM 141 is also used for recording the state of the system stack 148 that is used by routines written in the native code of the microcontroller. The Card JVM 16 uses the Card EEPROM 142 to store application data either in the EEPROM heap 146a or in the file system 147. Application data stored in a file may be manipulated via an interface to the card operating system 122. This interface is provided by a class library 140b stored in Card ROM 140, by a loadable class library 141c stored in Card EEPROM 142. One such interface is described in Appendix F. Applications and data in the card are isolated by a firewall mechanism 149.

To cope with the limited resources available on microcontrollers, the Card JVM 16 implements a strict subset of the Java programming language. Consequently, a Java application 20 compiles into a class file that contains a strict subset of Java byte codes. This enables application programmers to program in this strict subset of Java and still maintain compatibility with existing Java Virtual Machines. The semantics of the Java byte codes interpreted by the Card JVM 16 are described in the aforementioned Java Virtual Machine Specification. The subset of byte codes interpreted by the Card JVM 16 can be found in Appendix C. The card class file converter 26 checks the Java application 20 to ensure use of only the features available in this subset and converts into a form that is understood and interpreted by the Card JVM 16.

In other embodiments, the Card JVM 16 is designed to interpret a different set or augmented set of byte codes 116. Although a different byte code set might lead to some performance improvements, departing from a strict Java subset may not be desirable from the point of view of security that is present in the original Java byte codes or compatibility with mainstream Java development tools.

All Card JVM 16 applications 126 have a defined entry point denoted by a class and a method in the class. This entry point is mapped in the string to ID input map 30 and assigned by the card class file converter 26. Classes, methods and fields within a Java application 20 are assigned IDs by the card class file converter 26. For example, the ID corresponding to the main application class may be defined as F001 and the ID corresponding to its main method, such as "main( )V" could be defined as F002.

The overall execution architecture of the Card JVM is described by the flowchart in FIG. 15. Execution of the Card JVM 16 begins at the execution control 120, which chooses a card application 126z to execute. It proceeds by finding and assigning an entry point 152 (a method) in this card application for the Card JVM 16 to interpret. The Card JVM 16 interprets the method 153. If the interpretation proceeds successfully 154, the Card JVM 16 reports success 155 returning control back to the execution control 120. If in the course of interpretation 153 the Card JVM 16 encounters an unhandled error or exception (typically a resource limitation or a security violation), the Card JVM 16 stops 156 and reports the appropriate error to the terminal 14.

An essential part of the Card JVM 16 is a subroutine that handles the execution of the byte codes. This subroutine is described by the flowchart in FIG. 16. Given a method 160 it executes the byte codes in this method. The subroutine starts by preparing for the parameters of this method 161. This involves setting the VM stack 144a pointer, VM stack 144a frame limits, and setting the program counter to the first byte code of the method.

Next, the method flags are checked 162. If the method is flagged native, then the method is actually a call to native method code (subroutine written in the microcontroller's native processor code). In this case, the Card JVM 16 prepares for an efficient call 163 and return to the native code subroutine. The parameters to the native method may be passed on the VM stack 144a or via the System stack 148. The appropriate security checks are made and the native method subroutine is called. On return, the result (if any) of the native method subroutine is placed on the VM stack 144a so that it may be accessed by the next byte code to be executed.

The dispatch loop 164 of the Card JVM 16 is then entered. The byte code dispatch loop is responsible for preparing, executing, and retiring each byte code. The loop terminates when it finishes interpreting the byte codes in the method 160, or when the Card JVM 16 encounters a resource limitation or a security violation.

If a previous byte code caused a branch to be taken 165 the Card JVM prepares for the branch 165a. The next byte code is retrieved 165b. In order to keep the cost of processing each byte code down, as many common elements such as the byte code arguments, length, type are extracted and stored.

To provide the security offered by the security model of the programming language, byte codes in the class file must be verified and determined conformant to this model. These checks are typically carried out in prior art by a program referred to as the byte code verifier, which operates in four passes as described in the Java Virtual Machine Specification. To offer the run-time security that is guaranteed by the byte code verifier, the Card JVM 16 must perform the checks that pertain to the Pass 3 and Pass 4 of the verifier. This checking can be bypassed by the Card JVM 16 if it can be guaranteed (which is almost impossible to do) that the byte codes 60 interpreted by the Card JVM 16 are secure. At the minimum, code security can be maintained as long as object references cannot be faked and the VM stack 144a and local variable bounds are observed. This requires checking the state of the VM stack 144a with respect to the byte code being executed.

To enforce the security model of the programming language, a 256-byte table is created as shown in Appendix G which is hereby incorporated by reference. This table is indexed by the byte code number. This table contains the type and length information associated with the indexing byte code. It is encoded with the first 5 bits representing type, and the last 3 bits representing length. The type and length of the byte code is indexed directly from the table by the byte code number. This type and length is then used for checking as shown in Appendix H which is hereby incorporated by reference. In Appendix H, the checking process begins by decoding the length and type from the table in Appendix G which is hereby incorporated by reference. The length is used to increment the program counter. The type is used first for pre-execution checking, to insure that the data types on the VM stack 144a are correct for the byte code that is about to be executed. The 256 bytes of ROM for table storage allows the original Java byte codes to be run in the Card JVM 16 and minimizes the changes required to the Java class file to be loaded in the card. Additional Java byte codes can be easily supported since it is relatively easy to update the appropriate table entries.

In other embodiments, as shown in FIG. 10, the Java byte codes in the method are renumbered in such a manner that the byte code type and length information stored in the table in Appendix H is implicit in the reordering. Appendix H is hereby incorporated by reference. Consequently, the checks that must be performed on the state of the VM stack 144a and the byte code being processed does not have to involve a table look up. The checks can be performed by set of simple comparisons as shown in Appendix I which is hereby incorporated by reference. This embodiment is preferable when ROM space is at a premium, since it eliminates a 256-byte table. However adding new byte codes to the set of supported byte codes has to be carefully thought out since the new byte codes have to fit in the implicit numbering scheme of the supported byte codes.

In another embodiment, the Card JVM 16 chooses not to perform any security checks in favor of Card JVM 16 execution speed. This is illustrated in the flowchart in FIG. 18. The flow chart in FIG. 18 is the same as that of FIG. 16 with the security checks removed. This option is not desirable from the point of view of security, unless it can be guaranteed that the byte codes are secure.

The Card JVM 16 may enforce other security checks as well. If the byte code may reference a local variable, the Card JVM 16 checks if this reference is valid, throwing an error if it is not. If the reference is valid, the Card JVM 16 stores the type of the local variable for future checking. The VM stack 144a pointer is checked to see if it is still in a valid range. If not an exception is thrown. The byte code number is checked. If it is not supported, an exception is thrown.

Finally, the byte code itself is dispatched 165d. The byte codes translated by the Card JVM 16 are listed in Appendix C. The semantics of the byte codes are described in the aforementioned Java Virtual Machine Specification with regard to the state of the VM stack 144a before and after the dispatch of the byte code. Note also that some byte codes (the byte codes, INVOKESTATIC, INVOKESPECIAL, INVOKENONVIRTUAL and INVOKEVIRTUAL) may cause reentry into the Card JVM 16, requiring processing to begin at the entry of the subroutine 161. FIG. 17 shows the flowchart of the byte code execution routine. The routine is given a byte code 171 to execute. The Card JVM 16 executes 172 the instructions required for the byte code. If in the course of executing the Card JVM 16 encounters a resource limitation 173, it returns an error 156. This error is returned to the terminal 16 by the Card JVM 16. If the byte code executes successfully, it returns a success 175.

After execution, the type of the result is used to set the VM stack 144a state correctly 165e, properly flagging the data types on the VM stack 144a. The byte code information gathered previously 165b from the byte code info table is used to set the state of the VM stack 144a in accordance with the byte code that just executed.

In other embodiments, setting the output state of the VM stack 144a with respect to the byte code executed is simplified if the byte code is renumbered. This is shown in Appendix I which is hereby incorporated by reference.

In yet another embodiment, the Card JVM 16 may bypass setting the output state of the VM stack 144a in favor of Card JVM 16 execution speed. This option is not desirable from the point of view of security, unless it can be guaranteed that the byte codes are secure.

After the byte code has been executed, the byte code is retired 165f. This involves popping arguments off the VM stack 144a. Once byte code processing is completed, the loop 164 is repeated for the next byte code for the method.

Once the dispatch loop 164 terminates, the VM stack 144a is emptied 166. This prevents any object references filtering down to other Card JVM 16 invocations and breaking the Card JVM's 16 security. Termination 167 of the byte code dispatch loop 164 indicates that the Card JVM 16 has completed executing the requested method.

To isolate data and applications in the integrated circuit card 10 from each other, the integrated circuit card 10 relies on the firewall mechanism 149 provided by the Card JVM 16. Because the Card JVM implements the standard pass 3 and pass 4 verifier checks, it detects any attempt by an application to reference the data or code space used by another application, and flag a security error 156. For example, conventional low level applications can cast non-reference data types into references, thereby enabling access to unauthorized memory space, and violating security. With this invention, such an attempt by a card application 126z to use a non-reference data type as a reference will trigger a security violation 156. In conventional Java, this protected application environment is referred to as the sandbox application-interpretation environment.

However, these firewall facilities do not work independently. In fact, the facilities are overlapping and mutually reinforcing with conventional access control lists and encryption mechanisms shown in the following table:

| | Access Control Lists | Virtual Machine | Encryption |
|---|---|---|---|
| Data Protection | access control before operation | access only to own namespace | data to another program encrypted |
| Program Protection | access control before execution | execution only on correct types | data encrypted in program's namespace |
| Communication Protection | access control on channels | channel controls in own namespace | only mutually authenticated parties can communicate |

Taken together, these facilities isolate both data and applications on the integrated circuit card 10 and ensure that each card application 126 can access only the authorized resources of the integrated circuit card 10.

Referring to FIG. 19, card applications 126x, 126y, 126z can be endowed with specific privileges when the card applications 126 execute. These privileges determine, for example, which data files the card applications 126 can access and what operations the card applications 126 can perform on the file system 147. The privileges granted to the card applications 126 are normally set at the time that a particular card application 126z is started by the user, typically from the terminal 14.

The integrated circuit card 10 uses cryptographic identification verification methods to associate an identity 190 (e.g., identities 190a, 190b and 190c) and hence, a set of privileges to the execution of the card application 126. The association of the specific identity 190c to the card application 126z is made when the card application 126z begins execution, thus creating a specific running application 200, as shown in FIG. 20. The identity 190 is a unique legible text string reliably associated with an identity token. The identity token (e.g., a personal identification number (PIN) or a RSA private key) is an encryption key.

Referring to FIG. 20, in order to run a specific card application 126z, the identity 190c of the card application 126z must be authenticated. The identity 190c is authenticated by demonstrating knowledge of the identity token associated with the identity 190c. Therefore, in order to run the card application 126z, an agent (e.g., a card holder or another application wishing to run the application) must show that it possesses or knows the application's identity-defining encryption key.

One way to demonstrate possession of an encryption key is simply to expose the key itself. PIN verification is an example of this form of authentication. Another way to demonstrate the possession of an encryption key without actually exposing the key itself is to show the ability to encrypt or decrypt plain text with the key.

Thus, a specific running application 200 on the integrated circuit card 10 includes a card application 126z plus an authenticated identity 190c. No card application 126 can be run without both of these elements being in place. The card application 126z defines data processing operations to be performed, and the authenticated identity 190c determines on what computational objects those operations may be performed. For example, a specific application 126z can only access identity C's files 202 in the file system 147 associated with the specific identity 190c, and the specific card application 126z cannot access other files 204 that are associated with identities other than the specific identity 190c.

The integrated circuit card 10 may take additional steps to ensure application and data isolation. The integrated circuit card 10 furnishes three software features sets: authenticated-identity access control lists; a Java-based virtual machine; and one-time session encryption keys to protect data files, application execution, and communication channels, respectively. Collectively, for one embodiment, these features sets provide the application data firewalls 149 for one embodiment. The following discusses each software feature set and then shows how the three sets work together to insure application and data isolation on the integrated circuit card 10.

An access control list (ACL) is associated with every computational object (e.g., a data file or a communication channel) on the integrated circuit card 10 that is be protected, i.e., to which access is to be controlled. An entry on an ACL (for a particular computational object) is in a data format referred to as an e-tuple:

type:identity:permissions

The type field indicates the type of the following identity (in the identity field), e.g., a user (e.g., "John Smith"), or a group. The permissions field indicates a list of operations (e.g., read, append and update) that can be performed by the identity on the computational object.

As an example, for a data file that has the ACL entry:

USER:AcmeAirlines:RAU, any application whose identity is "AcmeAirlines" can read ("R"), append ("A") and update ("U") the data file. In addition, the ACL may be used selectively to permit the creation and deletion of data files. Furthermore, the ACL may be used selectively to permit execution of an application.

Whenever a computational object is accessed by a running application 200, the access is intercepted by the Card JVM 16 and passed to the card operating system 122, which determines if there is an ACL associated with the object. If there is an associated ACL, then the identity 190c associated with the running application 200 is matched on the ACL. If the identity is not found or if the identity is not permitted for the type of access that is being requested, then the access is denied. Otherwise, the access is allowed to proceed.

Referring to FIG. 13, to prevent the potential problems due to the single data path between the integrated circuit card 10 and the terminal 14, communication channel isolation is accomplished by including in the identity authentication process the exchange of a one-time session key 209 between the a card application 126z and the terminal application 136. The key 209 is then used to encrypt subsequent traffic between the authenticating terminal application 136 and the authenticated card application 126z. Given the one-time session key 209, a rogue terminal application can neither "listen in" on an authenticated communication between the terminal 14 and the integrated circuit card 10, nor can the rogue terminal application "spoof" the card application into performing unauthorized operations on its behalf.

Encryption and decryption of card/terminal traffic can be handled either by the card operating system 122 or by the card application itself 126z. In the former case, the communication with the terminal 14 is being encrypted transparently to the application, and message traffic arrives decrypted in the data space of the application. In the latter case, the card application 126z elects to perform encryption and decryption to provide an extra layer of security since the application could encrypt data as soon as it was created and would decrypt data only when it was about to be used. Otherwise, the data would remain encrypted with the session key 209.

Thus, the application firewall includes three mutually reinforcing software sets. Data files are protected by authenticated-identity access control lists. Application execution spaces are protected by the Card JVM 16. Communication channels are protected with one-time session encryption keys 209.

In other embodiments, the above-described techniques are used with a microcontroller (such as the processor 12) may control devices (e.g., part of an automobile engine) other than an integrated circuit card. In these applications, the microcontroller provides a small platform (i.e., a central processing unit, and a memory, both of which are located on a semiconductor substrate) for storing and executing high level programming languages. Most existing devices and new designs that utilize a microcontroller could use this invention to provide the ability to program the microcontroller using a high level language, and application of this invention to such devices is specifically included.

The term application includes any program, such as Java applications, Java applets, Java aglets, Java servlets, Java commlets, Java components, and other non-Java programs that can result in class files as described below.

Class files may have a source other than Java program files. Several programming languages other than Java also have compilers or assemblers for generating class files from their respective source files. For example, the programming language Eiffel can be used to generate class files using Pirmin Kalberer's "J-Eiffel", an Eiffel compiler with JVM byte code generation (web site: http://www.spin.ch/.about.kalberer/jive/index.htm). An Ada 95 to Java byte code translator is described in the following reference (incorporated herein by reference): Taft, S. Tucker, "Programming the Internet in Ada 95", proceedings of Ada Europe '96, 1996. Jasmin is a Java byte code assembler that can be used to generate class files, as described in the following reference (incorporated herein by reference): Meyer, Jon and Troy Downing, "Java Virtual Machine", O'Reilly, 1997. Regardless of the source of the class files, the above description applies to languages other than Java to generate codes to be interpreted.

FIG. 21 shows an integrated circuit card, or smart card, which includes a microcontroller 210 that is mounted to a plastic card 212. The plastic card 212 has approximately the same form factor as a typical credit card. The communicator 12a can use a contact pad 214 to establish a communication channel, or the communicator 12a can use a wireless communication system.

In other embodiments, a microcontroller 210 is mounted into a mobile or fixed telephone 220, effectively adding smart card capabilities to the telephone, as shown in FIG. 22. In these embodiments, the microcontroller 210 is mounted on a module (such as a Subscriber Identity Module (SIM)), for insertion and removal from the telephone 220.

In other embodiments, a microcontroller 210 is added to a key ring 230 as shown in FIG. 23. This can be used to secure access to an automobile that is equipped to recognize the identity associated with the microcontroller 210 on the key ring 230.

Jewelry such as a watch or ring 240 can also house a microcontroller 210 in an ergonomic manner, as shown in FIG. 24. Such embodiments typically use a wireless communication system for establishing a communication channel, and are a convenient way to implement access control with a minimum of hassle to the user.

FIG. 25 illustrates a microcontroller 210 mounted in an electrical subsystem 252 of an automobile 254. In this embodiment, the microcontroller is used for a variety of purposes, such as to controlling access to the automobile, (e.g. checking identity or sobriety before enabling the ignition system of the automobile), paying tolls via wireless communication, or interfacing with a global positioning system (GPS) to track the location of the automobile, to name a few.

While specific embodiments of the present invention have been described, various modifications and substitutions will become apparent to one skilled in the art by this disclosure. Such modifications and substitutions are within the scope of the present invention, and are intended to be covered by the appended claims.

APPENDIX A

APPENDIX A

Card Class File Format For Preferred Embodiment

Introduction

The card class file is a compressed form of the original class file(s). The card class file contains only the semantic information required to interpret Java programs from the original class files. The indirect references in the original class file are replaced with direct references resulting in a compact representation.
The card class file format is based on the following principles:

1. *Stay close to the standard class file format*: The card class file format should remain as close to the standard class file format as possible. The Java byte codes in the class file remain unaltered. Not altering the byte codes ensures that the structural and static constraints on them remain verifiably intact.
2. *Ease of implementation*: The card class file format should be simple enough to appeal to Java Virtual Machine implementers. It must allow for different yet behaviorally equivalent implementations.
3. *Feasibility*: The card class file format must be compact in order to accommodate smart card technology. It must meet the constraints of today's technology while not losing sight of tomorrow's innovations.

This document is based on Chapter 4, "The class file format", in the book titled "The Java™ Virtual Machine Specification"[1], henceforth referred to as the Red book. Since the document is based on the standard class file format described in the Red book, we only present information that is different. The Red book serves as the final authority for any clarification.
The primary changes from the standard class file format are:

- The constant pool is optimized to contain only 16-bit identifiers and, where possible, indirection is replaced by a direct reference.
- Attributes in the original class file are eliminated or regrouped.

The Java Card class File Format

This section describes the Java Card class file format. Each card class file contains one or many Java types, where a type may be a class or an interface.
A card class file consists of a stream of 8-bit bytes. All 16-bit, 32-bit, and 64-bit quantities are constructed by reading in two, four, and eight consecutive 8-bit bytes, respectively. Multi-byte data items are always stored in big-endian order, where the high bytes come first. In Java, this format is supported by interfaces java.io.DataInput and java.io.DataOutput and classes such as java.io.DataInputStream and java.io.DataOutputStream.
We define and use the same set of data types representing Java class file data: The types u1, u2, and u4 represent an unsigned one-, two-, or four-byte quantity, respectively. In Java, these types may be read by methods such as readUnsignedByte, readUnsignedShort, and readInt of the interface java.io.DataInput.
The card class file format is presented using pseudo-structures written in a C-like structure notation. To avoid confusion with the fields of Java Card Virtual Machine classes and class instances, the contents of the structures describing the card class file format are referred to as items. Unlike the fields of a C structure, successive items are stored in the card class file sequentially, without padding or alignment.
Variable-sized tables, consisting of variable-sized items, are used in several class file structures. Although we will use C-like array syntax to refer to table items, the fact that tables are streams of varying-sized structures means that it is not possible to directly translate a table index into a byte offset into the table. Where we refer to a data structure as an array, it is literally an array.
In order to distinguish between the card class file structure and the standard class file structure, we add capitalization; for example, we rename field_info in the original class file to FieldInfo in the card class file.

Card Class File

A card class file contains a single CardClassFile structure:

```
CardClassFile {
    u1 major_version;
    u1 minor_version;
    u2 name_index;
    u2 const_size;
    u2 max_class;
    CpInfo constant_pool[const_size];
    ClassInfo class[max_class];
}
```

The items in the CardClassFile structure are as follows:

minor_version, major_version

The values of the minor_version and major_version items are the minor and major version numbers of the off-card Java Card Virtual Machine that produced this card class file. An implementation of the Java Card Virtual Machine normally supports card class files having a given major version number and minor version numbers 0 through some particular minor_version.

Only the Java Card Forum may define the meaning of card class file version numbers.

name_index

The value of the name_index item must represent a valid Java class name. The Java class name represented by name_index must be exactly the same Java class name that corresponds to the main application that is to run in the card. A card class file contains several classes or interfaces that constitute the application that runs in the card. Since Java allows each class to contain a main method there must be a way to distinguish the class file containing the main method which corresponds to the card application.

const_size

The value of const_size gives the number of entries in the card class file constant pool. A constant_pool index is considered valid if it is greater than or equal to zero and less than const_size.

max_class

This value refers to the number of classes present in the card class file. Since the name resolution and linking in the Java Card are done by the off-card Java Virtual Machine all the class files or classes required for an application are placed together in one card class file.

constant_pool[]

The constant_pool is a table of variable-length structures (0) representing various string constants, class names, field names, and other constants that are referred to within the CardClassFile structure and its substructures.

The first entry in the card class file is constant_pool[0].

Each of the constant_pool table entries at indices 0 through const_size is a variable-length structure (0).

class[]

The class is a table of max_class classes that constitute the application loaded onto the card.

Constant Pool

All constant_pool table entries have the following general format:

```
CpInfo {
    u1 tag;
    u1 info[];
}
```

Each item in the constant_pool table must begin with a 1-byte tag indicating the kind of cp_info entry. The contents of the info array varies with the value of tag. The valid tags and their values are the same as those specified in the Red book.

Each tag byte must be followed by two or more bytes giving information about the specific constant. The format of the additional information varies with the tag value. Currently the only tags that need to be included are CONSTANT_Class, CONSTANT_FieldRef, CONSTANT_MethodRef and CONSTANT_InterfaceRef. Support for other tags be added as they are included in the specification.

CONSTANT_Class

The CONSTANT_Class_info structure is used to represent a class or an interface:

```
CONSTANT_ClassInfo {
    u1 tag;
    u2 name_index;
}
```

The items of the CONSTANT_Class_info structure are the following:

tag

The tag item has the value CONSTANT_Class (7).

name_index

The value of the name_index item must represent a valid Java class name. The Java class name represented by name_index must be exactly the same Java class name that is described by the corresponding CONSTANT_Class entry in the constant_pool of the original class file.

CONSTANT_Fieldref, CONSTANT_Methodref, and CONSTANT_InterfaceMethodref

Fields, methods, and interface methods are represented by similar structures:

```
CONSTANT_FieldrefInfo {
    u1 tag;
    u2 class_index;
    u2 name_sig_index;
}
CONSTANT_MethodrefInfo {
    u1 tag;
    u2 class_index;
    u2 name_sig_index;
}
CONSTANT_InterfaceMethodrefInfo {
    u1 tag;
    u2 class_index;
    u2 name_sig_index;
}
```

The items of these structures are as follows:

tag

The tag item of a CONSTANT_FieldrefInfo structure has the value CONSTANT_Fieldref (9).

The tag item of a CONSTANT_MethodrefInfo structure has the value CONSTANT_Methodref (10).

The tag item of a CONSTANT_InterfaceMethodrefInfo structure has the value CONSTANT_InterfaceMethodref (11).

classs_index

The value of the class_index item must represent a valid Java class or interface name. The name represented by class_index must be exactly the same name that is described by the corresponding CONSTANT_Class_info entry in the constant_pool of the original class file.

name_sig_index

The value of the name_sig_index item must represent a valid Java name and type. The name and type represented by name_sig_index must be exactly the same name and type described by the CONSTANT_NameAndType_info entry in the constant_pool structure of the original class file.

Class

Each class is described by a fixed-length ClassInfo structure. The format of this structure is:

```
ClassInfo {
    u2 name_index;
    u1 max_field;
    u1 max_sfield;
    u1 max_method;
    u1 max_interface;
    u2 superclass;
    u2 access_flags;
```

```
    FieldInfo field[max_field+max_sfield];
    InterfaceInfo interface[max_interface];
    MethodInfo method[max_method];
}
```

The items of the ClassInfo structure are as follows:

name_index

The value of the name_index item must represent a valid Java class name. The Java class name represented by name_index must be exactly the same Java class name that is described in the corresponding ClassFile structure of the original class file.

max_field

The value of the max_field item gives the number of FieldInfo (0) structures in the field table that represent the instance variables, declared by this class or interface type. This value refers to the number of non-static the fields in the card class file. If the class represents an interface the value of max_field is 0.

max_sfield

The value of the max_sfield item gives the number of FieldInfo structures in the field table that represent the class variables, declared by this class or interface type. This value refers to the number of static the fields in the card class file.

max_method

The value of the max_method item gives the number of MethodInfo (0) structures in the method table.

max_interface

The value of the max_interface item gives the number of direct superinterfaces of this class or interface type.

superclass

For a class, the value of the superclass item must represent a valid Java class name. The Java class name represented by superclass must be exactly the same Java class name that is described in the corresponding ClassFile structure of the original class file. Neither the superclass nor any of its superclasses may be a final class.

If the value of superclass is 0[1], then this class must represent the class java.lang.Object, the only class or interface without a superclass.

For an interface, the value of superclass must always represent the Java class java.lang.Object.

access_flags

The value of the access_flags item is a mask of modifiers used with class and interface declarations. The access_flags modifiers and their values are the same as the access_flags modifiers in the corresponding ClassFile structure of the original class file.

field[]

Each value in the field table must be a fixed-length FieldInfo (0) structure giving a complete description of a field in the class or interface type. The field table includes only those fields that are declared by this class or interface. It does not include items representing fields that are inherited from superclasses or superinterfaces.

interface[]

Each value in the interface array must represent a valid interface name. The interface name represented by each entry must be exactly the same interface name that is described in the corresponding interface array of the original class file.

method[]

Each value in the method table must be a variable-length MethodInfo (0) structure giving a complete description of and Java Virtual Machine code for a method in the class or interface.

The MethodInfo structures represent all methods, both instance methods and, for classes, class (static) methods, declared by this class or interface type. The method table only includes those methods that are explicitly declared by this class. Interfaces have only the single method <clinit>, the interface initialization method. The methods table does not include items representing methods that are inherited from superclasses or superinterfaces.

---

[1] Or a standard yet fixed value.

Fields

Each field is described by a fixed-length field_info structure. The format of this structure is

```
FieldInfo {
    u2 name_index;
    u2 signature_index;
    u2 access_flags;
}
```

The items of the FieldInfo structure are as follows:

name_index

The value of the name_index item must represent a valid Java field name. The Java field name represented by name_index must be exactly the same Java field name that is described in the corresponding field_info structure of the original class file.

signature_index

The value of the signature_index item must represent a valid Java field descriptor. The Java field descriptor represented by signature index must be exactly the same Java field descriptor that is described in the corresponding field_info structure of the original class file.

access_flags

The value of the access_flags item is a mask of modifiers used to describe access permission to and properties of a field. The access_flags modifiers and their values are the same as the access_flags modifiers in the corresponding field_info structure of the original class file.

Methods

Each method is described by a variable-length MethodInfo structure. The MethodInfo structure is a variable-length structure that contains the Java Virtual Machine instructions and auxiliary information for a single Java method, instance initialization method, or class or interface initialization method. The structure has the following format:

```
MethodInfo {
    u2 name_index;
    u2 signature_index;
    u1 max_local;
    u1 max_arg;
    u1 max_stack;
    u1 access_flags;
    u2 code_length;
    u2 exception_length;
    u1 code[code_length];
    {    u2 start_pc;
         u2 end_pc;
         u2  handler_pc;
         u2  catch_type;
    } einfo[exception_length];
}
```

The items of the MethodInfo structure are as follows:

name_index

The value of the name_index item must represent either one of the special internal method names, either <init> or <clinit>, or a valid Java method name. The Java method name represented by name_index must be exactly the same Java method name that is described in the corresponding method_info structure of the original class file.

signature_index

The value of the signature_index item must represent a valid Java method descriptor. The Java method descriptor represented by signature_index must be exactly the same Java method descriptor that is described in the corresponding method_info structure of the original class file.

max_local

The value of the max_locals item gives the number of local variables used by this method, excluding the parameters passed to the method on invocation. The index of the first local variable is 0. The greatest local variable index for a one-word value is max_locals-1.

max_arg

The value of the max_arg item gives the maximum number of arguments to this method.

max_stack

The value of the max_stack item gives the maximum number of words on the operand stack at any point during execution of this method.

access_flags

The value of the access_flags item is a mask of modifiers used to describe access permission to and properties of a method or instance initialization method. . The access_flags modifiers and their values are the same as the access_flags modifiers in the corresponding method_info structure of the original class file.

code_length

The value of the code_length item gives the number of bytes in the code array for this method. The value of code_length must be greater than zero; the code array must not be empty.

exception_length

The value of the exception_length item gives the number of entries in the exception_info table.

code[]

The code array gives the actual bytes of Java Virtual Machine code that implement the method. When the code array is read into memory on a byte addressable machine, if the first byte of the array is aligned on a 4-byte boundary, the tableswitch and lookupswitch 32-bit offsets will be 4-byte aligned; refer to the descriptions of those instructions for more information on the consequences of code array alignment.

The detailed constraints on the contents of the code array are extensive and are the same as described in the Java Virtual Machine Specification.

einfo[]

Each entry in the einfo array describes one exception handler in the code array. Each einfo entry contains the following items:

start_pc, end_pc

The values of the two items start_pc and end_pc indicate the ranges in the code array at which the exception handler is active.

The value of start_pc must be a valid index into the code array of the opcode of an instruction. The value of end_pc either must be a valid index into the code array of the opcode of an instruction, or must be equal to code_length, the length of the code array. The value of start_pc must be less than the value of end_pc.

The start_pc is inclusive and end_pc is exclusive; that is, the exception handler must be active while the program counter is within the interval [start_pc, end_pc].

handler_pc

The value of the handler_pc item indicates the start of the exception handler. The value of the item must be a valid index into the code array, must be the index of the opcode of an instruction, and must be less than the value of the code_length item.

catch_type

If the value of the catch_type item is nonzero, it must represent a valid Java class type. The Java class type represented by catch_type must be exactly the same as the Java class type that is described by the catch_type in the corresponding method_info structure of the original class file. This class must be the class Throwable or one of its subclasses. The exception handler will be called only if the thrown exception is an instance of the given class or one of its subclasses.

If the value of the catch_type item is zero, this exception handler is called for all exceptions. This is used to implement finally.

Attributes

Attributes used in the original class file are either eliminated or regrouped for compaction.

The predefined attributes SourceFile, ConstantValue, Exceptions, LineNumberTable, and Local-VariableTable may be eliminated without sacrificing any information required for Java byte code interpretation.

The predefined attribute Code which contains all the byte codes for a particular method are moved in the corresponding MethodInfo structure.

Constraints on Java Card Virtual Machine Code

The Java Card Virtual Machine code for a method, instance initialization method, or class or interface initialization method is stored in the array code of the MethodInfo structure of a card class file. Both the static and the structural constraints on this code array are the same as those described in the Red book.
Limitations of the Java Card Virtual Machine and Java Card class File Format
The following limitations in the Java Card Virtual Machine are imposed by this version of the Java Card Virtual Machine specification:

- The per-card class file constant pool is limited to 65535 entries by the 16-bit const_size field of the CardClassFile structure (0). This acts as an internal limit on the total complexity of a single card class file. This count also includes the entries corresponding to the constant pool of the class hierarchy available to the application in the card.[2]
- The amount of code per method is limited to 65535 bytes by the sizes of the indices in the MethodInfo structure.
- The number of local variables in a method is limited to 255 by the size of the max_local item of the MethodInfo structure (0).
- The number of fields of a class is limited to 510 by the size of the max_field and the max_sfield items of the ClassInfo structure (0).
- The number of methods of a class is limited to 255 by the size of the max_method item of the ClassInfo structure (0).
- The size of an operand stack is limited to 255 words by the max_stack field of the MethodInfo structure (0).

Bibliography

[1] Tim Lindholm and Frank Yellin, The Java Virtual Machine Specification, Addison-Wesley, 1996.

[2] A single card class file constant pool has 65535-Δ entries available, where Δ corresponds to the number of entries in the constant pool of the class hierarchies accessible to the application.

APPENDIX B

APPENDIX B

String To ID Input And Output

For the correct operation of Card JVM it is very important that the declared and generated IDs are correctly managed. This management is controlled by the definitions in the string to ID input file String-ID INMap. This textual file, the basis for which is shown below, declares which areas of the namespace can be used for what purposes. One possible arrangement of this map may reserve some IDs for internal use by the Card JVM interpreter, and the rest is allocated to Card JVM applications.

```
#
# String-ID INMap file.
#
#      4000 - 7FFF   Available for application use.
#      F000 - FFFE   Reserved for Card JVM's internal use.
#
constantBase     F000          # The area from F000 to FFFF is reserved for
                               # Card JVM's internal use.
                               #
MainApplication                # F000 - Name of the startup class
                               # (changes for each application)
main()V                        # F001 - Name of the startup method
                               # (may change for each application)
java/lang/Object               # F002
java/lang/String               # F003
<init>()V                      # F004
<clinit>()V                    # F005
[L                             # F006
[I                             # F007
[C                             # F008
[B                             # F009
[S                             # F00A
#
constantBase     FFF0          # This area is reserved for simple return types.
L                              # FFF0
V                              # FFF1
I                              # FFF2
S                              # FFF3
C                              # FFF4
B                              # FFF5
Z                              # FFF6
#
constantBase     4000          # From here on this space is application dependent.
```

Essentially, all applications which are to be loaded into a smart card are allocated their own IDs within the 0x4000 to 0x7FFF. This space is free for each application since no loaded application is permitted to access other applications.

Care must be taken on managing the IDs for preloaded class libraries. The management of these IDs is helped by the (optional) generation of the string to ID output file String-ID OUTMap file. This map is the String-ID INMap augmented with the new String-ID bindings. These bindings may be produced when the Card Class File Converter application terminates. The String-ID OUTMap is generated for support libraries and OS interfaces loaded on the card. This map may be used as the String-ID INMap for smart card applications using the support libraries and OS interfaces loaded on the card. When building new applications this file can generally be discarded.

As an example consider the following Java program. HelloSmartCard.java. When compiled it generates a class file HelloSmartCard.class. This class file has embedded in it strings that represent the class name, methods and type information. On the basis of the String-ID INMap described above Card Class File Converter generates a card class file that replaces the strings present in the class file with IDs allocated by Card Class File Converter. Table 1 lists the strings found in the constant pool of HelloSmartCard.class with their respective Card Class File Converter assigned IDs. Note that some strings (like "`java/lang/Object`") have a pre-assigned value (`F002`) and some strings (like "`()V`") get a new value (`4004`).

```
public class HelloSmartCard {
  public byte aVariable;

  public static void main() {
    HelloSmartCard h = new HelloSmartCard();
    h.aVariable = (byte)13;
  }
}
```

Program : HelloSmartCard.java

| **Offset (In Constant Pool)** | **String** | **ID** | **Mapped New/ Mapped/Old** |
|---|---|---|---|
| 00000A | "Code" | 4000 | New |
| 000011 | "SourceFile" | 4001 | New |
| 00001E | "ConstantValue" | 4002 | New |
| 00002E | "Exceptions" | 4003 | New |
| 00003B | "HelloSmartCard" | F000 | Old |
| 00004C | "java/lang/Object" | F002 | Old |
| 000062 | "<init>" | F004 | Old |
| 00006E | "()V" | 4004 | New |
| 000074 | "aVariable" | 4005 | New |
| 00008A | "B" | FFF5 | Old |
| 00008E | "HelloSmartCard.java" | 4006 | New |
| 0000B3 | "main" | F001 | Old |

Relevant entries of String-ID OUTMap

APPENDIX C

APPENDIX C

Byte codes supported by the Card JVM in the preferred embodiment

| | | |
|---|---|---|
| AALOAD | AASTORE | ACONST_NULL |
| ALOAD | ALOAD_0 | ALOAD_1 |
| ALOAD_2 | ALOAD_3 | ARETURN |
| ARRAYLENGTH | ASTORE | ASTORE_0 |
| ASTORE_1 | ASTORE_2 | ASTORE_3 |
| ATHROW | BALOAD | BASTORE |
| CHECKCAST | DUP | DUP2 |
| DUP2_X1 | DUP2_X2 | DUP_X1 |
| DUP_X2 | GETFIELD | GETSTATIC |
| GOTO | IADD | IALOAD |
| IAND | IASTORE | ICONST_0 |
| ICONST_1 | ICONST_2 | ICONST_3 |
| ICONST_4 | ICONST_5 | ICONST_M1 |
| IDIV | IFEQ | IFGE |
| IFGT | IFLE | IFLT |
| IFNE | IFNONNULL | IFNULL |
| IF_ACMPEQ | IF_ACMPNE | IF_ICMPEQ |
| IF_ICMPGE | IF_ICMPGT | IF_ICMPLE |
| IF_ICMPLT | IF_ICMPNE | IINC |
| ILOAD | ILOAD_0 | ILOAD_1 |
| ILOAD_2 | ILOAD_3 | IMUL |
| INEG | INSTANCEOF | INT2BYTE |
| INT2CHAR | INT2SHORT | INVOKEINTERFACE |
| INVOKENONVIRTUAL | INVOKESTATIC | INVOKEVIRTUAL |
| IOR | IREM | IRETURN |
| ISHL | ISHR | ISTORE |
| ISTORE_0 | ISTORE_1 | ISTORE_2 |
| ISTORE_3 | ISUB | IUSHR |
| IXOR | JSR | LDC1 |
| LDC2 | LOOKUPSWITCH | NEW |
| NEWARRAY | NOP | POP |
| POP2 | PUTFIELD | PUTSTATIC |
| RET | RETURN | SALOAD |
| SASTORE | SIPUSH | SWAP |
| TABLESWITCH | BIPUSH | |

Standard Java byte codes numbers for the byte codes supported in the preferred embodiment

```
package util;

/*
 * List of actual Java Bytecodes handled by this JVM
 * ref. Lindohlm and Yellin.
 *
 * Copyright (c) 1996 Schlumberger Austin Products Center,
 *                    Schlumberger, Austin, Texas, USA.
 */

public interface BytecodeDefn {
    public static final byte j_NOP = (byte)0;
    public static final byte ACONST_NULL = (byte)1;
    public static final byte ICONST_M1 = (byte)2;
    public static final byte ICONST_0 = (byte)3;
    public static final byte ICONST_1 = (byte)4;
    public static final byte ICONST_2 = (byte)5;
    public static final byte ICONST_3 = (byte)6;
    public static final byte ICONST_4 = (byte)7;
    public static final byte ICONST_5 = (byte)8;
    public static final byte BIPUSH = (byte)16;
    public static final byte SIPUSH = (byte)17;
    public static final byte LDC1 = (byte)18;
    public static final byte LDC2 = (byte)19;
    public static final byte ILOAD = (byte)21;
    public static final byte ALOAD = (byte)25;
    public static final byte ILOAD_0 = (byte)26;
    public static final byte ILOAD_1 = (byte)27;
    public static final byte ILOAD_2 = (byte)28;
    public static final byte ILOAD_3 = (byte)29;
    public static final byte ALOAD_0 = (byte)42;
    public static final byte ALOAD_1 = (byte)43;
    public static final byte ALOAD_2 = (byte)44;
    public static final byte ALOAD_3 = (byte)45;
    public static final byte IALOAD = (byte)46;
    public static final byte AALOAD = (byte)50;
    public static final byte BALOAD = (byte)51;
    public static final byte CALOAD = (byte)52;
    public static final byte ISTORE = (byte)54;
    public static final byte ASTORE = (byte)58;
    public static final byte ISTORE_0 = (byte)59;
    public static final byte ISTORE_1 = (byte)60;
    public static final byte ISTORE_2 = (byte)61;
    public static final byte ISTORE_3 = (byte)62;
    public static final byte ASTORE_0 = (byte)75;
    public static final byte ASTORE_1 = (byte)76;
    public static final byte ASTORE_2 = (byte)77;
    public static final byte ASTORE_3 = (byte)78;
    public static final byte IASTORE = (byte)79;
    public static final byte AASTORE = (byte)83;
    public static final byte BASTORE = (byte)84;
    public static final byte CASTORE = (byte)85;
    public static final byte POP = (byte)87;
    public static final byte POP2 = (byte)88;
    public static final byte DUP = (byte)89;
    public static final byte DUP_X1 = (byte)90;
    public static final byte DUP_X2 = (byte)91;
    public static final byte DUP2 = (byte)92;
    public static final byte DUP2_X1 = (byte)93;
    public static final byte DUP2_X2 = (byte)94;
    public static final byte SWAP = (byte)95;
    public static final byte IADD = (byte)96;
    public static final byte ISUB = (byte)100;
    public static final byte IMUL = (byte)104;
    public static final byte IDIV = (byte)108;
    public static final byte IREM = (byte)112;
```

```
    public static final byte INEG = (byte)116;
    public static final byte ISHL = (byte)120;
    public static final byte ISHR = (byte)122;
    public static final byte IUSHR = (byte)124;
    public static final byte IAND = (byte)126;
    public static final byte IOR = (byte)128;
    public static final byte IXOR = (byte)130;
    public static final byte IINC = (byte)132;
    public static final byte INT2BYTE = (byte)145;
    public static final byte INT2CHAR = (byte)146;
    public static final byte INT2SHORT = (byte)147;
    public static final byte IFEQ = (byte)153;
    public static final byte IFNE = (byte)154;
    public static final byte IFLT = (byte)155;
    public static final byte IFGE = (byte)156;
    public static final byte IFGT = (byte)157;
    public static final byte IFLE = (byte)158;
    public static final byte IF_ICMPEQ = (byte)159;
    public static final byte IF_ICMPNE = (byte)160;
    public static final byte IF_ICMPLT = (byte)161;
    public static final byte IF_ICMPGE = (byte)162;
    public static final byte IF_ICMPGT = (byte)163;
    public static final byte IF_ICMPLE = (byte)164;
    public static final byte IF_ACMPEQ = (byte)165;
    public static final byte IF_ACMPNE = (byte)166;
    public static final byte GOTO = (byte)167;
    public static final byte j_JSR = (byte)168;
    public static final byte RET = (byte)169;
    public static final byte TABLESWITCH = (byte)170;
    public static final byte LOOKUPSWITCH = (byte)171;
    public static final byte IRETURN = (byte)172;
    public static final byte ARETURN = (byte)176;
    public static final byte RETURN = (byte)177;
    public static final byte GETSTATIC = (byte)178;
    public static final byte PUTSTATIC = (byte)179;
    public static final byte GETFIELD = (byte)180;
    public static final byte PUTFIELD = (byte)181;
    public static final byte INVOKEVIRTUAL = (byte)182;
    public static final byte INVOKENONVIRTUAL = (byte)183;
    public static final byte INVOKESTATIC = (byte)184;
    public static final byte INVOKEINTERFACE = (byte)185;
    public static final byte NEW = (byte)187;
    public static final byte NEWARRAY = (byte)188;
    public static final byte ARRAYLENGTH = (byte)190;
    public static final byte ATHROW = (byte)191;
    public static final byte CHECKCAST = (byte)192;
    public static final byte INSTANCEOF = (byte)193;
    public static final byte IFNULL = (byte)198;
    public static final byte IFNONNULL = (byte)199;
}
```

APPENDIX D

APPENDIX D

Card Class File Converter byte code conversion process

```
/*
 * Reprocess code block.
 */
static
void
reprocessMethod(iMethod* imeth)
{
  int pc;
  int npc;
  int align;
  bytecode* code;
  int codelen;
  int i;
  int opad;
  int npad;
  int apc;
  int high;
  int low;

/* codeinfo is a table that keeps track of the valid Java bytecodes and their
 * corresponding translation
 */
  code = imeth->external->code;
  codelen = imeth->external->code_length;

  jumpPos = 0;
  align = 0;
```

A

```
  /* Scan for unsupported opcodes */
  for (pc = 0; pc < codelen; pc = npc) {
    if (codeinfo[code[pc]].valid == 0) {
      error("Unsupported opcode %d", code[pc]);
    }
    npc = nextPC(pc, code);
  }
```

B

```
  /* Scan for jump instructions an insert into jump table */
  for (pc = 0; pc < codelen; pc = npc) {
    npc = nextPC(pc, code);

    if (codeinfo[code[pc]].valid == 3) {
      insertJump(pc+1, pc, (int16)((code[pc+1] << 8)|code[pc+2]));
    }
    else if (codeinfo[code[pc]].valid == 4) {
      apc = pc & -4;
      low = (code[apc+8] << 24) | (code[apc+9] << 16)
            | (code[apc+10] << 8) | code[apc+11];
      high = (code[apc+12] << 24) | (code[apc+13] << 16)
            | (code[apc+14] << 8) | code[apc+15];
      for (i = 0; i < high-low+1; i++) {
        insertJump(apc+(i*4)+18, pc,
                   (int16)((code[apc+(i*4)+18] << 8) | code[apc+(i*4)+19]));
      }
      insertJump(apc+6, pc, (int16)((code[apc+6] << 8) | code[apc+7]));
    }
    else if (codeinfo[code[pc]].valid == 5) {
      apc = pc & -4;
      low = (code[apc+8] << 24) | (code[apc+9] << 16)
            | (code[apc+10] << 8) | code[apc+11];
      for (i = 0; i < low; i++) {
        insertJump(apc+(i*8)+18, pc,
                   (int16)((code[apc+(i*8)+18] << 8) | code[apc+(i*8)+19]));
      }
      insertJump(apc+6, pc, (int16)((code[apc+6] << 8) | code[apc+7]));
    }
  }
```

C

```
#ifdef TRANSLATE_BYTECODE
  /* Translate specific opcodes to general ones */
  for (pc = 0; pc < codelen; pc = npc) {
    /* This is a translation code */
    if (codeinfo[code[pc]].valid == 2) {
      switch (code[pc]) {
      case ILOAD_0:
      case ILOAD_1:
      case ILOAD_2:
      case ILOAD_3:
        insertSpace(code, &codelen, pc, 1);
        align += 1;
        code[pc+1] = code[pc] - ILOAD_0;
        code[pc+0] = ILOAD;
        break;

      case ALOAD_0:
      case ALOAD_1:
      case ALOAD_2:
      case ALOAD_3:
        insertSpace(code, &codelen, pc, 1);
        align += 1;
        code[pc+1] = code[pc] - ALOAD_0;
        code[pc+0] = ALOAD;
        break;

      case ISTORE_0:
      case ISTORE_1:
      case ISTORE_2:
      case ISTORE_3:
        insertSpace(code, &codelen, pc, 1);
        align += 1;
        code[pc+1] = code[pc] - ISTORE_0;
        code[pc+0] = ISTORE;
        break;

      case ASTORE_0:
      case ASTORE_1:
      case ASTORE_2:
      case ASTORE_3:
        insertSpace(code, &codelen, pc, 1);
        align += 1;
        code[pc+1] = code[pc] - ASTORE_0;
        code[pc+0] = ASTORE;
        break;

      case ICONST_M1:
        insertSpace(code, &codelen, pc, 2);
        align += 2;
        code[pc+2] = 255;
        code[pc+1] = 255;
        code[pc+0] = SIPUSH;
        break;

      case ICONST_0:
      case ICONST_1:
      case ICONST_2:
      case ICONST_3:
      case ICONST_4:
      case ICONST_5:
        insertSpace(code, &codelen, pc, 2);
        align += 2;
        code[pc+2] = code[pc] - ICONST_0;
        code[pc+1] = 0;
        code[pc+0] = SIPUSH;
        break;

      case LDC1:
        insertSpace(code, &codelen, pc, 1);
        align += 1;
        code[pc+1] = 0;
        code[pc+0] = LDC2;
        break;
```

C

```
      case BIPUSH:
        insertSpace(code, &codelen, pc, 1);
        align += 1;
        if ((int8)code[pc+2] >= 0) {
          code[pc+1] = 0;
        }
        else {
          code[pc+1] = 255;
        }
        code[pc+0] = SIPUSH;
        break;

      case INT2SHORT:
        removeSpace(code, &codelen, pc, 1);
        align -= 1;
        npc = pc;
        continue;

      }
    }
    else if (codeinfo[code[pc]].valid == 4 || codeinfo[code[pc]].valid == 5) {
      /* Switches are aligned to 4 byte boundaries.  Since we are inserting and
       * removing bytecodes, this may change the alignment of switch instructions.
       * Therefore, we must readjust the padding in switches to compensate.
       */
      opad = (4 - (((pc+1) - align) % 4)) % 4; /* Current switch padding */
      npad = (4 - ((pc+1) % 4)) % 4;       /* New switch padding */
      if (npad > opad) {
        insertSpace(code, &codelen, pc+1, npad - opad);
        align += (npad - opad);
      }
      else if (npad < opad) {
        removeSpace(code, &codelen, pc+1, opad - npad);
        align -= (opad - npad);
      }
    }

    npc = nextPC(pc, code);
  }
#endif
```

D

```
  /* Relink constants */
  for (pc = 0; pc < codelen; pc = npc) {
    npc = nextPC(pc, code);
    i = (uint16)((code[pc+1] << 8) + code[pc+2]);

    switch (code[pc]) {
    case LDC2:
      /* 'i' == general index */
      switch (cItem(i).type) {
      case CONSTANT_Integer:
        i = cItem(i).v.tint;
        code[pc] = SIPUSH;
        break;

      case CONSTANT_String:
        i = buildStringIndex(i);
        break;

      default:
        error("Unsupported loading of constant type");
        break;
      }
      break;

    case NEW:
    case INSTANCEOF:
    case CHECKCAST:
      /* 'i' == class index */
      i = buildClassIndex(i);
      break;

    case GETFIELD:
    case PUTFIELD:
      /* 'i' == field index */
```

D

```
      /* i = buildFieldSignatureIndex(i); */
      i = buildStaticFieldSignatureIndex(i);
      break;

    case GETSTATIC:
    case PUTSTATIC:
      /* 'i' == field index */
      i = buildStaticFieldSignatureIndex(i);
      break;

    case INVOKEVIRTUAL:
    case INVOKENONVIRTUAL:
    case INVOKESTATIC:
    case INVOKEINTERFACE:
      /* 'i' == method signature index */
      i = buildSignatureIndex(i);
      break;
    }

    /* Insert application constant reference */
    code[pc+1] = (i >> 8) & 0xFF;
    code[pc+2] = i & 0xFF;
  }
```

E

```
#ifdef MODIFY_BYTECODE
  /* Translate codes */
  for (pc = 0; pc < codelen; pc = npc) {
    npc = nextPC(pc, code);
    code[pc] = codeinfo[code[pc]].translation;
  }
#endif
```

F

```
  /* Relink jumps */
  for (i = 0; i < jumpPos; i++) {
    apc = jumpTable[i].at;
    pc = jumpTable[i].from;
    npc = jumpTable[i].to - pc;

    code[apc+0] = (npc >> 8) & 0xFF;
    code[apc+1] = npc & 0xFF;
  }

  /* Fixup length */
  imeth->external->code_length = codelen;
  imeth->esize = (SIZEOFMETHOD + codelen + 3) & -4;
}
```

APPENDIX E

APPENDIX E

Example Loading And Execution Control Program

```
public class  Bootstrap {

  // Constants used throughout the program
  static final byte BUFFER_LENGTH          = 32;
  static final byte ACK_SIZE               = (byte)1;
  static final byte ACK_CODE               = (byte)0;
  static final byte OS_HEADER_SIZE         = (byte)0x10;
  static final byte GPOS_CREATE_FILE       = (byte)0xE0;

  static final byte ST_INVALID_CLASS       = (byte)0xC0;
  static final byte ST_INVALID_PARAMETER   = (byte)0xA0;
  static final byte ST_INS_NOT_SUPPORTED   = (byte)0xB0;
  static final byte ST_SUCCESS             = (byte)0x00;

  static final byte ISO_COMMAND_LENGTH     = (byte)5;
  static final byte ISO_READ_BINARY        = (byte)0xB0;
  static final byte ISO_UPDATE_BINARY      = (byte)0xD6;
  static final byte ISO_INIT_APPLICATION   = (byte)0xF2;
  static final byte ISO_VERIFY_KEY         = (byte)0x2A;
  static final byte ISO_SELECT_FILE        = (byte)0xA4;

  static final byte ISO_CLASS              = (byte)0xC0;
  static final byte ISO_APP_CLASS          = (byte)0xF0;


  public static void main () {

    byte pbuffer[] = new byte[ISO_COMMAND_LENGTH];
    byte dbuffer[] = new byte[BUFFER_LENGTH];
    byte ackByte[] = new byte[ACK_SIZE];
    //short fileId;
    short offset;
    byte bReturnStatus;

    // Initialize Communications
    _OS.SendATR();

    do {
        // Retrieve the command header
        _OS.GetMessage(pbuffer, ISO_COMMAND_LENGTH, ACK_CODE);

        // Verify class of the message - Only ISO + Application
        if ((pbuffer[0] != ISO_APP_CLASS)
         && (pbuffer[0] != ISO_CLASS)) {
            _OS.SendStatus(ST_INVALID_CLASS);
        }
        else {
          // go through the switch
          // Send the acknowledge code

          // Verify if data length too large
          if (pbuffer[4] > BUFFER_LENGTH) {
            bReturnStatus = ST_INVALID_PARAMETER;
          }
          else
          {
            switch (pbuffer[1]) {
            case ISO_SELECT_FILE:
                // we always assume that length is 2
                if (pbuffer[4] != 2) {
                    bReturnStatus = ST_INVALID_PARAMETER;
                }
                else
                {
                    // get the fileId(offset) in the data buffer
                    _OS.GetMessage(dbuffer, (byte)2, pbuffer[1]);
                    // cast dbuffer[0..1] into a short
```

```
            offset = (short) ((dbuffer[0] << 8) | (dbuffer[1] & 0x00FF));
            bReturnStatus = _OS.SelectFile(offset);
        }
        break;

    case ISO_VERIFY_KEY:
        // Get the Key from the terminal
        _OS.GetMessage(dbuffer, pbuffer[4], pbuffer[1]);

        bReturnStatus = _OS.VerifyKey(pbuffer[3],
                                      dbuffer,
                                      pbuffer[4]);
        break;

    case ISO_INIT_APPLICATION:
        // Should send the id of a valid program file
        _OS.GetMessage(dbuffer, (byte)1, pbuffer[1]);
        // compute fileId(offset) from pbuffer[2..3] via casting
        offset = (short) ((pbuffer[2] << 8) | (pbuffer[3] & 0x00FF));
        bReturnStatus = _OS.Execute(offset,
                                    dbuffer[0]);
        break;
    case GPOS_CREATE_FILE:
        if (pbuffer[4] != OS_HEADER_SIZE) {
            bReturnStatus = ST_INVALID_PARAMETER;
            break;
        }
        // Receive The data
        _OS.GetMessage(dbuffer, pbuffer[4], pbuffer[1]);
        bReturnStatus = _OS.CreateFile(dbuffer);
        break;

    case ISO_UPDATE_BINARY:
        _OS.GetMessage(dbuffer, pbuffer[4], pbuffer[1]);
        // compute offset from pbuffer[2..3] via casting
        offset = (short) ((pbuffer[2] << 8) | (pbuffer[3] & 0x00FF));
        // assumes that a file is already selected
        bReturnStatus = _OS.WriteBinaryFile (offset,
                                             pbuffer[4],
                                             dbuffer);
        break;
    case ISO_READ_BINARY:
        // compute offset from pbuffer[2..3] via casting
        offset = (short) ((pbuffer[2] << 8) | (pbuffer[3] & 0x00FF));
        // assumes that a file is already selected
        bReturnStatus = _OS.ReadBinaryFile (offset,
                                            pbuffer[4],
                                            dbuffer);
        // Send the data if successful
        ackByte[0] = pbuffer[1];
        if (bReturnStatus == ST_SUCCESS) {
            _OS.SendMessage(ackByte, ACK_SIZE);
            _OS.SendMessage(dbuffer, pbuffer[4]);
        }
        break;
    default:
        bReturnStatus = ST_INS_NOT_SUPPORTED;
    }
   }
  _OS.SendStatus(bReturnStatus);
 }
}
while (true);
}
}
```

APPENDIX F

APPENDIX F

Methods For Accessing Card Operating System Capabilities In The Preferred Embodiment

```
public class _OS {

    static native byte      SelectFile          (short  file_id);
    static native byte      SelectParent        ();
    static native byte      SelectCD            ();
    static native byte      SelectRoot          ();

    static native byte      CreateFile          (byte   file_hdr[]);
    static native byte      DeleteFile          (short  file_id);

    // General File Manipulation
    static native byte      ResetFile           ();
    static native byte      ReadByte            (byte   offset);
    static native short     ReadWord            (byte   offset);

    // Header Manipulation
    static native byte      GetFileInfo         (byte   file_hdr[]);

    // Binary File support
    static native byte      ReadBinaryFile      (short  offset,
                                                 byte   data_length,
                                                 byte   buffer[]);
    static native byte      WriteBinaryFile     (short  offset,
                                                 byte   data_length,
                                                 byte   buffer[]);

    // Record File support
    static native byte      SelectRecord        (byte   record_nb,
                                                 byte   mode);
    static native byte      NextRecord          ();
    static native byte      PreviousRecord      ();

    static native byte      ReadRecord          (byte   record_data[],
                                                 byte   record_nb,
                                                 byte   offset,
                                                 byte   length);
    static native byte      WriteRecord         (byte   buffer[],
                                                 byte   record_nb,
                                                 byte   offset,
                                                 byte   length);

    // Cyclic File Support
    static native byte      LastUpdatedRec      ();

    // Messaging Functions
    static native byte      GetMessage          (byte   buffer[],
                                                 byte   expected_length,
                                                 byte   ack_code);
    static native byte      SendMessage         (byte   buffer[],
                                                 byte   data_length);
    static native byte      SetSpeed            (byte   speed);

    // Identity Management
    static native byte      CheckAccess         (byte   ac_action);
    static native byte      VerifyKey           (byte key_number,
                                                 byte key_buffer[],
                                                 byte key_length);
    static native byte      VerifyCHV           (byte   CHV_number,
                                                 byte   CHV_buffer[],
                                                 byte   unblock_flag);
    static native byte      ModifyCHV           (byte   CHV_number,
                                                 byte   old_CHV_buffer[],
                                                 byte   new_CHV_buffer[],
```

```
                                                        byte    unblock_flag);
static native byte      GetFileStatus                  ();
static native byte      SetFileStatus                  (byte    file_status);

static native byte      GrantSupervisorMode ();
static native byte      RevokeSupervisorMode();

static native byte      SetFileACL                     (byte    file_acl[]);
static native byte      GetFileACL                     (byte    file_acl[]);

// File context manipulation
static native void      InitFileStatus                 ();
static native void      BackupFileStatus               ();
static native void      RestoreFileStatus              ();

// Utilities
static native byte      CompareBuffer                  (byte    pattern_length,
                                                        byte    buffer_1[],
                                                        byte    buffer_2[]);
static native short     AvailableMemory                ();
static native void      ResetCard                      (byte    mode);
static native byte      SendATR                        ();
static native byte      SetDefaultATR                  (byte    buffer[],
                                                        byte    length);
static native byte      Execute                        (short   file_id,
                                                        byte    flag);

// Global state variable functions
static native byte      GetIdentity                    ();
static native byte      GetRecordNb                    ();
static native short     GetApplicationId               ();
static native byte      GetRecordLength                ();
static native byte      GetFileType                    ();
static native short     GetFileLength                  ();
static native void      SendStatus                     (byte status);

}
```

APPENDIX G

APPENDIX G

Byte Code Attributes Tables

Dividing Java byte codes into type groups

Each bytecode is assigned a 5 bit type associated with it. This is used to group the codes into similarly behaving sets. In general this behaviour reflects how the types of byte codes operate on the stack, but types 0, 13, 14, and 15 reflect specific kinds of instructions as denoted in the comments section.

The table below illustrates the state of the stack before and after each type of instruction is executed.

| Type | Before execution | After exececution | Comment |
|---|---|---|---|
| 0 | | | Illegal instruction |
| 1 | stk0==int stk1==int | pop(1) | |
| 2 | stk0==int | pop(1) | |
| 3 | stk0==int stk1==int | pop(2) | |
| 4 | | | |
| 5 | push(1) | | |
| 6 | stk0==int stk1==int | pop(3) | |
| 7 | stk0==int | pop(1) | |
| 8 | stk0==ref | pop(1) | |
| 9 | stk0==int | pop(1) | |
| 10 | push(1) | stk0<-int | |
| 11 | push(1) | stk0<-ref | |
| 12 | stk0==ref | stk0<-int | |
| 13 | | | DUPs, SWAP instructions |
| 14 | | | INVOKE instructions |
| 15 | | | FIELDS instructions |
| 16 | | stk0<-ref | |

Using Standard Java Byte Code (without reordering) - Attribute Lookup Table

```
/*
 * Table of bytecode decode information.  This contains a bytecode type
 * and a bytecode length.  We currently support all standard bytecodes
 * (ie. no quicks) which gives us codes 0 to 201 (202 codes in all).
 */

#define T_      0
#define T3      1
#define T6      2
#define T1      3
#define T2      4
#define T7      5
#define T9      6
#define T8      7
#define T12     8
#define T10     9
#define T5      10
#define T11     11
#define T16     12
#define T4      13
#define T13     14
#define T14     15
#define T15     16

#define D(T,L)                              _BUILD_ITYPE_AND_ILENGTH(T, L)
#define _BUILD_ITYPE_AND_ILENGTH(T,L)       (_BUILD_ITYPE(T)|_BUILD_ILENGTH(L))
#define _BUILD_ITYPE(T)                     ((T) << 3)
#define _BUILD_ILENGTH(L)                   (L)
#define _GET_ITYPE(I)                       ((I) & 0xF8)
#define _GET_ILENGTH(I)                     ((I) & 0x07)

const uint8  _SCODE _decodeinfo[256] = {
        D( T4  , 1 ),       /* NOP          */
        D( T11 , 1 ),       /* ACONST_NULL  */
        D( T10 , 1 ),       /* ICONST_M1    */
        D( T10 , 1 ),       /* ICONST_0     */
        D( T10 , 1 ),       /* ICONST_1     */
        D( T10 , 1 ),       /* ICONST_2     */
        D( T10 , 1 ),       /* ICONST_3     */
        D( T10 , 1 ),       /* ICONST_4     */
        D( T10 , 1 ),       /* ICONST_5     */
        D( T_  , 1 ),
        D( T_  , 1 ),
        D( T_  , 1 ),
        D( T_  , 1 ),
        D( T_  , 1 ),
        D( T_  , 1 ),
        D( T_  , 1 ),
        D( T10 , 2 ),       /* BIPUSH       */
        D( T10 , 3 ),       /* SIPUSH       */
        D( T_  , 2 ),       /* LDC1         */
        D( T11 , 3 ),       /* LDC2         */
        D( T_  , 3 ),
        D( T5  , 2 ),       /* ILOAD        */
        D( T_  , 2 ),
        D( T_  , 2 ),
        D( T_  , 2 ),
        D( T5  , 2 ),       /* ALOAD        */
        D( T5  , 1 ),       /* ILOAD_0      */
        D( T5  , 1 ),       /* ILOAD_1      */
        D( T5  , 1 ),       /* ILOAD_2      */
        D( T5  , 1 ),       /* ILOAD_3      */
        D( T_  , 1 ),
        D( T_  , 1 ),
        D( T_  , 1 ),
        D( T_  , 1 ),
        D( T_  , 1 ),
        D( T_  , 1 ),
```

```
D( T_  , 1 ),
D( T_  , 1 ),
D( T_  , 1 ),
D( T_  , 1 ),
D( T_  , 1 ),
D( T_  , 1 ),
D( T5  , 1 ),        /* ALOAD_0     */
D( T5  , 1 ),        /* ALOAD_1     */
D( T5  , 1 ),        /* ALOAD_2     */
D( T5  , 1 ),        /* ALOAD_3     */
D( T_  , 1 ),        /* IALOAD      */
D( T_  , 1 ),
D( T_  , 1 ),
D( T_  , 1 ),
D( T_  , 1 ),        /* AALOAD      */
D( T7  , 1 ),        /* BALOAD      */
D( T_  , 1 ),        /* CALOAD      */
D( T7  , 1 ),        /* SALOAD      */
D( T2  , 2 ),        /* ISTORE      */
D( T_  , 2 ),
D( T_  , 2 ),
D( T_  , 2 ),
D( T8  , 2 ),        /* ASTORE      */
D( T2  , 1 ),        /* ISTORE_0    */
D( T2  , 1 ),        /* ISTORE_1    */
D( T2  , 1 ),        /* ISTORE_2    */
D( T2  , 1 ),        /* ISTORE_3    */
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T8  , 1 ),        /* ASTORE_0    */
D( T8  , 1 ),        /* ASTORE_1    */
D( T8  , 1 ),        /* ASTORE_2    */
D( T8  , 1 ),        /* ASTORE_3    */
D( T_  , 1 ),        /* IASTORE     */
D( T_  , 1 ),
D( T_  , 1 ),
D( T_  , 1 ),
D( T_  , 1 ),        /* AASTORE     */
D( T6  , 1 ),        /* BASTORE     */
D( T_  , 1 ),        /* CASTORE     */
D( T6  , 1 ),        /* SASTORE     */
D( T2  , 1 ),        /* POP         */
D( T3  , 1 ),        /* POP2        */
D( T13 , 1 ),        /* DUP         */
D( T13 , 1 ),        /* DUP_X1      */
D( T13 , 1 ),        /* DUP_X2      */
D( T13 , 1 ),        /* DUP2        */
D( T13 , 1 ),        /* DUP2_X1     */
D( T13 , 1 ),        /* DUP2_X2     */
D( T13 , 1 ),        /* SWAP        */
D( T1  , 1 ),        /* IADD        */
D( T_  , 1 ),
D( T_  , 1 ),
D( T1  , 1 ),
D( T_  , 1 ),        /* ISUB        */
D( T_  , 1 ),
D( T_  , 1 ),
D( T_  , 1 ),
D( T1  , 1 ),        /* IMUL        */
D( T_  , 1 ),
D( T_  , 1 ),
```

```
D( T_  , 1 ),
D( T1  , 1 ),     /* IDIV        */
D( T_  , 1 ),
D( T_  , 1 ),
D( T_  , 1 ),
D( T1  , 1 ),     /* IREM        */
D( T_  , 1 ),
D( T_  , 1 ),
D( T_  , 1 ),
D( T9  , 1 ),     /* INEG        */
D( T_  , 1 ),
D( T_  , 1 ),
D( T_  , 1 ),
D( T1  , 1 ),     /* ISHL        */
D( T_  , 1 ),
D( T1  , 1 ),     /* ISHR        */
D( T_  , 1 ),
D( T1  , 1 ),     /* IUSHR       */
D( T_  , 1 ),
D( T1  , 1 ),     /* IAND        */
D( T_  , 1 ),
D( T1  , 1 ),     /* IOR         */
D( T_  , 1 ),
D( T1  , 1 ),     /* IXOR        */
D( T_  , 1 ),
D( T4  , 3 ),     /* IINC        */
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T9  , 1 ),     /* INT2BYTE    */
D( T9  , 1 ),     /* INT2CHAR    */
D( T_  , 1 ),     /* INT2SHORT   */
D( T_  , 1 ),
D( T_  , 1 ),
D( T_  , 1 ),
D( T_  , 1 ),
D( T_  , 1 ),
D( T2  , 3 ),     /* IFEQ        */
D( T2  , 3 ),     /* IFNE        */
D( T2  , 3 ),     /* IFLT        */
D( T2  , 3 ),     /* IFGE        */
D( T2  , 3 ),     /* IFGT        */
D( T2  , 3 ),     /* IFLT        */
D( T3  , 3 ),     /* IF_ICMPEQ   */
D( T3  , 3 ),     /* IF_ICMPNE   */
D( T3  , 3 ),     /* IF_ICMPLT   */
D( T3  , 3 ),     /* IF_ICMPGE   */
D( T3  , 3 ),     /* IF_ICMPGT   */
D( T3  , 3 ),     /* IF_ICMPLE   */
D( T3  , 3 ),     /* IF_ACMPEQ   */
D( T3  , 3 ),     /* IF_ACMPNE   */
D( T4  , 3 ),     /* GOTO        */
D( T_  , 3 ),     /* JSR         */
D( T_  , 2 ),     /* RET         */
D( T2  , 0 ),     /* TABLESWITCH */
D( T2  , 0 ),     /* LOOKUPSWITCH*/
D( T2  , 1 ),     /* IRETURN     */
D( T_  , 1 ),
D( T_  , 1 ),
D( T_  , 1 ),
D( T8  , 1 ),     /* ARETURN     */
D( T4  , 1 ),     /* RETURN      */
```

```
D( T15 , 3 ),            /* GETSTATIC        */
D( T15 , 3 ),            /* PUTSTATIC        */
D( T15 , 3 ),            /* GETFIELD         */
D( T15 , 3 ),            /* PUTFIELD         */
D( T14 , 3 ),            /* INVOKEVIRTUAL */
D( T14 , 3 ),            /* INVOKESPECIAL */
D( T14 , 3 ),            /* INVOKESTATIC */
D( T14 , 5 ),            /* INVOKEINTERFACE */
D( T_  , 1 ),
D( T11 , 3 ),            /* NEW              */
D( T16 , 2 ),            /* NEWARRAY         */
D( T_  , 3 ),
D( T12 , 1 ),            /* ARRAYLENGTH */
D( T8  , 1 ),            /* ATHROW           */
D( T16 , 3 ),            /* CHECKCAST        */
D( T12 , 3 ),            /* INSTANCEOF       */
D( T_  , 1 ),
D( T_  , 1 ),
D( T_  , 1 ),
D( T_  , 4 ),
D( T8  , 3 ),            /* IFNULL           */
D( T8  , 3 ),            /* IFNONNULL        */
D( T_  , 5 ),
D( T_  , 5 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
D( T_  , 1 ),
```

```
D( T_   , 1 ),
D( T_   , 1 ),
D( T_   , 1 ),
D( T_   , 1 ),
D( T_   , 1 ),
D( T_   , 1 ),
D( T_   , 1 ),
```

APPENDIX H

APPENDIX H

Checks Done On Java Byte Codes By Type

Decoding the instruction. This gives us the length to generate the next PC, and the instruction type:

```
pcarg1 = _GET_ILENGTH(_decodeinfo[insn]);
itype = _GET_ITYPE(_decodeinfo[insn]);
```

Implement some pre-execution checks based on this:

```
/* Check the input stack state based on the instuction type */
if (itype <= ITYPE9) {
        if (itype <= ITYPE1) {
                check_stack_int(1);
        }
        check_stack_int(0);
}
else if (itype <= ITYPE12) {
        check_stack_ref(0);
}
else if (itype < ITYPE11) {
        push(1);
}
```

Finally, implement some post execution checks:

```
/* Set the output state */
if (itype <= ITYPE8) {
        if (itype <= ITYPE6) {
                if (itype >= ITYPE6) {
                        pop(1);
                }
                pop(1);
        }
        pop(1);
}
else if (itype <= ITYPE10) {
        set_stack_int(0);
}
else if (itype >= ITYPE11 && itype <= ITYPE16) {
        set_stack_ref(0);
}
```

APPENDIX I

APPENDIX I

Checks Done On Renumbered Java Byte Codes

Get the instruction. The numeric value of the instruction implicitly contains the instruction type:

```
insn = getpc(-1);
```

Implement some pre-execution checks based on this:

```
/*
 * Check input stack state. By renumbering the byte codes we can
 * perform the necessary security checks by testing if the value of the
 * byte code (and hence the byte code) belongs to the correct group
 */
 if (insn <= TYPE9_END) {
   if (insn <= TYPE1_END) {
     check_stack_int(1);
   }
   check_stack_int(0);
 }
 else if (insn <= TYPE12_END) {
   check_stack_ref(0);
 }
 else if (insn <= TYPE11_END) {
   push(1)
 }
```

Finally, implement some post execution checks:

```
/*
 * Set output stack state.
 */
 if (insn <= TYPE8_END) {
   if (insn <= TYPE6_END) {
     if (insn >= TYPE6_START) {
        pop(1);
      }
     pop(1);
   }
   pop(1);
 }
 else if (insn <= TYPE10_END) {
   set_stack_int(0);
 }
 else if (insn >= TYPE11_START && insn <= TYPE16_END) {
   set_stack_ref(0);
 }
```

Reordering of supported Java byte codes by type

```
/* TYPE 3 */

#define s_POP2          0
#define s_IF_ICMPEQ     1
#define s_IF_ICMPNE     2
#define s_IF_ICMPLT     3
#define s_IF_ICMPGE     4
#define s_IF_ICMPGT     5
#define s_IF_ICMPLE     6
#define s_IF_ACMPEQ     7
#define s_IF_ACMPNE     8

/* TYPE 6 */

#define TYPE6_START     9

#define s_SASTORE       9
#define s_AASTORE       10
#define s_BASTORE       11

#define TYPE6_END       12

/* TYPE 1 */

#define s_IADD          13
#define s_ISUB          14
#define s_IMUL          15
#define s_IDIV          16
#define s_IREM          17
#define s_ISHL          18
#define s_ISHR          19
#define s_IUSHR         20
#define s_IAND          21
#define s_IOR           22
#define s_IXOR          23

#define TYPE1_END       23

/* TYPE 2 */

#define s_ISTORE        24
#define s_POP           25
#define s_IFEQ          26
#define s_IFNE          27
#define s_IFLT          28
#define s_IFGE          29
#define s_IFGT          30
#define s_IFLE          31
#define s_TABLESWITCH   32
#define s_LOOKUPSWITCH  33
#define s_IRETURN       34

/* TYPE 7 */

#define s_SALOAD        35
#define s_AALOAD        36
#define s_BALOAD        37

/* TYPE 9 */

#define s_INEG          39
#define s_INT2BYTE      40
#define s_INT2CHAR      41

#define TYPE9_END       41

/* TYPE 8 */

#define s_ASTORE        42
#define s_ARETURN       43
```

```
#define s_ATHROW        44
#define s_IFNULL        45
#define s_IFNONNULL     46

#define TYPE8_END       46

/* TYPE 12 */

#define s_ARRAYLENGTH   47
#define s_INSTANCEOF    48

#define TYPE12_END      48

/* TYPE 10 */

#define s_SIPUSH        49

#define TYPE10_END      49

/* TYPE 5 */

#define s_ILOAD         50
#define s_ALOAD         51

/* TYPE 11 */

#define TYPE11_START    52

#define s_ACONST_NULL   52
#define s_LDC2          53
#define s_JSR           54
#define s_NEW           55

#define TYPE11_END      55

/* TYPE 16 */

#define s_NEWARRAY      56
#define s_CHECKCAST     57

#define TYPE16_END      57

/* TYPE 13 */

#define s_DUP           58
#define s_DUP_X1        59
#define s_DUP_X2        60
#define s_DUP2          61
#define s_DUP2_X1       62
#define s_DUP2_X2       63
#define s_SWAP          64

/* TYPE 14 */

#define s_INVOKEVIRTUAL      65  /* 01000001 */
#define s_INVOKENONVIRTUAL   66  /* 01000010 */
#define s_INVOKESTATIC       67  /* 01000011 */
#define s_INVOKEINTERFACE    68  /* 01000100 */

/* TYPE 15 */

#define s_GETSTATIC     69
#define s_PUTSTATIC     70
#define s_GETFIELD      71
#define s_PUTFIELD      72

/* TYPE 4 */

#define s_NOP           73
#define s_IINC          74
#define s_GOTO          75
#define s_RET           76
#define s_RETURN        77
```

V

The invention claimed is:

1. A method of programming a device having a memory and a processor, the method comprising the steps of:

inputting an application program in a first programming language;

compiling the application program in the first programming language into a first intermediate code associated with the first programming language wherein the first intermediate code is interpretable by a first intermediate code virtual machine and not interpretable by a second intermediate code virtual machine;

converting the first intermediate code into a second intermediate code by performing at least one operation to replace a construct in the first intermediate code with an equivalent construct in the second intermediate code, wherein the second intermediate code is interpretable by the second intermediate code virtual machine and not interpretable by the first intermediate code virtual machine;

loading the second intermediate code into the memory of the device;

providing the application with specific privileges; and upon detecting that the application attempts access to a data item on the device, determining whether the specific privileges of the application are sufficient to allow the application the access to the data item.

2. The method of programming a device of claim 1 wherein providing specific privileges to the application comprises associating an identity with the application.

3. The method of programming a device of claim 1 further comprising determining whether the specific privileges of the application are sufficient to allow the application the access to the data item by delegating the determination to an operating system of the device.

4. The method of programming a device of claim 3 further comprising granting access upon determining that the identity associated with the application is contained in the access control list associated with the data item.

5. The method of programming a programmable device of claim 3 further comprising denying access upon determining that the identity associated with the application is not contained in the access control list associated with the data item.

6. A method of programming a device having a memory and a processor, the method comprising the steps of:

inputting an application program in a first programming language;

compiling the application program in the first programming language into a first intermediate code associated with the first programming language wherein the first intermediate code is interpretable by a first intermediate code virtual machine and not interpretable by a second intermediate code virtual machine;

converting the first intermediate code into a second intermediate code by performing at least one operation to replace a construct in the first intermediate code with an equivalent construct in the second intermediate code, wherein the second intermediate code is interpretable by the second intermediate code virtual machine and not interpretable by the first intermediate code virtual machine; and loading the second intermediate code into the memory of the device;

wherein the second code virtual machine is set to recognize a method invocation as being an invocation of a native code subroutine and upon recognizing the method invocation as being an invocation of a native code subroutine, transferring control to the native code subroutine.

7. The method of programming a device of claim 6 wherein the second code virtual machine passes parameters to the native code subroutine on a stack associated with the second code virtual machine.

8. The method of programming a device of claim 6 wherein the second code virtual machine passes parameters to the native code subroutine on a stack associated with an operating system of the device.

9. An electronic device, comprising:

a memory and a processor connected to the memory;

the memory storing:

a second intermediate code virtual machine configured to interpret applications in a converted form; and an application for the device obtained by:

a compiler operable to compile an application program in a first programming language into a first intermediate code associated with the first programming language wherein the first intermediate code is interpretable by at least one first intermediate code virtual machine and not interpretable by the second intermediate code virtual machine; and a converter operable to convert the first intermediate code into a second intermediate code by performing at least one operation to replace a construct in the first intermediate code with an equivalent construct in the second intermediate code, wherein the second intermediate code is interpretable by a second intermediate code virtual machine and not interpretable by the first intermediate code virtual machine;

wherein the application has associated therewith specific privileges; and wherein the device is operable to, upon detecting that the application attempts access to a data item on the device, determine whether the specific privileges of the application are sufficient to allow the application the access to the data item.

10. The electronic device of claim 9 wherein the specific privileges to the application are associated with an identity associated with the application.

11. The electronic device of claim 10 wherein the device is further operable to grant access upon determining that the identity associated with the application is contained in the access control list associated with the data item.

12. The electronic device of claim 10 wherein the device is further operable to deny access upon determining that the identity associated with the application is not contained in the access control list associated with the data item.

13. An electronic device, comprising:

a memory and a processor connected to the memory;

the memory storing:

a second intermediate code virtual machine configured to interpret applications in a converted form; and an application for the device obtained by:

a compiler operable to compile an application program in a first programming language into a first intermediate code associated with the first programming language wherein the first intermediate code is interpretable by at least one first intermediate code virtual machine and not interpretable by the second intermediate code virtual machine; and a converter operable to convert the first intermediate code into a second intermediate code by performing at least one operation to replace a construct in the first intermediate code with an equivalent construct in the second intermediate code, wherein the second intermediate code is interpretable by a second intermediate code virtual machine and not interpretable by the first intermediate code virtual machine; and wherein the application has associated therewith specific privileges; and wherein the device comprises an operating system operable to, upon detecting that the application attempts access to a data item on the device, determine whether the specific privileges of the application are sufficient to allow the application the access to the data item.

14. An electronic device, comprising:

a memory and a processor connected to the memory;

the memory storing:

a second intermediate code virtual machine configured to interpret applications in a converted form and further configured to recognize a method invocation as being an invocation of a native code subroutine and upon recognizing the method invocation as being an invocation of a native code subroutine, transferring control to the native code subroutine; and an application for the device obtained by:

a compiler operable to compile an application program in a first programming language into a first intermediate code associated with the first programming language wherein the first intermediate code is interpretable by at least one first intermediate code virtual machine and not interpretable by the second intermediate code virtual machine; and a converter operable to convert the first intermediate code into a second intermediate code by performing at least one operation to replace a construct in the first intermediate code with an equivalent construct in the second intermediate code, wherein the second intermediate code is interpretable by a second intermediate code virtual machine and not interpretable by the first intermediate code virtual machine.

15. The electronic device of claim 14 wherein the second code virtual machine passes parameters to the native code subroutine on a stack associated with the second code virtual machine.

16. The electronic device of claim 14 wherein the second code virtual machine passes parameters to the native code subroutine on a stack associated with an operating system of the device.

* * * * *